United States Patent [19]

Recalde

[11] Patent Number: 4,687,376
[45] Date of Patent: Aug. 18, 1987

[54] MULTI-REEL OPERATIONAL LINES LAYING VESSEL

[75] Inventor: Carlos E. Recalde, Irvine, Calif.

[73] Assignee: Santa Fe Internation Corporation, Alhambra, Calif.

[21] Appl. No.: 646,112

[22] Filed: Aug. 31, 1984

[51] Int. Cl.[4] .......................... F16L 1/04; B63B 35/04
[52] U.S. Cl. ..................................... 405/168; 405/166
[58] Field of Search ............... 405/158, 166, 168, 178, 405/169; 72/161; 254/134.3 SC, 374, 393, 134.3 R, 134.3 CL; 242/157.1, 157 R, 158.3; 226/153, 190, 193, 196

[56] References Cited

U.S. PATENT DOCUMENTS

| | | | |
|---|---|---|---|
| Re. 30,846 | 1/1982 | Lang et al. | 405/168 |
| 2,931,185 | 4/1960 | Ashby | 242/157 R |
| 3,279,762 | 10/1966 | Bruns | 254/393 X |
| 3,400,900 | 9/1968 | Goode | 254/134.3 R X |
| 3,641,778 | 2/1972 | Gibson | 405/168 |
| 3,685,306 | 8/1972 | Mott | 405/168 |
| 3,851,489 | 12/1974 | Richardson | 405/178 |
| 3,948,059 | 4/1976 | Pompa | 405/178 |
| 4,260,287 | 4/1981 | Uyeda et al. | 405/168 |
| 4,269,540 | 5/1981 | Uyeda et al. | 405/168 |
| 4,297,054 | 10/1981 | Yenzer et al. | 405/168 |
| 4,521,132 | 6/1985 | Isakson et al. | 405/166 |

Primary Examiner—Richard J. Scanlan, Jr.
Assistant Examiner—Nancy J. Stodola
Attorney, Agent, or Firm—Harris, Kern, Wallen & Tinsley

[57] ABSTRACT

A reel pipelaying vessel having multiple reels for laying operational lines in a wide range of water depths. An operational lines laying device is mounted on the vessel in order to provide supporting means for the simultaneous layout of a plurality of operational lines at a common velocity and in a predetermined relationship to one another. Motive means are interconnected to the multiple reels in order to control the rate of layout. Separate or combined straightening and tensioning devices can be employed for handling the rigid walled pipeline contained within the operational lines. The straightening and tensioning devices can be mounted for pivotal movement with respect to the vessel deck or can be operated in fixed planes with respect to the deck. Six or more operational lines can be simultaneously laid out with the vessel described.

45 Claims, 47 Drawing Figures

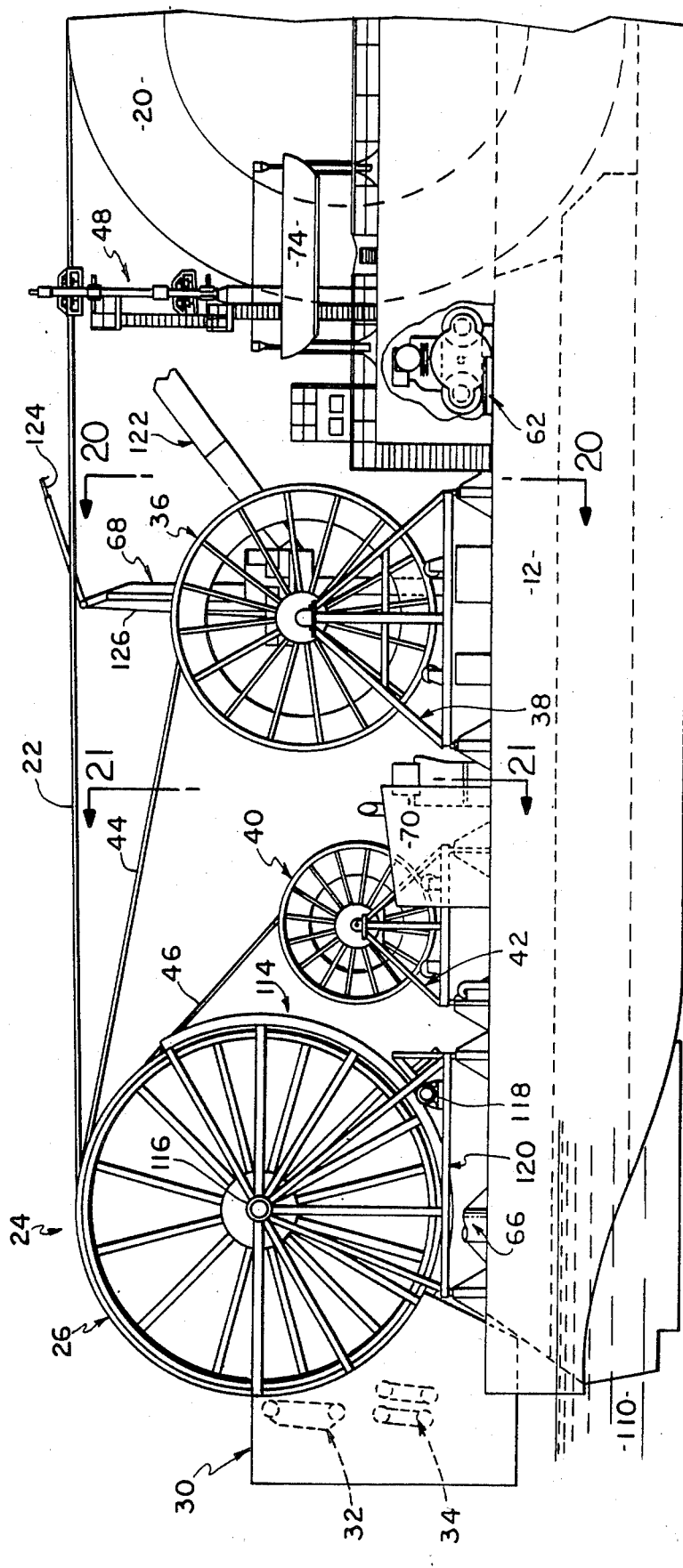
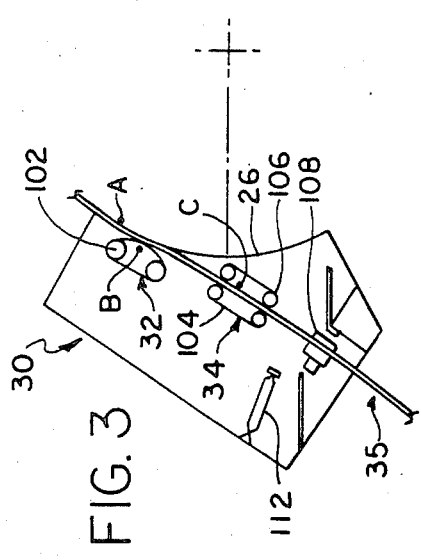
FIG. 3
FIG. 4

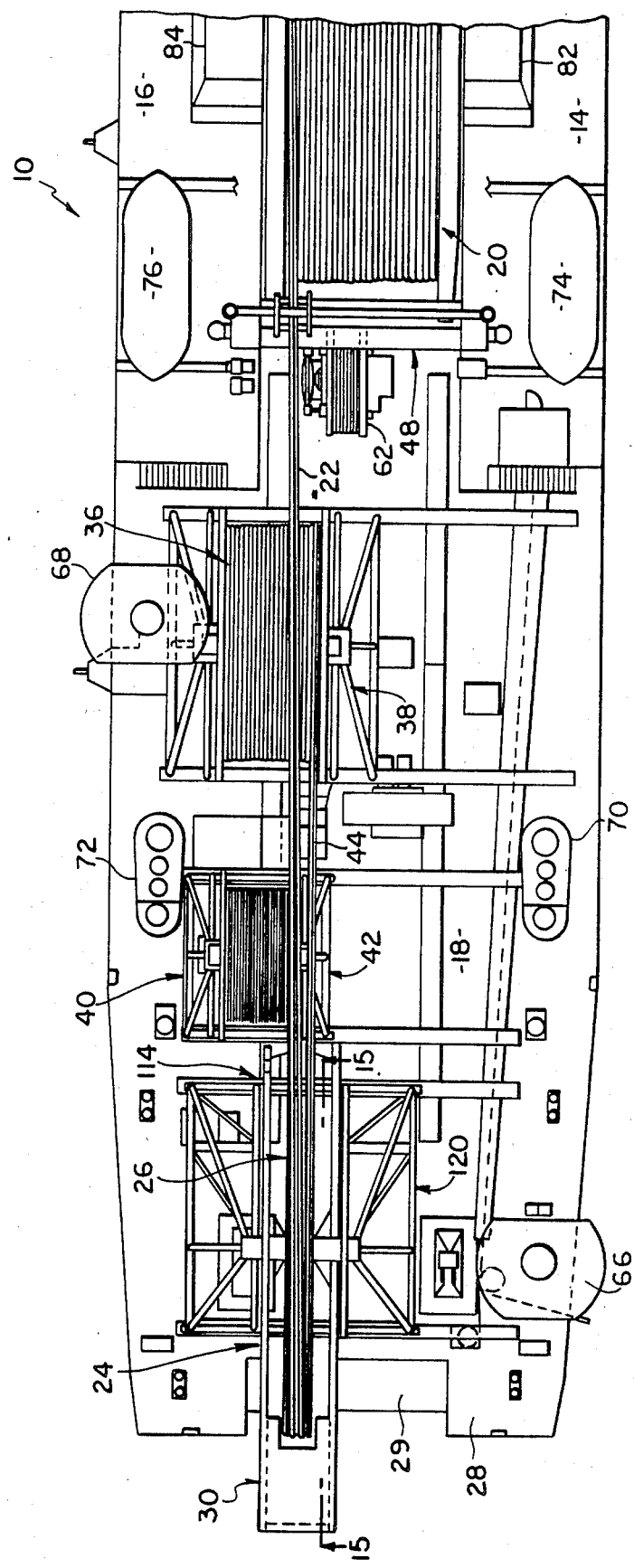

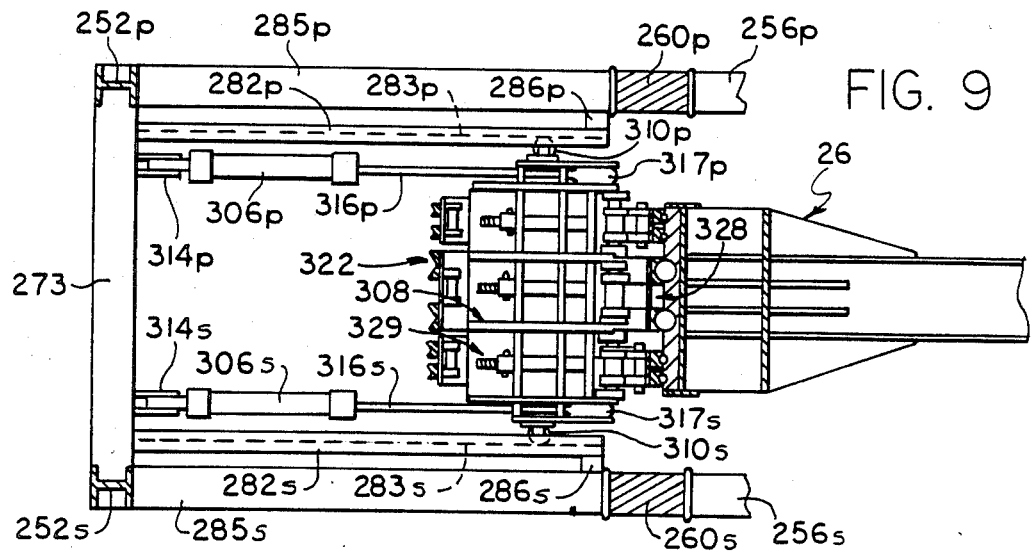
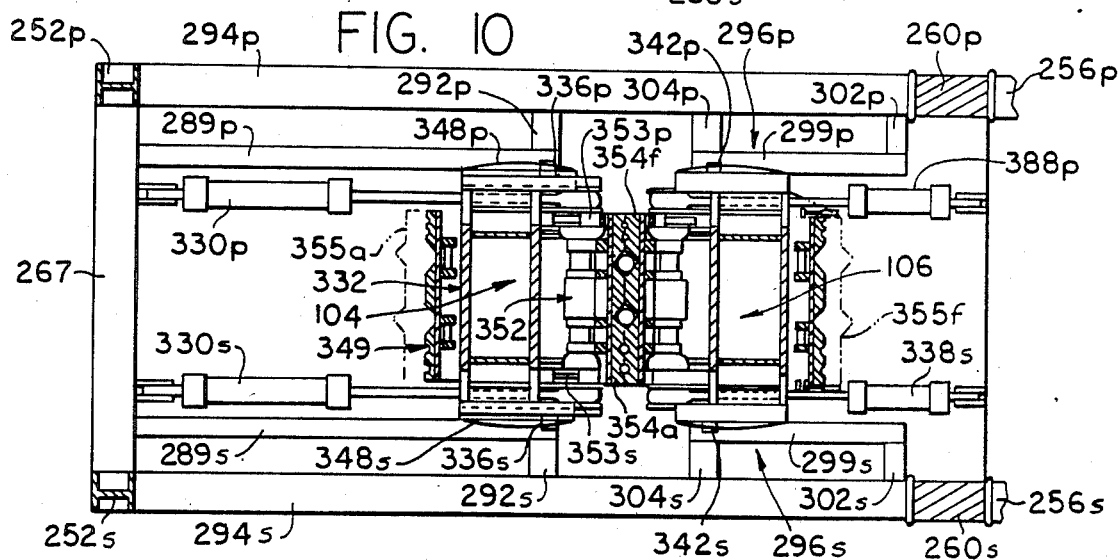
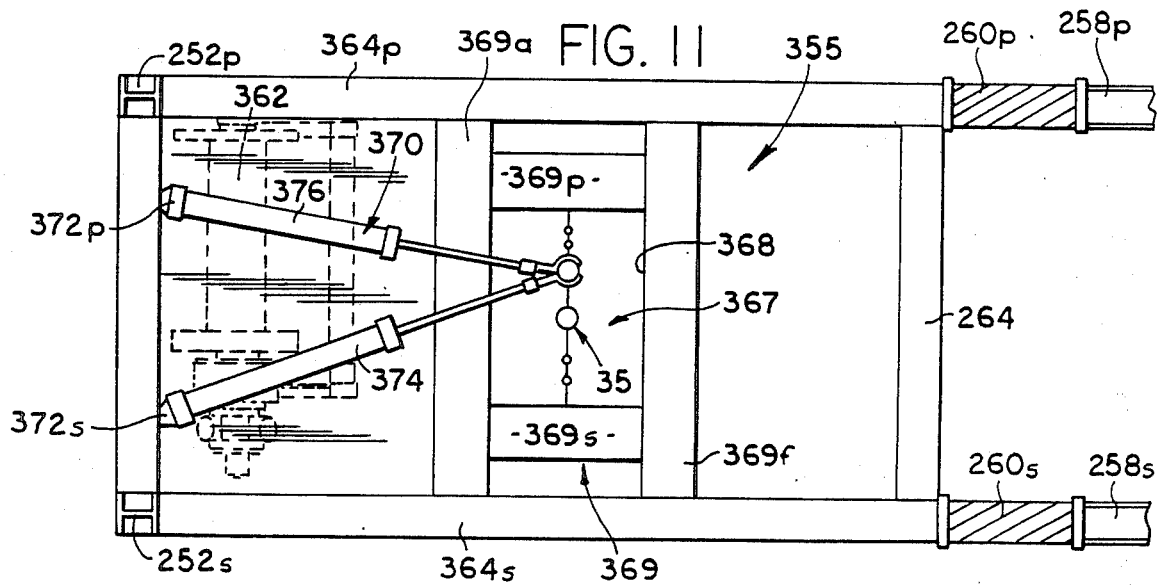

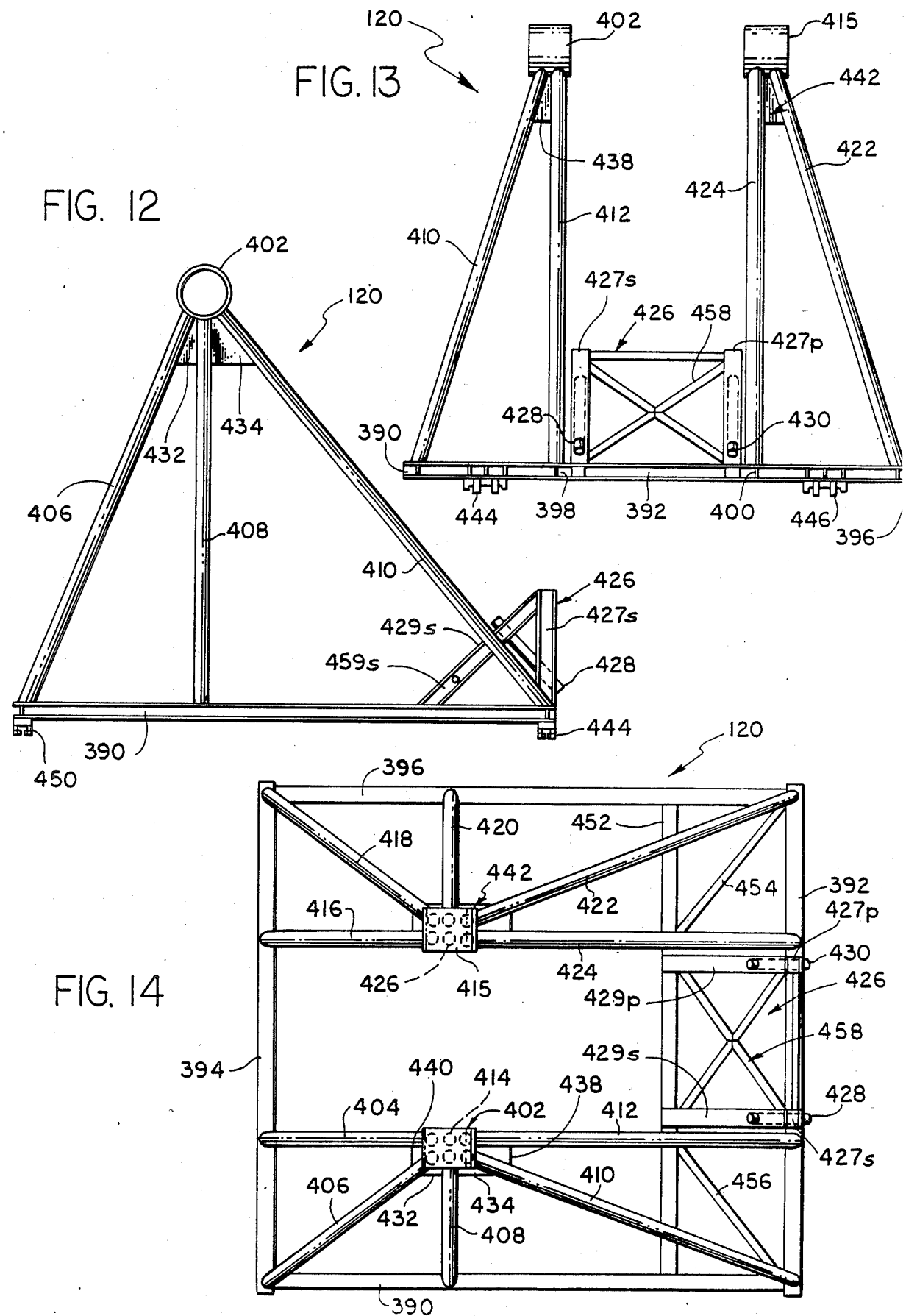

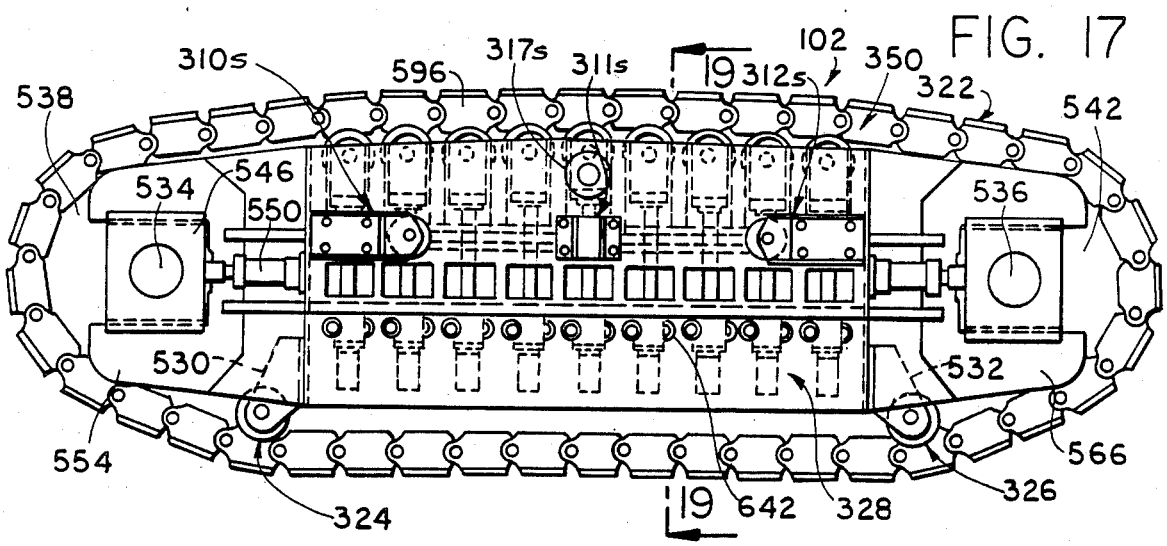
FIG. 17
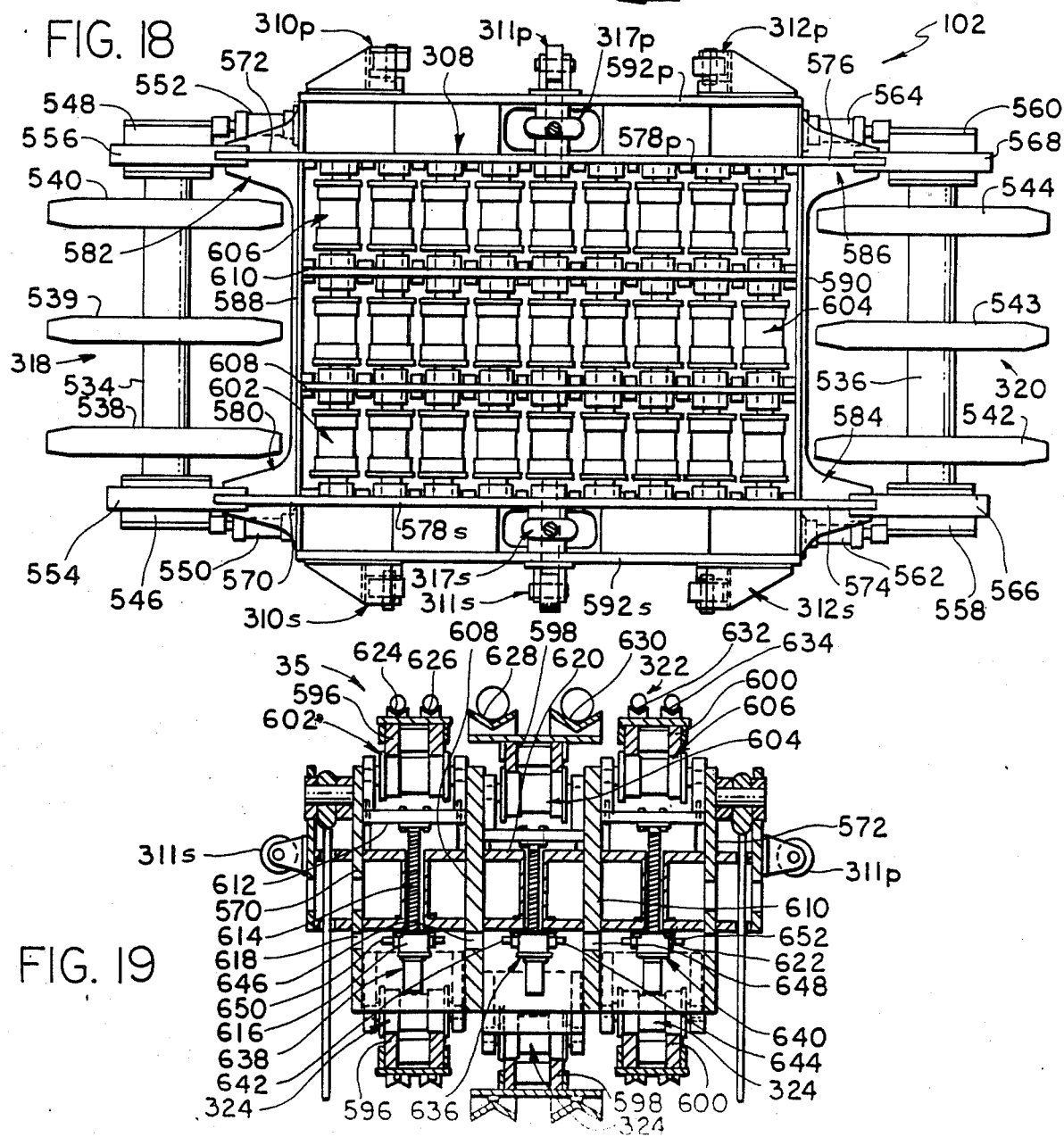
FIG. 18
FIG. 19

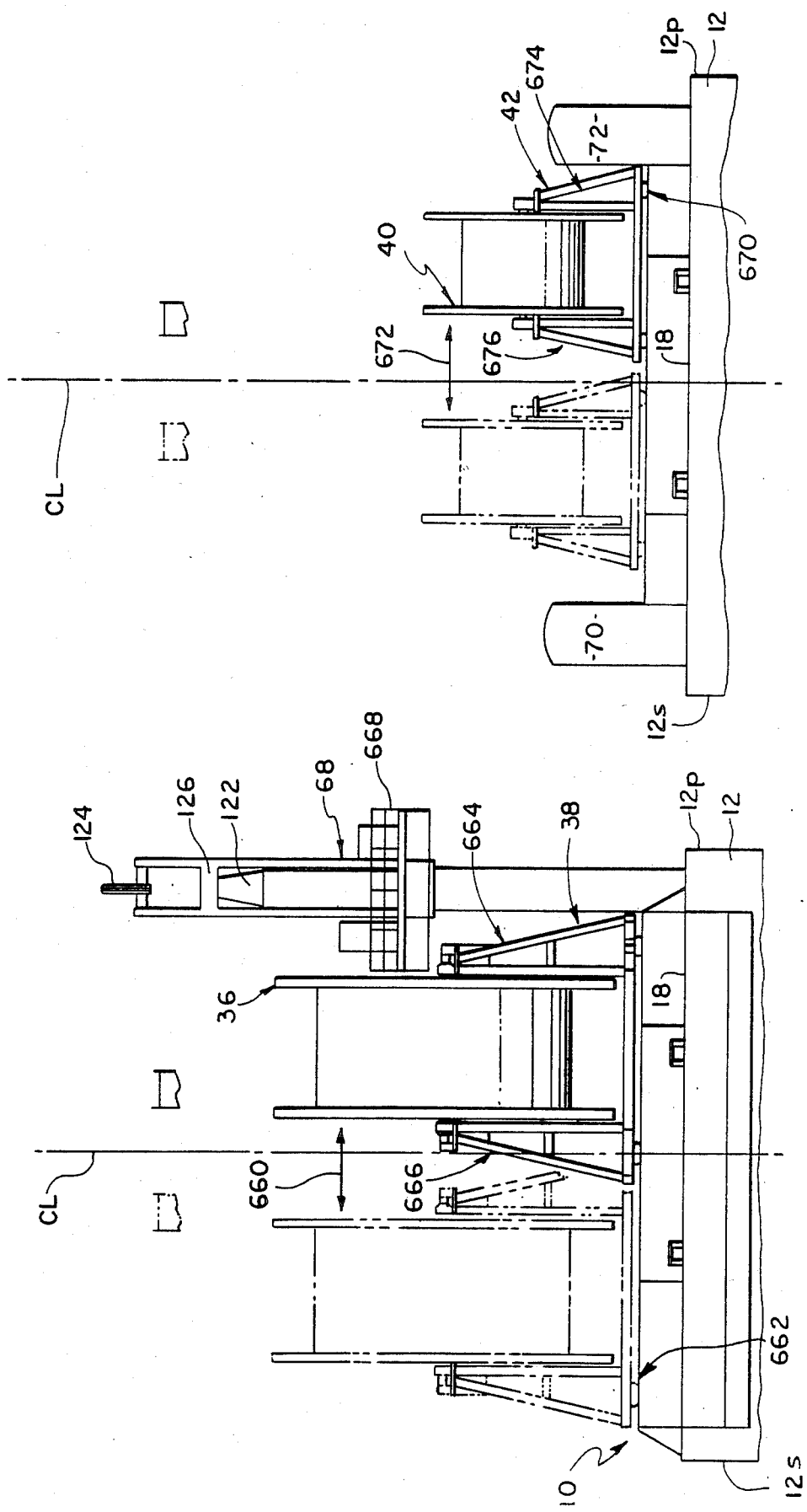

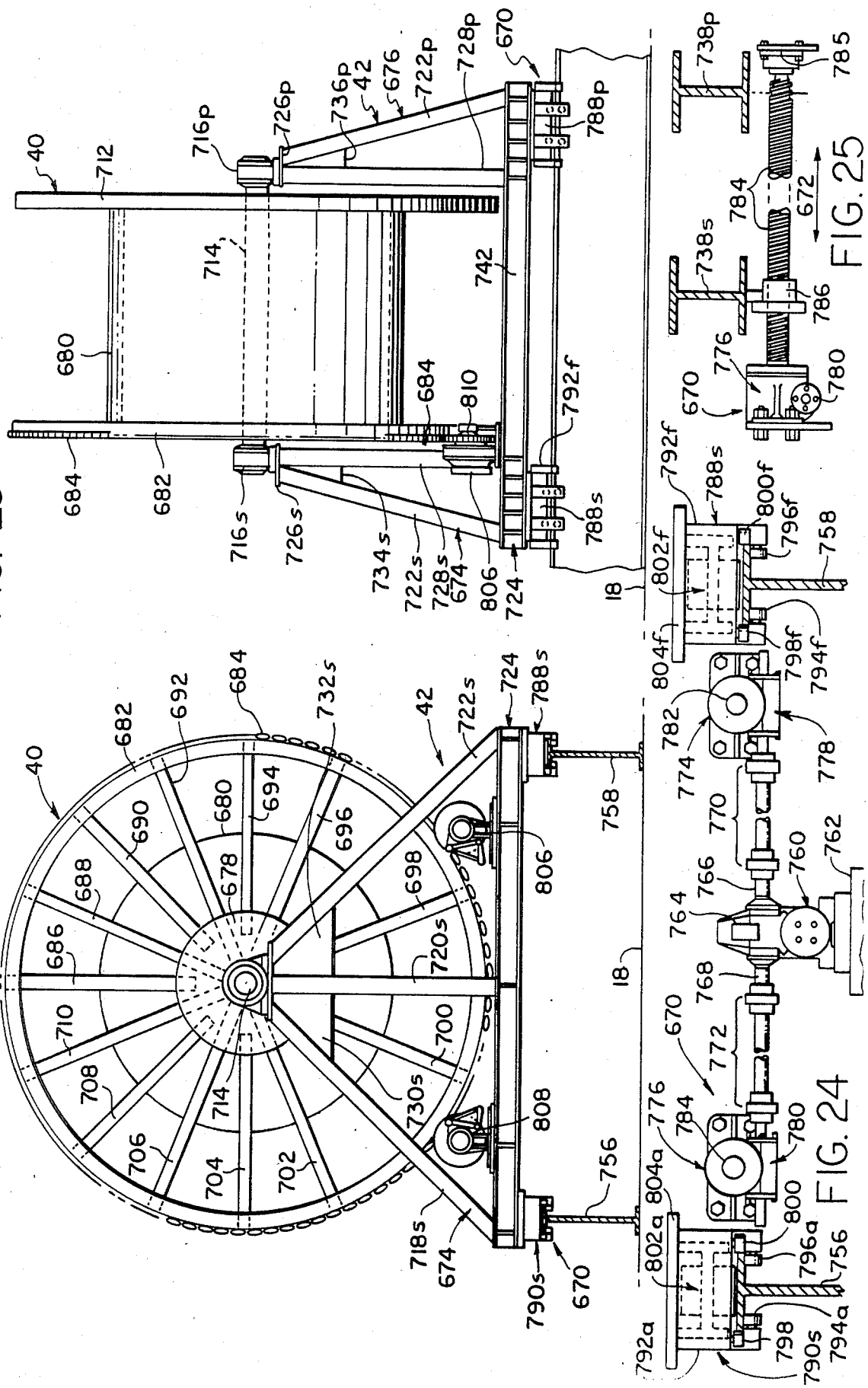

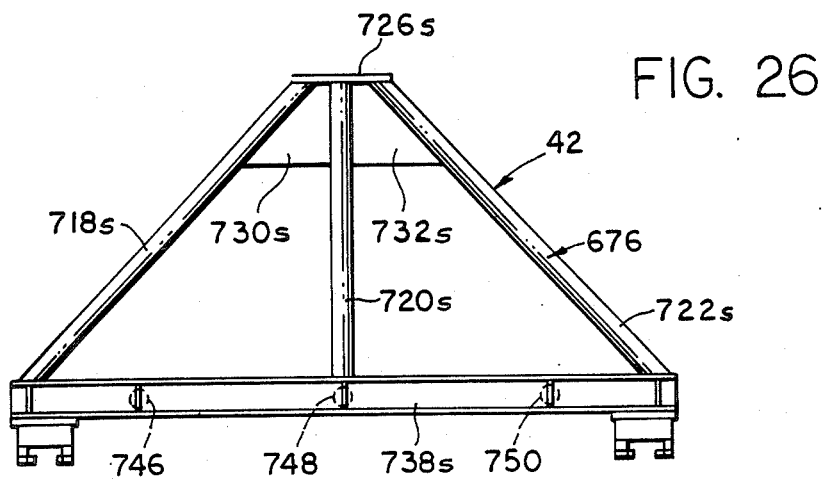
FIG. 26
FIG. 27
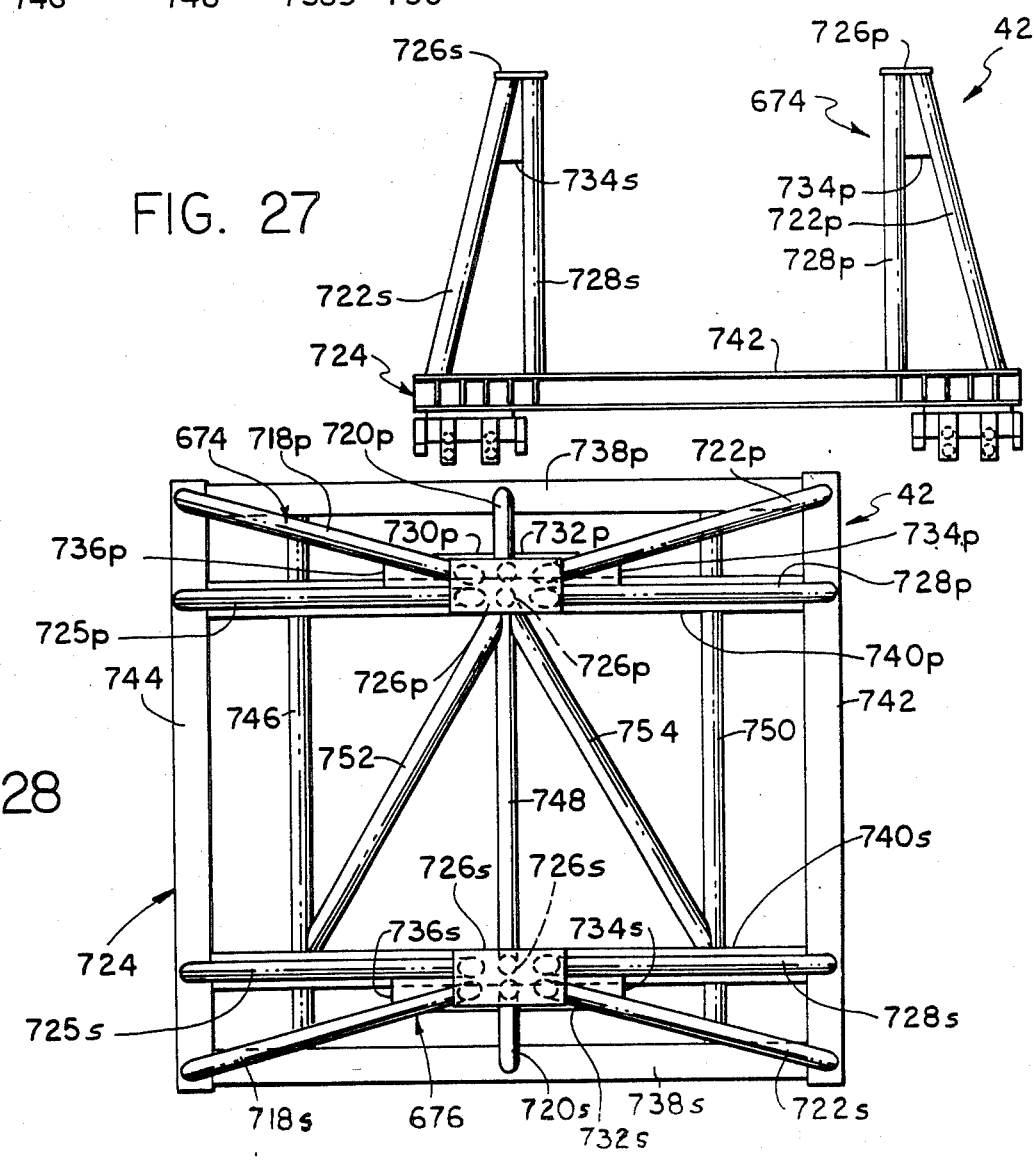
FIG. 28

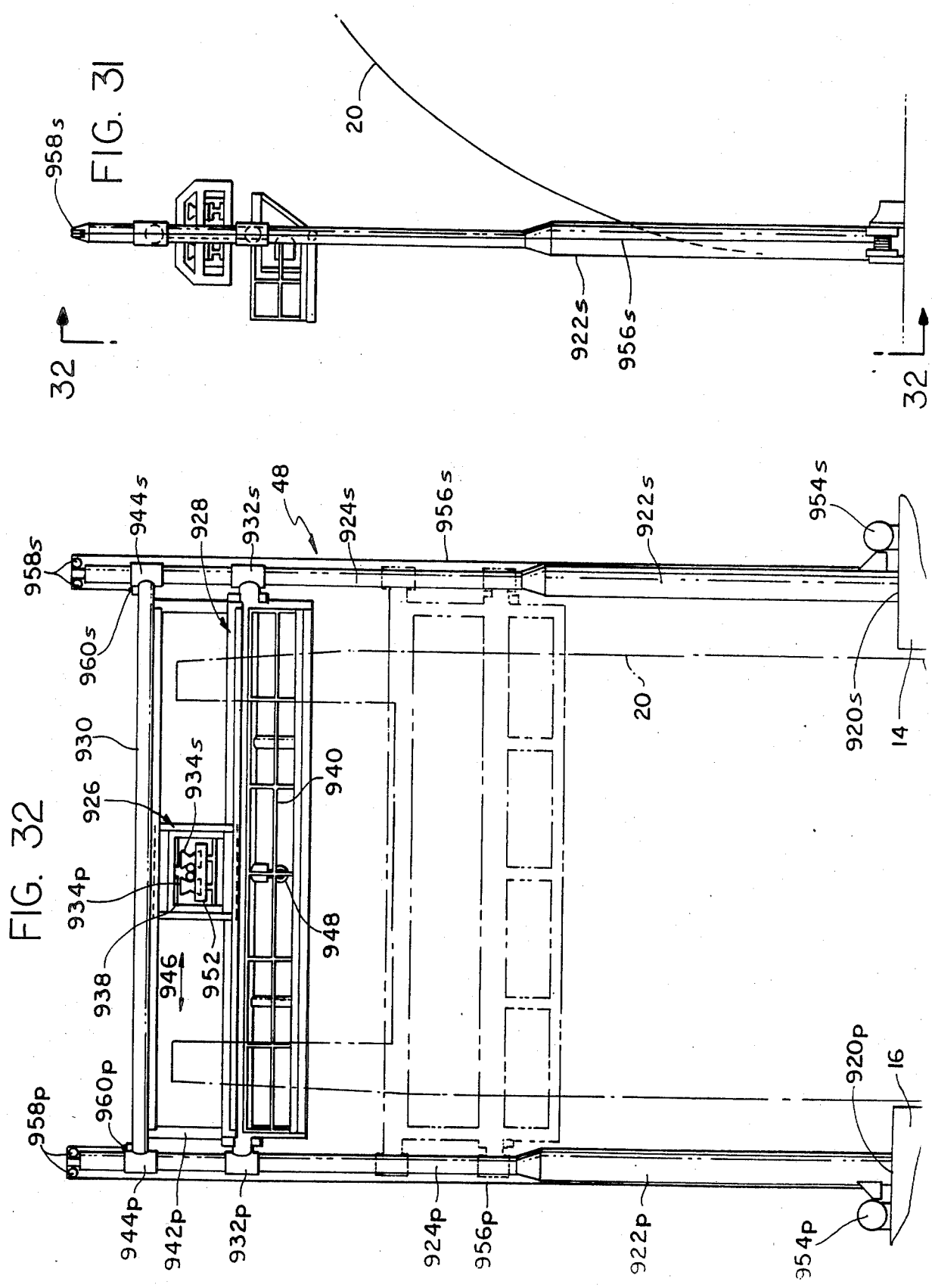

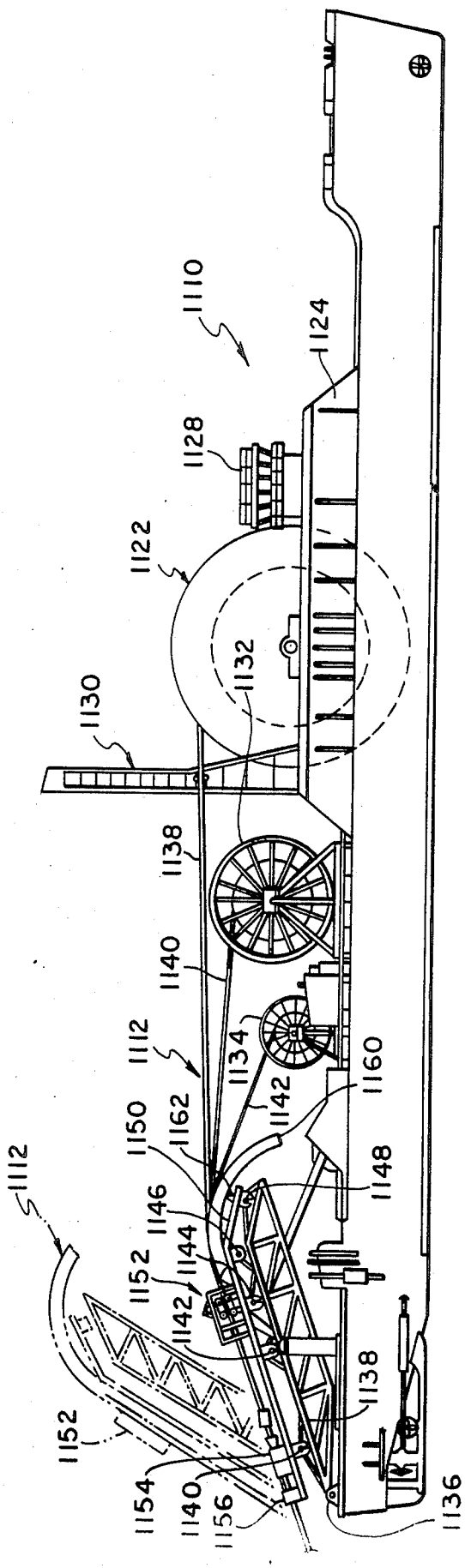
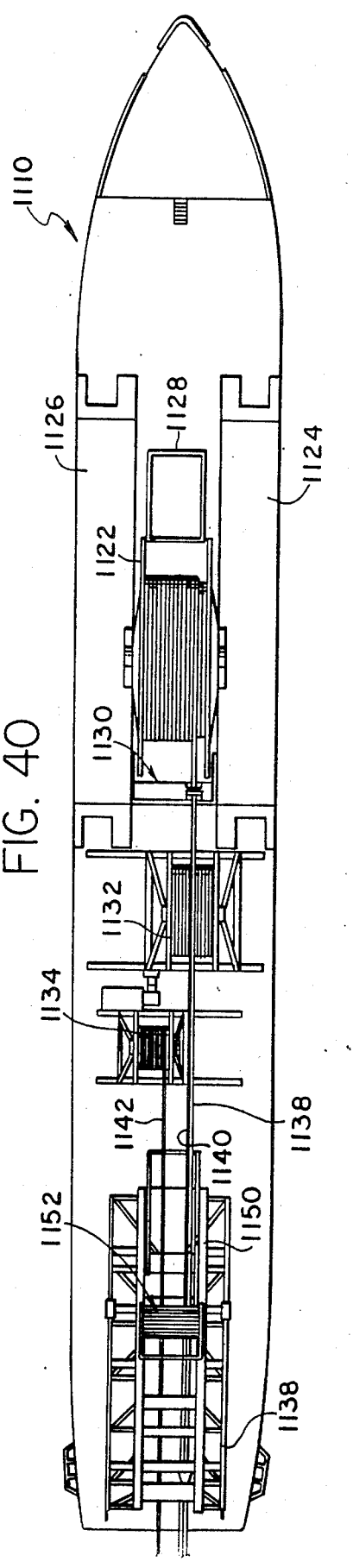
FIG. 39
FIG. 40

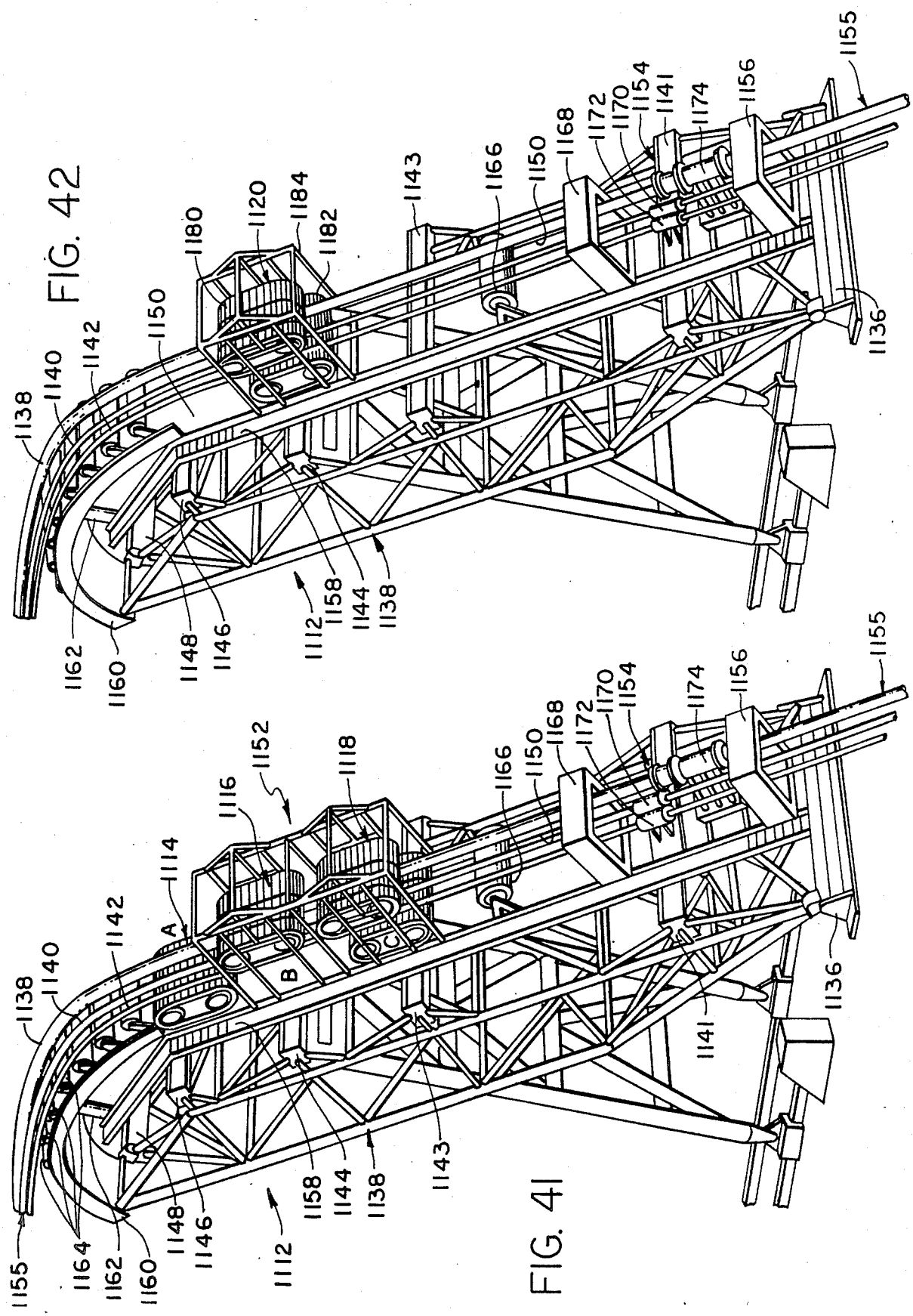

MULTI-REEL OPERATIONAL LINES LAYING VESSEL

BACKGROUND OF THE INVENTION

1. Field of the Invention

This invention relates to a reel pipe laying vessel on which a plurality of reels are disposed for laying multiple operational lines in waters having depths limited only by the strength of the pipe. More particularly, the invention pertains to a new type of vessel in which at least two reels are employed, one or more of which is used for storing and unspooling a rigid walled pipeline. The multiple reels can be used for laying a variety of lines in association with one or more rigid walled pipelines. The vessel includes a layout system which provides for simultaneous layout of multiple operational lines.

The vessel of this invention is designed to accomodate a permanently mounted pipe spooling main reel which is of substantial size and is capable of spooling pipe up to 16 inches diameter.

2. History of the Prior Art

In laying offshore subsea pipelines for such uses as the gathering of oil and/or gas from offshore wells, as, for example, in the Gulf of Mexico, it has been conventional to use one of two main methods to lay the pipe. In the first, called the "stovepiping" method, a pipeline is fabricated on the deck of a lay barge by welding together individual lengths of pipe as the pipe is paid out from the barge. Each length of pipe is about 40' or 80' long. Thus, the pay-out operation must be interrupted periodically to permit new lengths of pipe to be welded to the string. The stovepiping method requires that skilled welders and their relatively bulky equipment accompany the pipelaying barge crew during the entire layout operation; all welding must be carried out on site and often under adverse weather conditions. Further, the stovepiping method is relatively slow, with experienced crews being able to lay only one to two miles of pipe a day. This makes the entire operation subject to weather conditions which can cause substantial delays and make working conditions quite harsh.

The other principal conventional method is the reel pipelaying technique, in this method, a pipeline is wound on the hub of a reel mounted on the deck of a lay barge. Pipe is generally spooled onto the reel at a shore base. At such a shore base, short lengths of pipe can be welded under protected and controlled conditions to form a continuous pipeline which is spooled onto the reel. The lay barge is then towed to an offshore pipelaying location and the pipeline is spooled off the reel between completion points. This method has a number of advantages over the stovepiping method, among them, speed (one to two miles per hour); lower operating costs (e.g., smaller welding crews and less welding equipment must be carried on the lay barge); and less weather dependency.

The broad concept of reel pipelaying was also disclosed in British Pat. No. 601,103 (Ellis), issued Apr. 28, 1948, wherein it was suggested that lengths of pipe be joined together at the manufacturing plant and coiled onto a drum, mounted on a barge or ship; the loaded barge would then be moved to the desired marine location and the pipe unwound from the drum by fixing one end of the pipe and towing the barge away from the fixed location.

After a hiatus of about thirteen years, research into the reel pipelaying technique was renewed and was carried on by Gurlter, Hebert & Co., Inc. of New Orleans, La. By 1961, that company had sufficiently advanced the reel pipelaying technique to make it a commercially acceptable and viable method laying pipe in the offshore petroleum industry, able to compete with the traditional stovepiping technique. The first known commercial pipelaying reel barge, called the U-303, was built by Aquatic Contractors and Engineers, Inc., a subsidiary of Gurtler, Hebert, in 1961. The U-303 utilized a large vertical axis reel, permanently mounted on a barge and having horizontally oriented flanges (generally referred to in the trade as a "horizontal reel"). A combined straightener-level winder was employed for spooling pipe onto the reel and for straightening pipe as it was unspooled. The U-303 first laid pipe commercially in September 1961, in the Gulf of Mexico off the coast of Louisiana and was used successfully during the 1960's to lay several million linear feet of pipe of up to 6" diameter. The U-303 reel pipelaying barge is described in U.S. Pat. No. 3,237,438 (Tesson) and U.S. Pat. No. 3,372,461 (Tesson) both assigned to the assignee of the invention hereof.

The successor to the U-303, currently in use in the Gulf of Mexico and known in the trade as the "Chickasaw" also utilizes a large horizontal reel, permanently mounted to the barge such that it is not readily movable from one carrier vessel to another. Various aspects of "Chickasaw" are described in the following U.S. Patents, all assigned to the assignee of the invention hereof:

Sugasti, et al.—U.S. Pat. No. 3,630,461
Gibson—U.S. Pat. No. 3,651,778
Mott, et al.—U.S. Pat. No. 3,680,342
Key, et al.—U.S. Pat. No. 3,712,100

The Gibson patent shows an apparatus for diverting a single pipeline from a horizontal unspooling direction to a vertical direction for layout in a body of water. While the patent mentions that more than one reel could be employed there is no enabling disclosure from which a multiple reel vessel could be constructed and operated.

U.S. Pat. No. 3,685,306 to Mott also describes an apparatus which diverts a single pipeline from a horizontal position to a vertical direction. The pipeline can be successively unreeled from adjacent ganged reels.

Commercial reel pipelaying techniques require the use of certain pipe handling equipment in addition to the reel. Among such pipe handling equipment usually employed in commercial reel pipelaying systems is a straightener mechanism. This may take the form of a series of rollers or tracks, or any other arrangement which imparts sufficient reverse bending force to the pipe to remove residual curvature so that after unspooling, the pipe will lay substantially straight on the sea bottom.

U.S. Pat. No. Re. 30,846 (Lang et al) describes an apparatus for laying pipe from a vertical reel in which the pipe conditioning apparatus is pivotable to adjust the lift-off angle of the pipe relative to the horizontal (e.g., the deck of a ship) as a function of the water depth in which the pipe is being laid. This has distinct commercial advantages, especially where the reel pipelaying system is incorporated into a self-propelled ship, such as that of the present invention, capable of traveling to different job sites, having different pipe size and/or lay depth requirements.

An early concept for a reel pipelaying ship is described in Goren, et al. "The Reel Pipelay Ship—A New Concept" Offshore Technology Conference Proceedings, May 1975 (Paper No. - OTC 2400). This paper (hereafter the Goren, et al 1975 OTC Paper) describes advantages and operating features of a proposed reel pipelaying ship. However, the cost of construction of a ship as described there was estimated to be on the order of $1,000,000,000.

Apache Reel Laying Vessel

The research and development work for the ship described in the Goren, et al paper, (done at great expense by on behalf of the assignee of this application) was subsequently materially revised in numerous major respects, and substantial changes and improvements were made to achieve the design of a substantially different reel pipelaying ship which is described in the following U.S. Patents, all assigned to the assignee of the invention hereof:
  Springett, et al.—U.S. Pat. No. 4,230,421
  Uyeda, et al.—U.S. Pat. No. 4,269,540
  Yenzer, et al.—U.S. Pat. No. 4,297,054
  Springett, et al.—U.S. Pat. No. 4,340,322
  Uyeda, et al.—U.S. Pat. No. 4,345,855
The disclosures of these five single reel patents are hereby incorporated as though fully set forth herein.

The vessel described in these patents was constructed and is currently in use in various offshore oil fields and is known in the offshore oil industry as the "Apache". This vessel is a self-propelled dynamically positioned single reel pipelaying ship which has a specially constructed hull comprising a reel support structure for rotatably mounting a vertical reel for unspooling a rigid walled pipeline. Only a single pipeline is handled by this ship. Other pipe handling equipment includes a pipe bending radius controller; pipe straightening equipment; clamping assembly; a stern pipe guide assembly and a level wind assembly. A tensioning assembly is also arranged on a support ramp assembly. The pipe exit angle or the water entry angle is from 18° to about 60° since this is the range of angular movement of the support ramp assembly. The upper part of this range of the pipe water entry angles is sufficient to accomodate laying a single pipeline in approximately 3,000 ft. water depth. In order to lay pipe at greater depths it is necessary to increase the pipe water entry angle.

The Apache vessel is not equipped to layout multiple lines since it has but a single main reel and does not have adequate unused deck space to permit the convenient placement of auxillary reels. An early suggestion which was made during the vessels construction phase and mentioned in the above patents, was that portable reels could be placed on the Apache deck to permit stern bundling of smaller lines with the pipeline from the main reel. These smaller lines were not required to be passed through the pipe handling equipment with the main reel pipeline according to the suggestion and there were no operative disclosures as to forming a juxtaposed plurality of operational lines by contact with a laying device which is adapted to move all the lines at a common velocity. This stern bundling suggestion was made in the OTC Paper No. 3069, May 8-11, 1978.

SUMMARY OF THE INVENTION

There are increasing requirements in the offshore petroleum industry for laying multiple operational lines in deep water at depths greater than 3,000 ft. and in remote areas far from supply bases. To be commercially viable a pipelaying vessel must also be capable of laying either single or multiple operational lines in shallow waters of less than 200 ft. up to 3,000 ft. depth. The multi-reel pipelaying vessel of this invention represents a new and different concept to meeting these needs.

The vessel utilized for this invention can be a self-propelled dynamically positioned ship or it can be a barge which requires a tug for motive power. The vessel deck is utilized to mount auxiliary reels for the layout of additional operational lines simultaneously with a layout of at least one rigid walled pipeline from the main reel. At least one additional reel is necessary for this purpose.

A principal feature of the present multi-reel pipelaying vessel is that an operational lines laying device is mounted adjacent to the stern of the vessel. A plurality of operational lines are unspooled from the reels mounted on the vessel and are laid out into simultaneous contact with the laying device which includes an operational lines supporting means adapted for providing moving contact with the operational lines. The preferred laying device of the present invention changes the direction of movement of the plurality of operational lines from horizontal to vertical and can be used for laying operational lines in shallow waters of under 200 ft. down to much greater depths of 7,500 ft and beyond. The supporting means is adapted for gathering the operational lines into an initial juxtaposed configuration which is parallel with the direction of forward vessel motion. All of the operational lines are moved at the same linear velocity due to the contact thereof with the supporting means of the operational lines laying device.

The preferred operational lines laying device also includes straightening and tensioning devices which are adapted to straighten and provide tension for the operational lines while maintaining the same in a juxtaposed array which is aligned with the direction of forward vessel motion. The straightening means is adapted for imparting a reverse bending force to the rigid walled pipeline(s) which are among the operational lines being laid out.

The preferred operational lines laying device has a pipe take-off assembly mounted adjacent to the stern of the vessel. The take-off assembly includes a rotatably mounted drum and a pipe take-off structure which can preferably contain straightening and tensioning devices as well as additional pipe clamping means when required. The pipe take-off drum in the operational lines laying device is not powered by a separate motive means but rather is rotated dependent upon frictional contact between the operational lines with the periphery of the drum which provides the operational lines supporting means. The take-off structure is rotatably journaled for permitting water entry angles of from about 20° to about 90° for the operational lines array to lay out lines from 200 ft. to greater depths. The upper part of this range from about 60° to about 90° is used for deep water laying in 3,000 ft. and greater depths.

Level wind carriages are also preferably provided for the operational lines laying device and the auxillary reels.

The operational lines laying device can be arranged to cooperate with a straightening device contained within the pipe take-off structure so as to contribute one of three force imposition zones on the rigid walled pipeline(s) in order to reverse bend the rigid walled pipeline opposite the curvature imparted by the storage reel. In deep waters beyond 3,000 ft. the weight of the pipeline(s) is sufficient to elastically straighten the rigid walled pipe. In this embodiment it is possible to use the hydraulic braking systems on the operational lines reel motors to provide tensioning of the lines, thus permitting pipe layout in the absence of separate straightening and/or tensioning devices. The laying device and the operational lines storage reels together with the associated straightening and tensioning devices and level wind carriages form an operational lines array layout system which has various novel features.

The preferred embodiment has the advantage of being lightweight, about 270 long tons, compared to about 600 tons for the pipehandling equipment on the aft deck of the Apache pipelaying vessel.

Other embodiments of the laying device employ multiple track straightening and tensioning assemblies mounted on carriages which are pivotally attached to the vessel or which are operated in a fixed plane with respect to the vessel deck. In these embodiments the carriages for the multiple track assemblies are mounted for level winding transverse motion with respect to the vessel's longitudinal center line.

Additional embodiments employing multiple track straightening and tensioning assemblies as the pipeline laying devices are used for laying out operational lines arrays in shallow water of less than 200 ft. up to depths of about 3,000 ft. In the first of these embodiments the multiple track assemblies are contained in a carriage which is pivotally attached to the vessel so that a range of pipeline entry angles of from about 20° to about 60° can be employed. In another of these other embodiments the multiple track carriage is operating in a fixed angular plane with respect to the vessel deck for the layout of multiple operational lines in shallow waters of up to about 1,500 ft. Two modifications of this embodiment are described herein.

In summary, the preferred embodiment includes a laying device comprising a rotatably mounted drum and an attached pipe take-off structure which is operative for laying out operational lines arrays including at least one rigid walled pipeline over a very wide range of water depths of from less than 200 ft. to much greater depths even beyond 7,500 ft. The embodiment having multiple track straightening and tensioning assemblies mounted on a pivotal ramp is capable of operational lines layout in an intermediate depth of water up to about 3,000 ft. and the embodiment having the multiple track assemblies mounted on carriages operating in fixed planes is useable for shallow water depths up to about 1,500 ft.

Straightener and Tensioner Devices

In each of the first two embodiments summarized above, the straightening and tensioning devices can be of two types. The first type is a straightening device which is operated independently from the tensioning device. The second type is a combined straightening/tensioning device comprising two multiple track assemblies which are employed on opposite sides of the operational lines array in order to provide both of the straightening and tensioning functions. The second type involves the use of a new straightening/tensioning device which is capable of imparting controlled curvature to the rigid walled pipeline(s) within the operational lines array and is also capable of providing longitudinal tension force. The advantage of the second type is that only two such assemblies are required for both of the straightening and tensioning functions whereas in the first type four or five separate of the track assemblies are required for the layout of even a single rigid walled pipeline.

In the third embodiment, wherein carriages operating in fixed planes above the deck are used, the combined straightening/tensioning device is preferred although the first type of independent straightening and tensioning devices can be employed with long ramps.

In each of the above described embodiments the operational lines laying device is mounted on the vessel via a carriage which is capable of level winding transversely across the vessel deck to provide for controlled spooling and unspooling of the pipelines array on to and off a plurality of storage reels. The storage reels are fitted with hydraulic motors for imparting motive power to the reel flanges or rims in order to provide for spooling up of the lines. The hydraulic motors are also fitted with hydraulic braking systems for controlling tension of the lines during unspooling and to control the rate of line(s) layout.

Each of the embodiments of the present invention permits a plurality of operational lines including one or more rigid walled pipelines to be laid out in an array on the bottom of bodies of water in a controlled manner. The particular embodiment selected for a given project depends upon the depth of water and the project budget available. Other technical/economic considerations such as the permissible capital investment, speed of pipeline layout, customer flexibility of design characteristics, and sea state spectrum also enter into the selection process. Within the six embodiments of this invention the full range of laying conditions are providing for. The three main embodiments of the operational lines laying vessel cover a wide range of layout depths, whereas the use of specific straightening and tensioning devices used is determined by various pipe handling technical characteristics and economic considerations.

Another feature of the present invention is that a dynamically positioned vessel can be alternately converted between a single pipeline laying capability such as described in the above mentioned Springett, et al., Uyeda, et al. and Yenzer, et al. patents which is embodied in the Apache pipelaying ship and the vessel described in the present application. In order to accomplish this alternate use, the main pipeline reel is maintained in its fixed position and the remainder of the pipe handling equipment shown on the aft deck of the vessel in those U.S. patents is replaced with the layout system herein described which includes one or two auxiliary reels and the operational lines laying devices described herein. Thus, a convertible feature for operation of a pipe laying vessel between a single reel vessel and a multi-reel vessel is also included within the present invention.

It is, therefore, an object of the present invention to provide a multi-reel pipelaying vessel which can simultaneously layout two or more operational lines onto the sea bottom of wherein at least one of the lines is a rigid walled pipeline.

Another object is to provide a pipelaying vessel wherein an array of multiple operational lines is laid out from a common laying device which equalizes the layout velocity of the operational lines array.

Yet another object is to provide an operational lines array layout system for use on a vessel in which one or more storage reels are provided for spooling and unspooling of a plurality of rigid walled pipelines. This system includes the use of a common laying device through which the array passes.

Another object of the present invention is to provide a layout system in which three storage reels are mounted on a vessel deck for spooling and unspooling an array of multiple operational lines for layout onto the sea bottom after passing through a common laying device which provides for equalizing the layout velocity of the lines.

Yet another object of the present invention is to provide a layout system which is of lightweight and can be transferred on to pipelaying vessels by exchange of pipehandling equipment preexisting on such vessels with the layout system herein described.

Another object is to provide an improved straightener/tensioner device which permits the establishment of selected curvatures for controlling the straightening process and applying the desired tension for maintaining pipeline profile over a wide range of layout water depths.

Another object is to provide an improved spooling and unspooling method for use with the operational lines array layout system herein described.

For convenience, the following terms may be employed in the description of this invention:

1. A "turn" is that length of pipe wound through one complete revolution of the reel.

2. A "wrap" comprises a plurality of turns making up a layer of pipe wound on the reel across the rull or substantially full width of the reel.

3. "Level winding" refers to the transverse movement of the operational lines laying device or a storage reel across the deck of the vessel. The "level winding means" refers to apparatus for carrying out such movement.

4. "Multiple track straightening or tensioning assemblies" refers to flexible track systems having a plurality of pipe support pads mounted thereon and which are designed for either of the two functions of straightening or tensioning.

5. The term "multiple track straightening/tensioning assemblies" refers to tensioning assemblies which are designed to provide both straightening and tensioning functions in a single pair of such assemblies when positioned on opposite sides of the operational lines array.

6. "Carriage" refers to the support frame structure which is used to mount the operational lines laying device(s) on the vessel and to provide for level winding thereof.

7. "Main reel" refers to a large diameter storage reel which is permanently mounted within the vessel for spooling and unspooling rigid walled pipeline.

8. The notations "s" for starboard, "p" for port, "f" for fore, and "a" for aft have been used for convenience in numerals designations.

Other features and advantages of the multi-reel vessel of this invention will become apparent from the following detailed description of a preferred embodiment.

BRIEF DESCRIPTION OF THE DRAWINGS

FIG. 3 is a schematic side elevation cross-section of a first embodiment of the pipe take-off structure of the present invention;

FIG. 4 is an enlarged starboard side elevation of the operational line reels and the pipe take-off drum of the present invention;

FIG. 5 is a top plan view of the enlarged portion of the multi-reel vessel of FIG. 4;

FIG. 9 is a cross-sectional view taken through the straightening device on line 9—9 of FIG. 8;

FIG. 10 is a cross-sectional view taken through the pipe take-off structure showing the tensioning device of the present invention taken on line 10—10 of FIG. 8;

FIG. 11 is a cross-sectional view of the pipe take-off structure in FIG. 8 showing the pipe alignment clamp taken on 11—11 of FIG. 8;

FIG. 12 is a side elevation view of the pipe take-off drum support frame structure;

FIG. 13 is a front view of the support frame structure of FIG. 12;

FIG. 14 is a top plan view of the support frame structure of FIG. 12;

FIG. 17 is a side elevation view of the straightener device of the FIG. 8 embodiment;

FIG. 18 is a top plan view of the straightener device of FIG. 17 with the sprocket chain tracks removed;

FIG. 19 is a cross-sectional view taken on line 19—19 of FIG. 17 showing the adjustable idler rollers and the operational lines support pads mounted on the sprocket tracks;

FIG. 20 is a front schematic plan view of the first auxiliary reel mounted on the vessel deck showing the level wind transverse positioning;

FIG. 21 is a front schematic view of the secondary auxiliary reel mounted on the vessel deck;

FIG. 22 is a side elevation view of the second auxiliary reel showing details of the reel;

FIG. 23 is a front plan view of the reel of FIG. 22;

FIG. 24 is a tranverse view of the level wind track assembly mounting the second auxiliary reel on the vessel deck;

FIG. 25 is a longitudinal cross-sectional view of the level wind support assembly of FIG. 24;

FIG. 26 is a side elevation view of the structural frame support for the second auxiliary reel;

FIG. 27 is a front plan view of the structural frame support of FIG. 26;

FIG. 28 is a top plan view of the structural frame support of FIG. 26;

FIG. 31 is a longitudinal side elevation view of the level wind tower associated with the main reel;

FIG. 32 is a transverse front elevation view of the level wind tower assembly associated with the main reel;

FIG. 39 is a starboard side elevation general arrangement view of a third embodiment of the multi-reel vessel of the present invention;

FIG. 40 is a top plan view of the multi-reel vessel of FIG. 39;

FIG. 41 is a perspective view of the pivotal ramp and level wind carriage used on the multi-reel vessel of FIG. 39;

FIG. 42 is a fourth embodiment of the present invention showing a multi-reel vessel pivotal ramp and level wind carriage of the type illustrated in FIGS. 39 and 40 fitted with multiple track straightening/tensioning assemblies;

DESCRIPTION OF THE PREFERRED EMBODIMENTS

Figure 2:
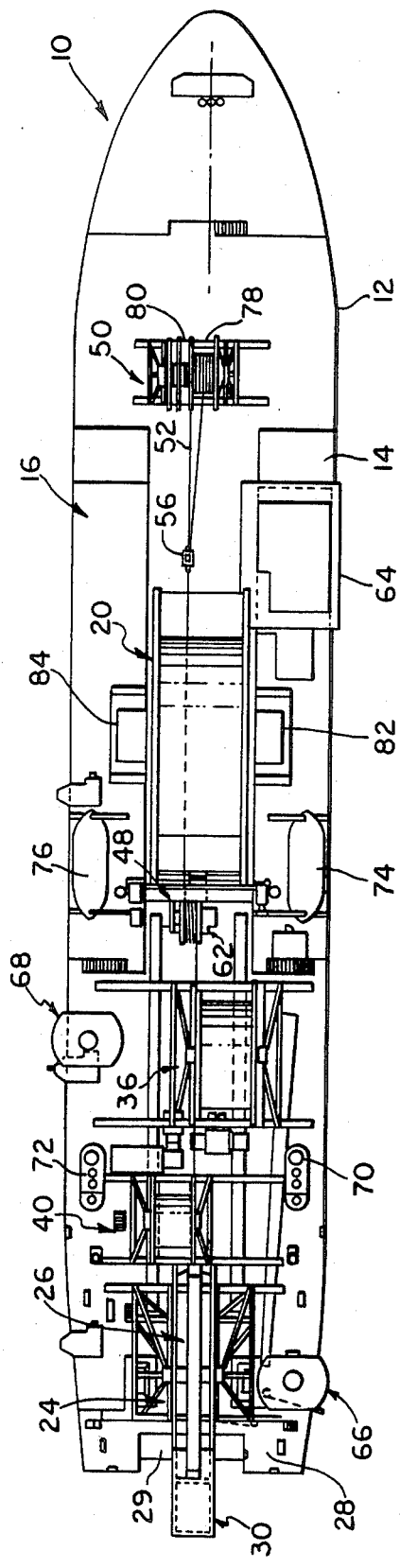
FIG. 2 is a top plan view of the multi-reel vessel of FIG. 1.

The multi-reel vessel 10 of FIGS. 1-5 has a hull 12 which is constructed with starboard and port main reel support structures 14 and 16 which are elevated above the fore deck 16 and the aft deck 18. These reel support structures rotatably support a main reel 20 which is positioned with its axis transverse to the vessel longitudinal axis and which is adapted to provide storage for a series of wraps of rigid walled pipeline which can be wound in single or multiple line fashion. A detailed disclosure of the vessel hull 12 and main reel 20 is set forth in U.S. Pat. No. 4,269,540.

Figure 1:
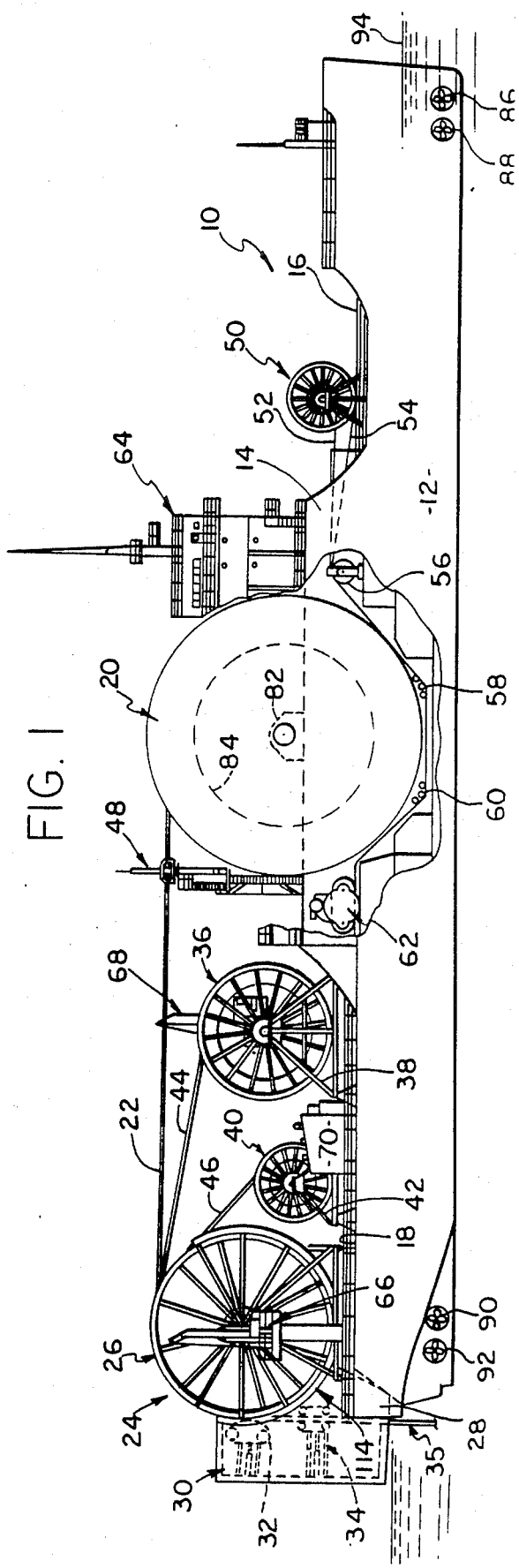
FIG. 1 is a starboard side elevation general arrangement view of a preferred embodiment of the multi-reel vessel.

A single pipeline 22 is shown being unspooled from the vertically disposed main reel 20 onto the pipe take-off assembly 24 which includes as a main element a pipe take-off drum 26 positioned adjacent the stern 28 of vessel 10. The assembly 24 also includes a pipe take-off structure 30 in which a straightening device 32 is supported in forceable contact with pipeline 22. A tensioning device 34 is also included within the pipe take-off structure 30 for the handling of the operational lines array 35. The structure 30 rests in a stern notch 29 when in its vertical 90° position as shown in FIGS. 1 and 2.

A first auxiliary reel 36 is mounted on a reel support frame 38 on the aft deck 18. Also a second auxiliary reel 40 is mounted on a reel support frame 42 which is also supported on aft deck 18. Operational lines 44 and 46 are unreeled from auxiliary reels 36 and 40 simultaneously with the unreeling of pipeline 22 from main reel 20. All of these operational lines are gathered into an initial horizontal juxtaposed configuration at the top of the take-off drum 26 and are maintained in continuous contact with the periphery thereof as the direction of movement of these operational lines is changed from horizontal to vertical at the stern end of the pipe take-off drum 26. In this embodiment the pipe take-off assembly functions as the operational lines laying device.

The contact between the operational lines 22, 44 and 46 with the periphery of the pipe take-off drum 26 results in the linear velocity of layout of all of these lines being equal. Upon changing of the direction of movement from horizontal to any angular pipe take-off position the operational lines are then passed through the straightening means 32 and the tensioning device 34 so that the array of these lines passes downwardly over the stern 28 at nearly a 90° angle as shown in FIG. 1 for deep water layout.

A level wind assembly 48 is provided for aiding the spooling of pipeline onto main reel 20. The level wind feature is not used during unspooling since the pipeline is merely passed through this device so as to restrain the lateral movements. An abandonment and recovery (A/R) cable storage reel 50 is mounted to fore deck 16 for the storage of two cables 52 and 54 which are strung out under main reel 20 by a fixed cable double groove sheave 56 and a series of cable rollers 58 and 60 through a twin drum traction winch 62. The A/R functions of the cables 52 and 54 combined with operation of the traction winch 62 are described below.

A control tower 64 is mounted on the starboard reel support structure 14.

Pedestal cranes 66 and 68 are provided on starboard and port sides, respectively.

As shown in FIG. 2, starboard and port exhaust stacks 70 and 72 are provided for the diesel engine(s) used to power vessel 10. As required lifeboats 74 and 76 are provided on port and starboard decks at midship. The A/R cable storage reel 50 has two drum portions 78 and 80 for storing the two cables 52 and 54 separately.

Rotatable mounting bearings 82 and 84 are shown on either side of main reel 20 in FIG. 2. The main reel 20 has a hub 85 on which the successive turns of pipeline are wound.

The vessel 10 has fore and aft lateral thrusters 86, 88, 90 and 92 positioned below the water line 94 to provide for the dynamic positioning of vessel 10 during unspooling of the operational lines. Thus vessel 10 is capable of dynamically positioning itself.

Operational Lines Laying Device

FIG. 3 shows, in general, the operation of the straightener device 32 which comprises a first track assembly 102 for contacting the operational line array 35. The straightener device 32 has idler rollers described below which can be adjusted to provide for various curvatures in the operational lines array 35. The tensioning device 34 is formed by a second track assembly 104 and a third track assembly 106 which act on opposite sides of the operational line array 35, respectively, in order to provide tension for supporting the pipeline weight which is suspended from the pipe take-off assembly 24.

In order to straighten rigid walled pipeline, force must be exerted against three zones of the pipeline. The periphery of the pipe take-off drum 26 provides the force zone as the straightening device 32 provides the force zone B, within which the curvature must change while the fore track assembly 106 of the tensioning device 34 provides the third force zone C. The pipeline array 35 is then passed downwardly through the pipe take-off structure 30, through the pipe aligner 108 and into the body of water 110. A pipe clamp 112 is also positioned within the pipe take-off structure 30 in order to change the position of the rigid wall pipe 22 with respect to the operational line array 35 over small distances.

The entire pipe take-off structure 30 is mounted on a support frame structure 114 which is in turn rotatably mounted on axle 116 of the pipe take-off drum 26. A hydraulic motor 118 is mounted on a support carriage 120 and is arranged to provide power to a peripheral welded chain track on the curved outside surface of frame structure 114. In this manner the frame structure 114 and the attached pipe take-off structure 30 are rotated relative to the support carriage 120 in order to obtain various angles of pipe water entry. The angle shown in FIG. 1 and 2 is approximately 90° whereas the angle shown in FIG. 3 is approximately 60°. As mentioned above the rotational motion of the pipe take-off structure 30 can be varied between about 18° to about 90°. This permits the pipe take-off structure or operational lines laying device of the present invention to layout operational line array in shallow waters less than 200 ft. depth for which low angles are used or in deeper waters beyond 3,000 ft. for which larger angles of from 60° to 90° are used. The pipe take-off assembly 24 includes the drum 26, the pipe take-off structure 30, the support frame structure 114 and the support carriage 120 with its underlying level wind track assembly. The assembly 24 functions as the operational lines laying device.

Operational Lines

The operational lines 22, 44 and 46 can be a variety of types and for a wide range of functions. At least one of the lines is a rigid walled steel or metal pipeline which is stored on the main reel 20. The other two operational lines 44 and 46 can be also rigid walled steel or metal pipelines or they can be plastic lines, electrical cables, tension support cables, etc. Some or all of these lines can be thermally insulated. Operating examples are that the line 22 can be a 6" o.d. rigid walled pipeline; the line 44 can be of 4" o.d. rigid walled pipeline; and the line 46 can be either a single or dual set of electrical lines. All of these lines are passed over the pipe take-off drum 24 and are also passed through the straightening device 32 and tensioning device 34 even though the electrical line 46 does not require straightening.

Various numbers of operational lines from 2 to about 8 can be laid out from the vessel of subject invention.

Another aspect of the operational lines is that these can be lines which have an outer sheath formed about a number of smaller lines which are bundled within the sheath. The sheath for such bundles of lines can be either continuous walled or in the form of a bundle wrapping. The lines in the bundles can be combined with either single lines or other bundled lines to form operational lines arrays stored on the multi-reel vessel 10. Examples are that a 3 inch or 4 inch o.d. sheath line can have approximately fifteen ½ inch lines within the same bundling sheath. Electrical control lines can also be bundled within a sheath.

The main reel 20 can accomodate rigid walled pipe of from 2 inch to 16 inch o.d. The first auxiliary reel 36 can accomodate from about 2 inch to approximately 9 inch o.d. rigid walled pipeline or other operational lines such as electrical cables or tension support cables.

The second auxiliary reel 40 can be utilized for about 2 inch to about 5 inch o.d. rigid walled pipelines or tension support cables or electrical cables. The diameter range of the rigid walled pipelines which can be stored on and unreeled from the auxiliary reels is a function of the hub diameters of those reels as specified below.

In operating line arrays it is often desirable to utilize the main reel 20 and the first auxiliary reel 36 for rigid walled pipelines and to utilize the second auxiliary reel 40 for the storage and layout of electrical lines and tension support cables.

Also shown in FIG. 4 is the boom 122 of the pedestal crane 68. The elevation cable 124 is also shown attached to the top of the crane arm 126.

Pipe Take-Off Drum

Figure 7:
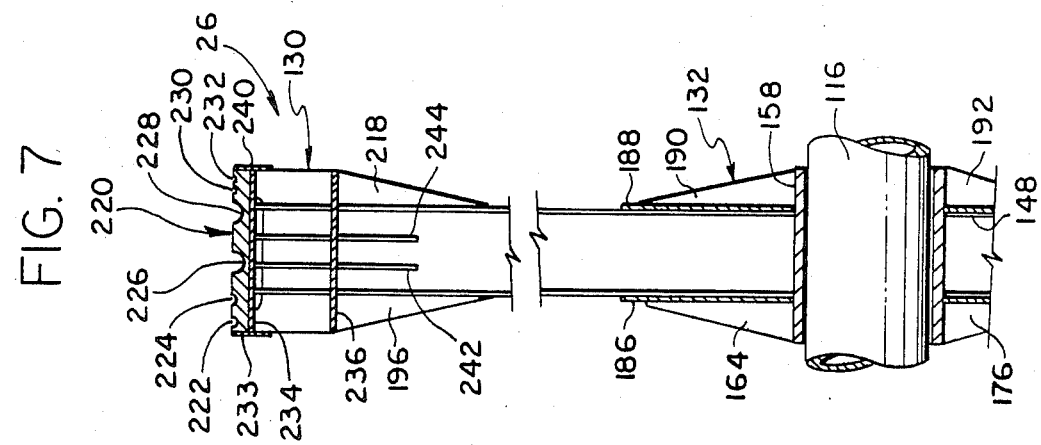
FIG. 7 is a cross-sectional view through a portion of the pipe take-off drum of FIG. 6 taken on line 7—7.
Figure 6:
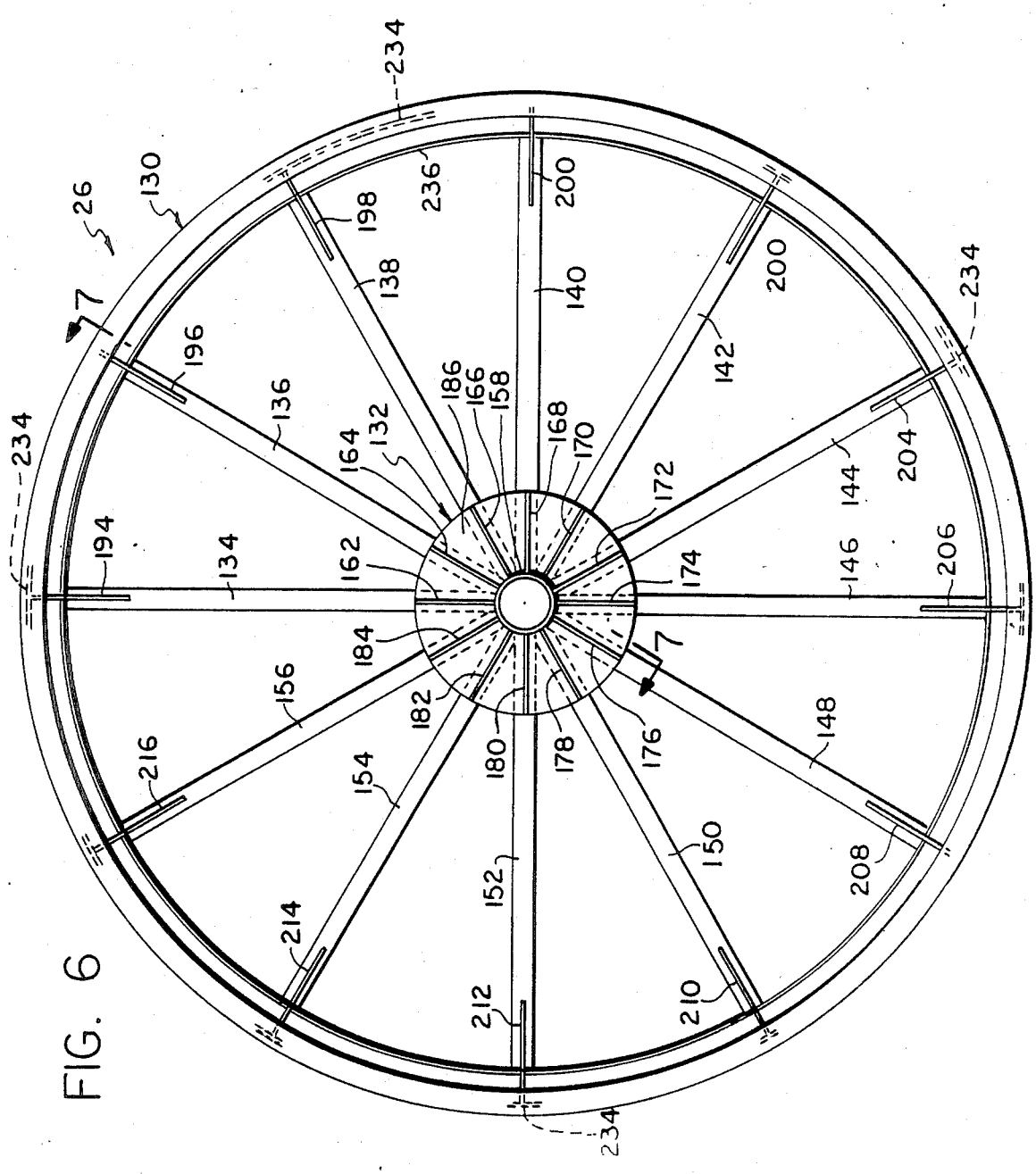
FIG. 6 is a elevation of the pipe take-off drum.

FIGS. 6 and 7 show the outer rim 130 and a central hub 132 of the pipe take-off drum 26. The hub is connected to the peripheral rim 130 by a series of circular spokes 134–156. The connection at the center of the hub is formed by a central cylinder 158 which is mounted on a rotatable axle 116. A series of starboard hub gussets 162–184 are intergrally connected to the cylinder 158 and to a starboard flange ring 186. A similar series of port side construction gussets are connected to cylinder 158 and to a port side flange ring 188 as illustrated by port gussets 190 and 192 in FIG. 7.

The spokes are connected to the rim structure 130 by a series of starboard peripheral gussets 194–216 and by a similar series of peripheral gussets on the port side as shown by gusset 218 for spoke 136 in FIG. 7.

Operational lines supporting means 220 are supported about the periphery of the take-off drum 24 and are constructed as a series of interconnected annular grooves 222–232 to provide for continuous contact with the operational lines during contact thereof during the layout operation. Due to this frictional contact and the interconnected nature of the supporting means grooves the layout velocity of all the operational lines is equalized. The supporting means 220 is mounted on a rim 234 which is integrally connected to the ends of the spokes as shown for spoke 136 in FIG. 7. An internal reenforcement rim 236 is spaced below the outer rim 234 and is connected thereto by the starboard and port peripheral gussets 196 and 218 respectively as shown in FIG. 7.

Starboard and port side rims 238 and 240 are also connected to the outer rim 234 and extend upwardly on either side of the operational lines supporting means 220. The grooves 222–232 form indented configurations which extend partially around the outer diameters of the operational lines placed in the same during the layout operation. The number and sizes of the grooves can be varied depending on the particular operationals lines requirements of a given job. For this purpose, the support means 220 is constructed in removable arcuate segments in order to accomodate varying numbers and diameters of operational lines.

Also shown in FIG. 7 are the internal gussets 242 and 244 which are representative of the series of such gussets provided for interconnecting the inner and outer rims 234 and 236 with the terminal portions of the drum spokes.

The diameter of the pipe take-off drum 26 is chosen so as to layout the operational lines with residual ovality lower than the maximum limits specified by the international certification organizations. These ovality limits are not necessary for all offshore construction projects so that specific pipelines can be laid without observing such limits.

It has been found satisfactory to size the drum 26 radius with respect to the pipeline diameter. The wall thickness of the pipeline is also of interest with respect to the pipe diameter. A satisfactory set of relationships for sizing the drum 26 radius is:

$$R \geqq 18D \qquad (1)$$

where R is the drum 26 radius measured to the pipeline center in given units; and D is the pipeline outer diameter measured in the same units. A correlated relationship of pipeline diameter to pipeline wall thickness is expressed by:

$$D/T < 30 \qquad (2)$$

where D is pipeline outer diameter in given units and T is pipeline wall thickness in the same units.

A preferred relationship is:

$$R \geqq 20D \qquad (3)$$

where R and D are as above defined.

Straightening And Tensioning Assemblies In General

The pipe take-off assembly 24 generally described in FIG. 3 is shown with greater detail in FIGS. 8-11. The pipe take-off structure 30 and support frame structure 114 are integrally constructed with a top port side radial frame member $250_p$ which extends from its connection with a bearing sleeve mounted on the pipe take-off drum axle 116 beyond the periphery of the drum 26 and an aft beam $252_p$ which is perpendicularly connected to that top side frame member at its stern end. An intermediate frame member $254_p$ is connected to the end of a radial frame member $256_p$ which has the other end thereof intergrally connected to the bearing sleeve $257_p$ (FIG. 15) on the drum axle 116. A third radial beam $258_p$ is also connected to the sleeve $257_p$ about drum axle 116 and extends beyond the periphery of drum 26 in order to form the fore frame section of the pipe take-off structure 30. Arcuate cradle members $260_p$ and $260s$ are connected between the starboard and port radial frame members 250, 256 and 258 and are designed to rotate with these members about the periphery of drum 26. The frame members 250p–260p form the port side of the structural support for pipe take-off structure 30. A corresponding starboard set of structural members are connected to the above described port side set by transverse frame members 262, 263, 264, 266, 267, 268, 269, 270, 272, 273, 274, 276 and 278 which are interconnected at the framing juncture points between the starboard and port frame members (in clockwise positioning from lower right).

Starboard and port sets of parallel structural guides are provided for adjustably mounting straightening device 32 and the two halves of tensioning device 34 within the pipe take-off structure 30. Port structural guide set 280p has three parallel internal guide frames 282p, 283p and 284p which are connected by the aft end thereof to the transverse frame members 272, 273 and 274, respectfully. The fore ends of the internal guide frames 282p, 283p and 284p are connected to matched exterior side frame members illustrated by frame 285p via spacers illustrated by 286p in FIG. 9. This side frame 285p is, in turn, connected to arcuate cradle member 260p.

A similar port set of parallel internal guide frames 287p is provided for the tensioning device 34 by guide members 288p, 289p and 290p which are connected at the aft end thereof to transverse members 267, 268 and 269 and to port and starboard side spacer members as shown by members 292p and 292s (FIG. 10). A matching set of internal guide frames 288s, 289s and 290s are positioned on the starboard side of the pipe take-off structure 30 for guiding the aft positioned second track assembly 104 which forms part of the tensioning device 34. These internal guides are reinforced by matched exterior side frame members illustrated by frames 294p and 294s in similar fashion to that described above for the straightening device 34. The third track assembly 106 which forms part of the tensioning device 34 is similarly set in internal guide frames 296p which is formed by parallel structural members 298p, 299p and 300p which are affixed to the side frame members as shown by frame 294s (FIG. 10) and then to arcuate member 260p. Side spacer members 302p,s and 304p,s, respectively, are provided for positioning the middle internal guides 299s, p. A starboard set of structural guide members 298s, 299s and 300s, are also provided for mounting the third track assembly 106. The lower guide frames 300p and 300s are spaced from matched exterior frames by similar spacers.

The straightening device 32 is formed by the first track assembly 102 and the hydraulic positioning rams 306p and 306s which are positioned on the port and starboard sides of the main track carriage 308, respectively. Guide rollers 310p, 311p and 312p are rotatably mounted on the port side of carriage 308 in a position to contact the internal guide frames 282p 283p and 284p, respectively. The operation of the rams 306p and 306s permit both sliding, S1, and pivotal, S2, adjustment of the first track assembly 102 with respect to the upper and lower positioned internal guide frames 282p, s, and 284p, s. The hydraulic rams 306p and 306s are pivotally connected by fixed ears 314p and 314s to the aft structural spacer member 273. The hydraulic ram pistons 316p and 316s are also pivotally connected to the port and starboard sides of the main carriage 308, respectively, via connections 317p and 317s (FIG. 9). Sprocket gear wheels sets 318 and 320 are rotatably mounted in bearings on the top and bottom ends of the main carriage 308 for supporting a corresponding series of track mechanisms 322. Adjustable sprocket gear sets 324 and 326 are mounted on the aft side of the main carriage 308 on hydraulic cylinder mounts 325 and 327, respectively, for additionally supporting the series of track mechanisms 322.

The series of track mechanisms 322 are further described below with reference to FIGS. 9, 10 and 17-19. The first track assembly 102 has an idler assembly generally designated as 328 which provides a series of idler roller sets which force the flexible chain tracks 322 into contact with the operational lines array 35. Further details of the operation of the first track assembly 102 and the idler roller assembly 328 are set forth below. Jacuator adjusters 329 are provided to manually change positioning of the rollers to establish selected curvatures. The mounting and operation of the straightener device 32 permits various curvatures to be formed by the flexible sets of tracks 322.

The second track assembly 104 which, in part, comprises the tensioner device 34 is also positioned by hydraulic rams 330p and 330s which are positioned on either side of the second track assembly main carriage base 332. Port side guide rollers 334p, 335p and 336p are rotatably mounted on the port side of the main carriage member 332 (shown in FIGS. 33 and 34) for engaging the parallel structural guide members 288p, 289p and 290p, respectively. Starboard guide rollers 334s, 335s and 336s are provided for the starboard side of the main carriage 332 and for contacting the corresponding structural guides 288s, 289s and 290s.

A similar set of shorter rams 338p and 338s are provided for the third track assembly 106 which forms the second part of the tensioning device 34. The third track assembly is positioned by these rams within the port and starboard structural guide sets 298s, p, 299s, p and 300s, p. Guide rollers 340p, 341p and 342p are positioned on the port side of main carriage member 344 for providing rolling contact along the port guide frame sets 298p, 299p, and 300p.

Figure 34:
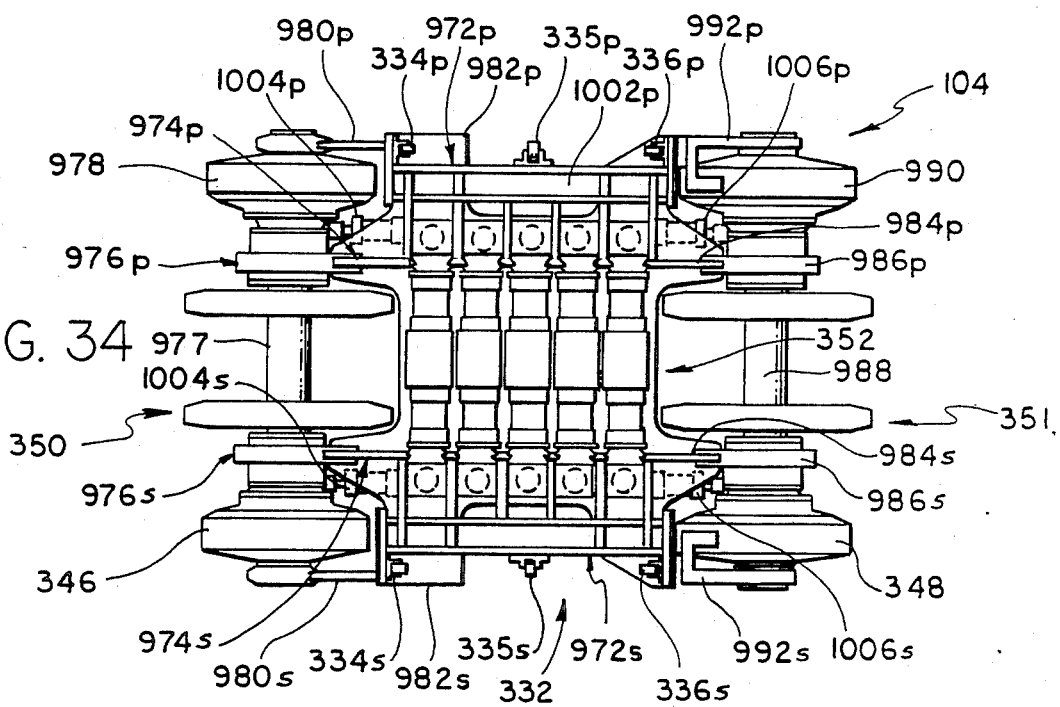
FIG. 34 is a top plan view of the tensioner assembly of FIG. 33 with the multiple tracks removed.

Hydraulic motors 346s and 348s are provided for the starboard side of track assembly 104 in order to drive a set of flexible chain tracks 349 which are mounted on corresponding sets of driven sprocket gears 350 and 351, respectively, shown in FIG. 34. An idler roller assembly 352 is provided for the set of tracks 349 and corresponds in relative position to the idler assembly 328 for the first track assembly 102. FIG. 10 shows representative adjustment cylinders 353s, p which permit variation in applied force for the idler roller assembly 352. The opposing operational lines support pads pairs 354a and f are positioned on either side of the operational lines array 35. Also configured backup rollers 355a and 355f are shown in phantom as used for assemblies 104 and 106.

Similar guides and idler assemblies are provided for the third track assembly 106. The detailed description of track assemblies 104 and 106 is set forth in connection with Figures 33-35, below.

An alternate track assembly arrangement for the third track assembly 106 is to mount the hydraulic rams 338p and 338s between the main carriages 332 and 344 of the two opposing track assemblies 104 and 106. It is necessary to provide for imposition of different forces on the operational line array by these two opposed track assemblies since track assembly 106 provides the third force zone of a three zone straightening system as described with respect to FIG. 3. The force exerted at the third zone for straightening is of course separate from the tensioning force which is exerted through any alternate hydraulic rams connected between the main carriages. In this modification the hydraulic rams 330s and 330p would provide the straightening force exerted by assembly 106.

Other features of the pipe take-off structure 30 are the pivotally connected working floor panels 356 and 358 which can be adjusted with respect to various operating positions of the cradle member 260p. Also a lower winch housing 360 and A/R cable winch 362 are attached to the bottom side structural members 346s and 364p on diagonal aft beams 363p, s which are mounted at the bottom ends thereof on base side beams 365p, s. Fore positioned diagonal beams 366p, s are also mounted on the base side beams 365p, s.

A pipe clamp 367 is positioned within the operating lines array opening 368 which is formed by an open box structure 369 constructed of I beams 369a,f,p,s. A pipe aligner double clamp set 370 is pivotally attached by a connections 372s and 372p to the interior of the frame members constituting the pipe take-off structure 30. This pipe aligner clamp set has two hydraulic rams 374 and 376 which are coordinated to operate a clamp about the rigid walled pipe lines in order to align the same within the operational line array 35. The two hydraulic rams can be utilized for positioning and aligning all of the rigid walled pipes within the operational lines array.

Pipe Take-Off Support Carriage

The support carriage 120 of FIGS. 12-14 has a starboard base longitudinal beam 390 which is connected to fore and aft transverse beams 392 and 394. The port side of these structural beams are connected to a port frame member 396 to complete a generally rectangular frame base construction. Additional intermediate base frame members 398 and 400 FIG. 13) are provided parallel to the starboard and port beams 390 and 396. Upon this base frame a starboard bearing housing 402 is supported by a series of six structural members 404, 406, 408, 410, 412 and 414 are secured at the bottom ends thereof to the above-described frame base members. The bearing housing 402 provides rotational support for the axle 116 of the pipe take-off drum 26. A similar port side bearing housing 415 is supported by the six port side structural members 416-426 which are secured at the lower ends thereof to the frame members above described.

The bearing housings 402 and 415 are separated by a distance sufficient to accomodate the drum 26 and the support frame structure 114. A gusset frame 426 is also positioned between the bearing collars 402 and 415 at the fore end of carriage 120 and contains two hydraulically operated locking pins 428 and 430 for engaging openings in the periphery of the cradle members 260p and 260s in order to secure the same against rotation when mounted between the bearing housings. This gusset frame 426 is constructed of vertical members 427p and 427s and diagonals 429p and 429s. The vertical lengths of the structural supporting members 404-414 and 416-426 are sufficient to accomodate the pipe take-off drum 26.

Also provided on carriage 120 are a series of reinforcement gussets 432, 434, 438 and 440 as shown immediately under bearing collar 402. A similar set of reinforcement gussets denoted as 442 are provided for the port bearing collar 414.

Carriage 120 is mounted for transverse level winding movement of a support frame by roller caster sets 444 and 446 which are positioned on the fore structural member 392. A similar set of roller casters 448 and 450 are connected to the aft base structural member 394.

Additional reenforcing base frame members 452, 454 and 456 are provided as shown in FIG. 14 in order to provide additional rigidity for the base frame. Also a cross beam reenforcement assembly 458 is provided within the gusset bracket 426. Openings 459s and 459p are provided in diagonal supports 429s and 429p for accomodation of hydraulic motor drive gears as described for FIG. 16, below, for operational rotation of the support frame structure 114.

Figure 15:
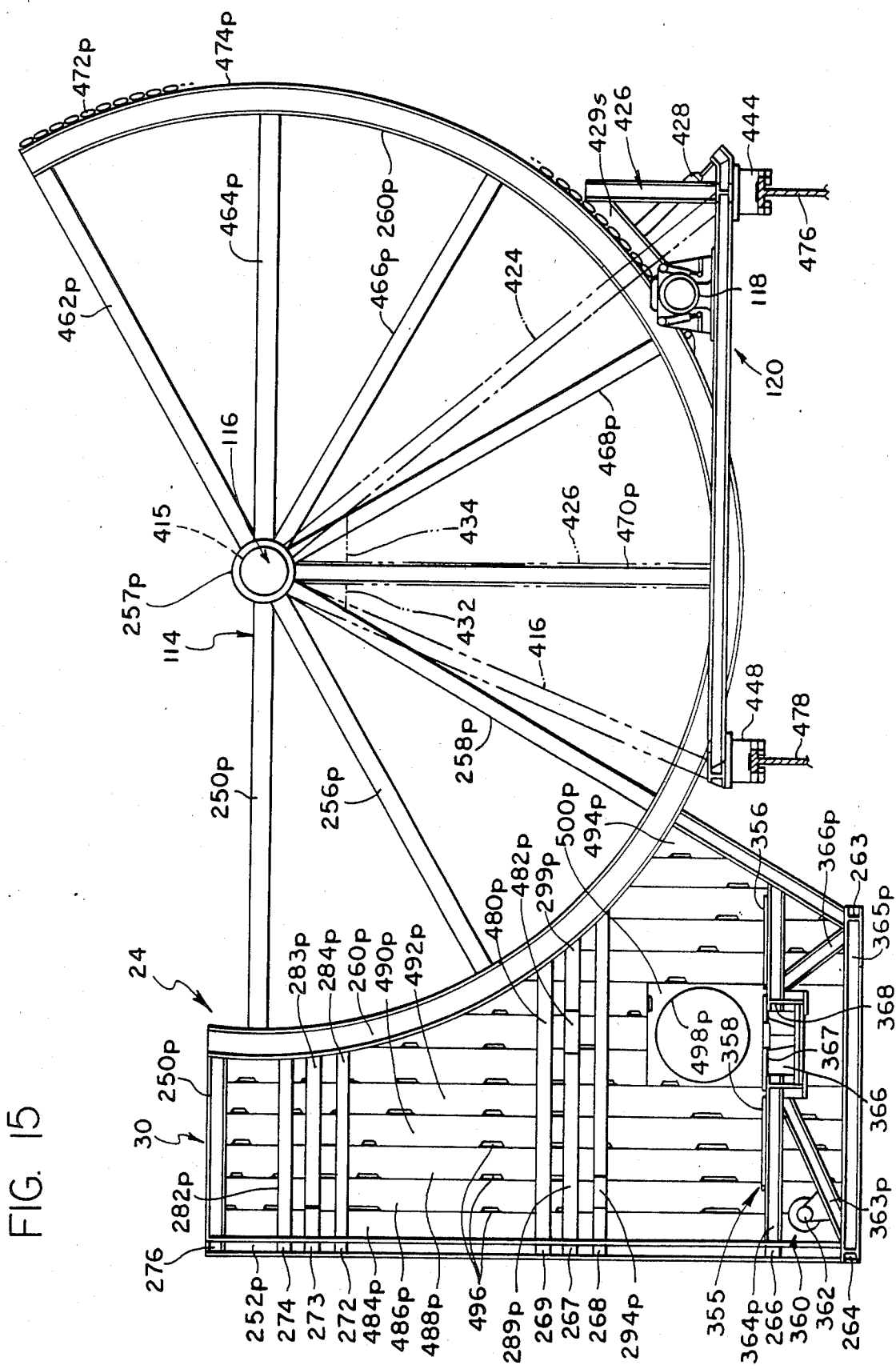
FIG. 15 is a partial cross-sectional side elevation view of the pipe take-off assembly without the take-off drum of the present invention.

The pipe take-off structure 30 and its associated cradle support frame structure 114 of the pipe take-off assembly 24 are shown in FIG. 15 with drum 26 removed. The resulting view is in the nature of a cross-sectional elevation taken on line 15—15 as shown in FIG. 5. The configuration of the frame members of the take-off structure 30 as attached to the arcuate cradle frames 260s,p is shown by this FIG. 15. Structure 30 houses the straightening device 32 and the tensioning device 34 as described with respect to FIG. 8 above.

Frame members within this take-off structure 30 can be extensions of the spoke members 250p, 256p, and 259p which are connected by their radial innermost ends to the bearing sleeve 257p which is rotatably mounted on axle 116. A radial spoke member 462p is integrally affixed to bearing sleeve 257 p on the opposite side from its connection with frame spoke member 256p. The radial outer end of spoke member 462p is connected to the upper fore end of arcuate frame member 26op. In a like fashion spoke frame member 250p forms an integral connection with the arcuate frame member 260p on its radial outermost end. Additional frame spoke members 466p, 468p and 470p are provided between the collar 257p and the arcuate frame member 260p. A sprocket chain track 472p is affixed to the peripheral rim 474p of cradle frame member 260p. The hydraulic motor 118s is affixed to the support carriage 120 and is fitted with a drive sprocket gear (FIG. 16) which interfits with the sprocket chain 472s in order to rotate the frame structure 114 about the axle 116. The frame structure 114 and the attached pipe take-off structure 30 are thus rotated about axle 116 which is supported by the support carriage 120 and the brace members mounted on the starboard and port sides thereof as described with respect to FIGS. 12-14 above. Thus the support frame structure 114 fits within the space between the bearing collars 402 and 415 in FIGS. 13 and 14 on either side of the drum 26. The port side support braces 416, 426 and 424 of the support carriage 120 are shown in phantom lines.

Level Wind Feature Of Pipe Take-Off Assembly

The support carriage 120 is mounted on transverse support beams 476 and 478 which are affixed to the main deck 18 of vessel 10. These are "T" cross-section beams and the roller supports 444 and 448 are positioned under the carriage 120 are designed to fit under the top side edges of the "T" configuration of these support beams in order to permit transverse movement of carriage 120 together with the supported pipe take-off structure 30 and the frame structure 114. The configuration of the roller brackets is such that rollers are disposed both on the top surface and below the top portion of the "T" support beam whereby the pipe take-off assembly will not be rolled or pitched off from the support beams 476 and 478 in heavy seas.

Also shown is the fore gusset frame 426 within which is mounted the hydraulic cylinder pin 428 which is designed for entry into openings on the starboard rim 474s of the cradle member 260s in order to prevent rotation of the same from a given fixed working position. A matching cylinder pin 430 is provided for entering openings in the port cradle frame 260p.

Also shown in FIG. 15 are the guide frames 282p, 283p and 284p which provide tracks for the straightener device 32. The intermediate guide frames 283p and 283s are connected by spacers to exterior frames shown as 285p and 285s in FIG. 9. These exterior frames serve to transmit force from the cross brace 273 forward to the arcuate frame members 260p and 260s when the hydraulic rams 306p and 306s are exerting force on the main carriage 308 of the straightener device 32.

In similar fashion exterior frame 480p and an intermediate exterior frame 482p are associated with structural guide set 287p . The intermediate frame pair 482p and s provide for the transmission of force exerted by hydraulic rams 330p and 330s to arcuate cradle members 260p and 260s.

Also shown in FIG. 15 are a series of plating panels 484p, 486p, 490p, and 492p which are successively forward positioned up to a triangular panel shape member 494p, which is located in the fore position of the pipe take-off structure 30. A series of openings 496 are provided at locations along the edges of the panel members in order to provide interior lighting for the pipe take-off structure 30 which is of course also lit by known marine lighting devices.

An entry port 498p is provided as shown in mounting panel 500p. This port is used for gaining access to the work floor area 355 via a stair set mounted on carriage 120 (not shown). The pivotal working platforms 356 and 358 are shown in their horizontal down positions in FIG. 15. The subfloor base frame 365 is shown spaced below the support floor frame 364p and the interconnected diagonal braces 363p and 366p.

Pipe Take-Off Structure Rotation

Figure 16:
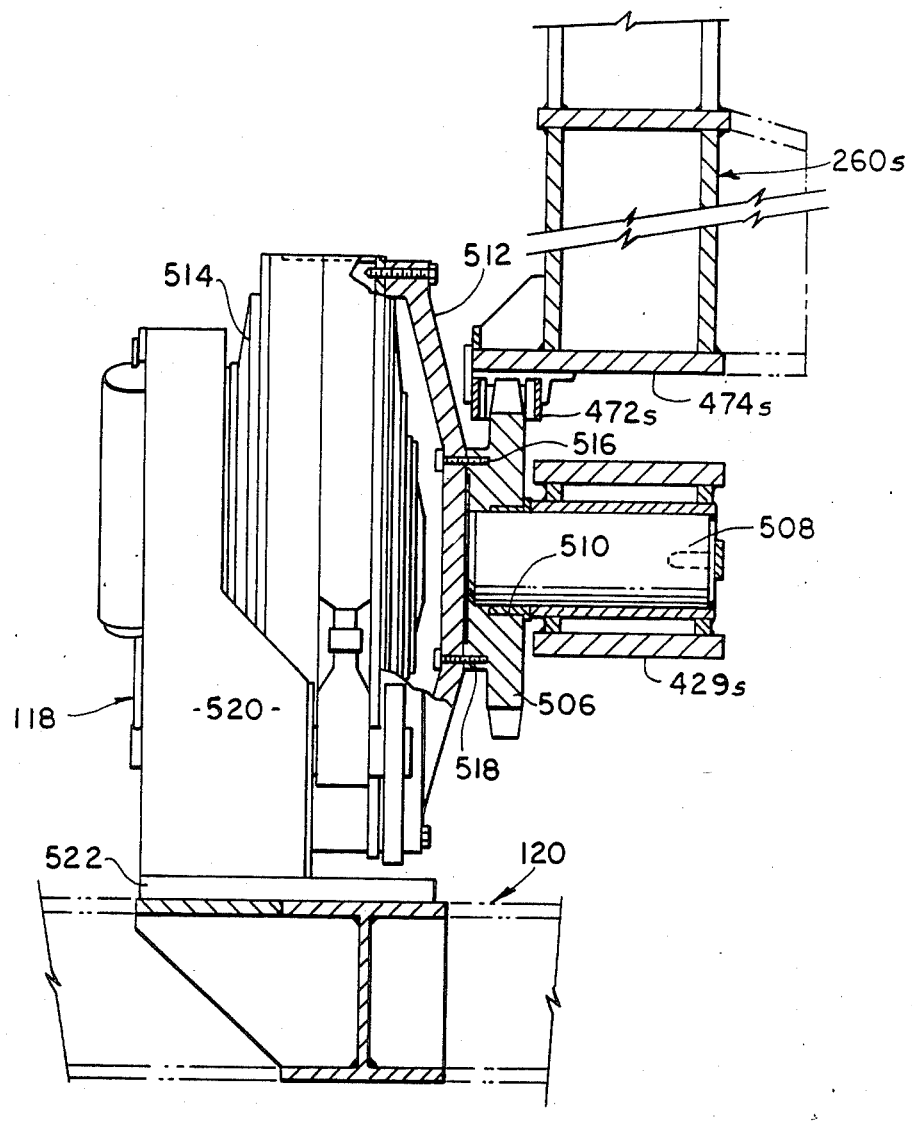
FIG. 16 is a partial cross-sectional view through the hydraulic power drive motor by which the pipe take-off structure is rotated to establish different water entry angles for the pipeline array.

The support frame structure 114 of the pipe take-off assembly 24 is rotated into various angular positions by hydraulic motor 118 as shown in FIGS. 15 and 16. A sprocket chain gear 506 interfits with the sprocket chain 472s which is in turn mounted on cradle rim 474s. In the preferred embodiment described herein, only a single hydraulic motor 118 is employed. If desired this hydraulic motor shown in the starboard position with respect to the frame structure 114 can be balanced by a similar hydraulic motor also mounted on carriage 120 on the port side thereof. In this event a second sprocket chain is also utilized on the port edge of the rim 474p.

As shown in FIG. 16 the sprocket gear 506 is fitted with a mounting shaft 508 which is integrally attached within gusset frame member 429s of the gusset frame 426. A bushing 510 provides for rotation of sprocket gear 506 about the mounting shaft 508.

The sprocket mounting adapter 512 of hydraulic motor 118 is designed to rotate within the stationary base 514 to thereby transmit rotational force to the sprocket gear 506 which is interconnected thereto by a series of bolts shown as 516 and 518. The hydraulic motor front bracket 520 is integrally affixed to a pump base 522 which is in turn integrally connected to the carriage frame 120. A useable hydraulic motor 118 is a Hagglunds Series 80, Model No. 8385.

The angular rotation of the frame structure 114 about axis 116 in turn controls the position of the operational lines exit port with respect to the stern 28 of vessel 10. This angular positioning controls the water entry angle of the operational lines array 35. Higher entry angles up to 90 degrees are used for deep water layouts. The hydraulic cylinder pins 428 and 430 secure the various set positions.

STRAIGHTENING AND TENSIONING DEVICES IN DETAIL

Figure 8:
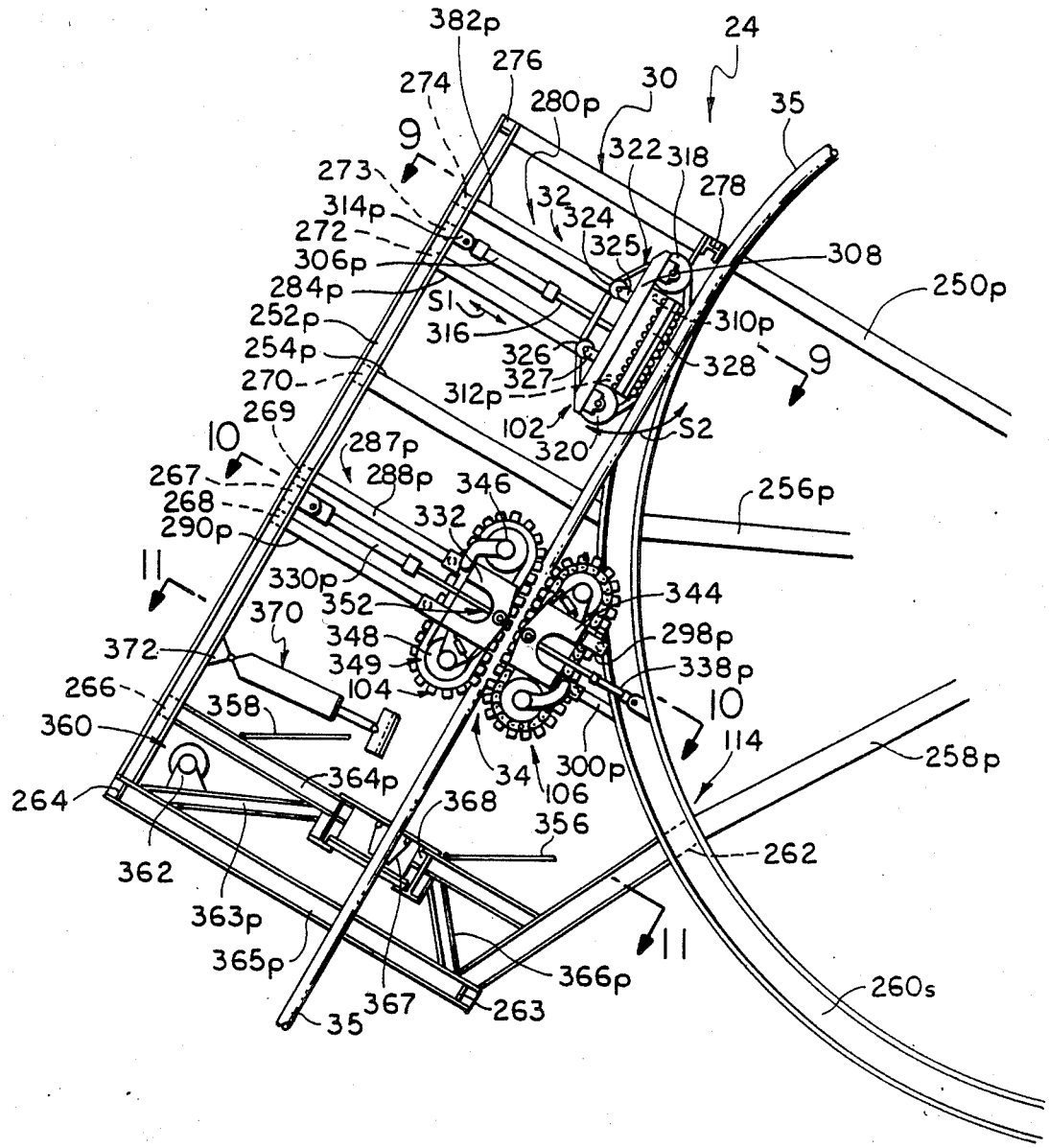
FIG. 8 is a schematic side elevation view of the FIG. 3 embodiment of the pipe take-off structure showing the straightening and tensioning devices in greater detail.

The straightening device 32 shown and described in reference to FIG. 8 can be constructed with the track assemblies 102 arranged in one of several configurations. As shown in FIG. 8, the track tension idler sprocket gears 324 and 326 can be supported on adjustment mechanisms 325 and 327 as shown for the track sets 322. It is also possible to provide the tension in track sets 322 by other slightly modified mechanical configurations as described below with respect to FIGS. 17, 18 and 19.

The tracks 322 can be arranged with operational line suppor pads extending across two or three sprocket chains so that the operational lines array is contacted at a given position by a single support pad. Alternately, separate support pads can be mounted on each of two or three sprocket chains in order to contact single operational lines or pairs of lines as shown in FIG. 10.

The first track assembly which contacts the operational line array 35 after it passes over the pipe take-off drum 26 should be capable of forming and maintaining an adjustable curvature in order to provide a straightening function for various sizes of rigid wall pipes in an operational lines array.

A preferred configuration of a straightener/tensioner track assembly which can be used for assembly 102 and, with some modification to provide for adequate hydraulic power, also for assemblies 104 and 106 is shown in FIGS. 17-19. In this configuration the sprocket chain tension sprocket gears 324 and 326 are mounted by fixed brackets 530 and 532. The tension is exerted on the operational lines track sets 322 by the mounting sprocket gear sets 318 and 320 which are integrally mounted on axles 534 and 536, respectively, on either end of the assembly 102. These axles 534 and 436 are common to the sprocket gears 538, 539 and 540 which are mounted on axle 534 and the sprocket gears 542, 543 and 544 which are mounted on axle 536 and are transversely spaced from one another. Axle 534 is mounted in a bearing housing 546 on the starboard side and in a bearing housing 548 on the port side. These bearing housings 546 and 548 are adjustable linearly away from the support carriage base 308 by means of hydraulic cylinders 550 and 552, respectively. The bearing housings 546 and 548 are slidably mounted in fixed C brackets 554 and 556, respectively. Identical bearing housings 558 and 560 are provided on the opposite end of the main housing 328 for rotatably mounting axle 536 and these are slidably adjusted by hydraulic cylinders 562 and 564, respectively, within the C brackets 566 and 568.

The C brackets are slidably mounted on extensions 570, 572, 574 and 576 of the starboard side plate 578s and the port side plate 578p. Reenforcement studs 580, 582, 584 and 586 are also provided for mounting the C brackets.

The operation of the hydraulic cylinders 550, 552, 562, and 564 permit tensioning of the sprocket chain track assembly 322 about the main track carriage frame 328. This frame consists of sides 588 and 590 which are joined to the starboard and port side walls 578s and 578p in order to complete a box frame structure. Starboard and port side mounting brackets 592s and 592p are also attached to the main frame 328.

Guide roller assemblies 310s, 311s and 312s are shown attached to the mounting bracket 592s. Similar guide roller assemblies 310p, 311p and 312p are mounted on the port side bracket 592p. Guide roller assembly 310s contacts the frame guide member 282s which can be projected from FIG. 8. Similarly roller guide assembly 311s contacts frame guide 283s and roller guide 312s contacts frame guide member 284s. The port side roller assemblies 310p, 311p and 312p contact the corresponding port side frame guide members 282p, 283p and 284p as shown in FIG. 8. Thus, movement of the track assembly 102 toward and away from the pipeline array 35 is provided by operation of the hydraulic rams 306s and 306p. The piston rod connection mounts for the hydraulic rams are denoted as 317s and 317p and are formed in the side walls 578s and 578p and also in the mounting brackets 592s and 592p in a centrally disposed location close to the pipeline contacting position.

The use of only two guide roller assemblies on either side of the track assembly 102 which are spaced from the force plane in which the hydraulic rams 306s and 306p function permits a slight rocking motion of the assembly as required to adjust to various pipeline diameters and array configurations. This rocking motion $S_2$ is in addition to the primary sliding, linear movement $S_1$ of the track assembly 102 due to operation of the hydraulic rams 306s and 306p. These motions are shown by the double headed arrows in FIG. 8.

As shown in FIGS. 18 and 19 three pairs of main sprocket wheels or gears are positioned laterally across the track assembly 102 and are spaced from one another along the axles 534 and 536. Each of these pairs of sprocket gears supports a separate sprocket chain 596, 598 and 600 as shown in FIG. 19. The sprocket chain 596 when placed about the track assembly 102 then contacts sprocket gears 538 and 542 (as well as idler sprocket gears 324 and 326 on the stern side when mounted as shown in FIG. 8). The fore side of the track assembly 102 contains a series of nine curvature idler rollers 602 which are slidably mounted within the box frame of the main carriage 308. The mounting arrangement for the curvature idler set 602, as well as for the parallel idler sets 604 and 606, is affected by placing partition walls 608 and 610 parallel to the side walls 578s and 578p within the box frame in order to divide the same into three compartments. The curvature idler sets 602, 604 and 606 are then slidably mounted within these three compartments FIG. 19 shows one of the curvature idlers in the 602 set on a mounting frame 612 which is slidably mounted between side wall 570 and partition wall 608. The mounting frame 612 is connected to an adjustment screw 614 which is in turn controlled by a jactuator 616 which can be adjusted from a side port 618 in order to move the carriage 612 relative to the main carriage housing walls. These walls 570, 608, 610 and 572 together with the spacer walls 620 and 622 form the curvature idlers support assembly.

Each of the idlers in the idler sets 602, 604 and 606 is similarly provided with an adjustment screw and a jactuator for adjusting the position of the idlers in order to contact the operational lines array with the pipeline support pads 624, 626, 628, 630, 632 and 634 as shown in FIG. 19. This individual adjustability feature for each idler roller in the roller sets 602, 604 and 606 then permits various curvatures to be established for each of the operational lines in the array.

If desired the pipeline support pads 624–634 can be joined into a single transverse pad extending across the width of the operational lines array 35 when different curvatures between the operational lines are not needed.

The set of jactuators 636 which adjust the position of the middle set of curvature idlers 604 are offset from the jactuator set 638 of which jactuator 616 is shown in FIG. 19 and the jactuator set 640 which adjusts the curvature idler set 606. The reverse positioning of the jactuator operators 642 and 644 on the middle set of jactuators 636 then permits adjustment of this middle set of jactuators through the openings 646 and 648. The two outer sets of jactuators are adjusted by the operators 650 and 652 as shown in FIG. 19.

Straightener/Tensioner Device Variability

A number of degrees of flexibility are provided by the straightener/tensioner device 102 as described herein with respect to FIGS. 8–10 and 17–19. The more significant of these are as follows:

1. The idler assembly 10 with its individually adjustable curvature idlers permits incremental changes in curvature of the operational lines within the array 35. As the pipeline array comes off the drum 26 these idlers and their associated tracks establish the adjusted curvature need for controlled straightening.

2. The mounting of the track assembly 102 on the parallel guide frames 282s and 282p and on 284s and 284p for reciprocation by the hydraulic rams 306s and 306p via the roller pairs 310 and 312 mounted on either side of the track assembly 102 provides for both a reciprocal movement denoted by the double headed arrow Sl and a slight rocking arcuate motion denoted by double headed arrow S2 (FIG. 8).

3. The intermediate roller pair 311p and 311s provide additional sliding contact within the pipe take-off assembly 30.

4. The sprocket chain sets 596, 598 and 600 can be easily removed by retracting the tensioning hydraulic cylinders 550 and 552 as well as the opposing cylinders 562 and 564 in order to remove the tension from the sprocket chains. These chains may then be removed by removal of one of the linking pins while the main carriage 328 remains in its position within the pipe take-off structure 30. In this manner the pipe support pads 624–634 can be exchanged and/or replaced in order to accomodate various operational line arrays having different diameter operational lines therein.

5. It is also possible to operate the track assembly 102 with varying degrees of curvature for contacting the pipeline arrays by reason of the adjustments provided by the jactuator sets 636, 638 and 640. This is particularly significant with respect to use of two of the straightener/tensioner assemblies 102 as the track assemblies for tensioning device 34.

The arrangement of the pipe straightener device 32 with respect to drum 26 provides the two pipe straightening force zones A and B as described with respect to FIG. 3. The placement of the track assembly 106 below the two force zones A and B permits the use of track assembly 106 to provide a third force zone C. In this manner the drum contributes zone A and the need for a fourth track assembly in order to provide one of the force zones is eliminated thus reducing the capital cost of the pipe take-off assembly 24.

Another advantage of the straightener device 32 and the tensioning device 34 in the locations shown in FIGS. 3 and 8 with respect to drum 26 is that only a few mechanical devices are required for providing both pipe straightening and tensioning. This configuration permits the contacting of the operational lines array 35 by the straightening device 32 prior to engagement of the array by the tensioning device 34. This permits the proper functioning of the tensioner device 34 which must be operated in order to have the same force exerted on both sides of the operating lines array 35. When the zone B primary pipeline straightening force is exerted by one of the two tensioning devices this equalization of tensioning force is more difficult to control since zone B balances the zone A and B forces. Therefore, it is preferred and operationally significant to have the pipeline array contacted by the straightener device 32 as it is unspooled and taken off the pipe take-off drum 26 prior to contact with the tensioner device 34.

AUXILIARY REEL STRUCTURE

Auxiliary reel 36 has a range of transverse positions across the main deck 18 of vessel 10 from the port side 12p to the starboard side 12s as shown by the double headed arrow 660 in FIG. 20 between the port side position illustrated in full lines and the starboard position illustrated in phantom lines. The transverse movement from the port side to the starboard side and viceversa is termed the level wind positioning of reel 36. For this purpose a level wind track assembly 662 is provided for this auxiliary reel. The reel is supported on the level wind track assembly by the reel support structure 38 which is formed by two A-frames 664 and 666 which are described in detail below.

Also shown in FIG. 20 is the pedestal crane 68 which is mounted to main deck 18 above the hull 12 and which is provided with an operating platform 668.

The second auxiliary reel 40 is similarly mounted on main deck 18 on a level wind track assembly 670 which provides for transverse movement of reel 40 between the port position illustrated in solid lines and the starboard position illustrated in phantom lines as indicated by the double headed arrow 672. The diesel exhaust ports 70 and 72 are also shown on either side of the second auxiliary reel 40. The reel 40 is supported on the level wind track assembly 670 by two support frames 674 and 676 which will be described in detail below.

Auxiliary reel 40 and its associated level wind track assembly 670 and the associated frame supports 674 and 676 are illustrated in FIGS. 22–28. The reel 40 is constructed with a central hub 678 and an outer storage drum 680 on which a single or multiple wound operational line is reeled for storage. The outer reel flanges are illustrated in FIG. 22 by the starboard side flange 682 which has a continuous sprocket chain 684 affixed to the periphery thereof. A series of spoke frames 686–710 are provided for connecting the inner hub 678, the storage drum 680 and the side rim 682 in order to form the reel 40. As shown, alternate frames spokes are connected toward the center of the central hub 678 with the intermediate frame spokes positioned toward the outer edge of the central hub. Additional frame spokes are aligned with the frame members of the starboard frame 676 and are thus not shown. Also a reenforcing framing is placed inside the storage drum 680 when desired.

As shown in FIG. 23, the side rim 682 is spaced from the corresponding port side rim 712 by the width of the storage drum 680. The reel 40 is mounted on an axle 714 which is provided with axle bearing housings 716s and 716p. The starboard and port axle bearing housings are, in turn, mounted on the reel frames 674 and 676 respectively. The starboard reel frame 674 is formed by triangularly arranged frame members 718s, 720s and 722s which are inclined from the frame base 724 upwardly toward a pedestal plate 726s which provides the foundation for the axle bearing housings 716s as shown in FIG. 23. This exterior set of slanted frame members 718s, 720s and 722s are matched by an interior set of interior frame members 725s, 726s and 728s which are positioned in the vertical plane. All of these reel support frame members are connected at their bottom ends to the reel support frame base 724. In order to reenforce the support frame 676, side gussets 730s and 732s, as well as end gussets 734s and 736s, are provided for the starboard frame 674. Similar gussets are provided on the port side.

As seen in FIGS. 26 to 28 the same reel support frame construction is employed on the port side of reel 40 by means of support frames 718p, 720p and 722p on the exterior of the support frame and elements 725p, 726p and 728p on the interior position. The port side frame supports a bearing pedestal 726p.

The reel support frame base 724 is in a flat frame configuration with starboard and port I-beams 738s and 738p disposed to the outer sides with reenforcing I-beams 740s and 740p spaced to the interior thereof. These I-beams are connected on the fore end by transverse fore I-beams 742 and aft transverse I-beam 744. Additional reenforcing frame pipes 746, 748 and 750 are provided in a transverse positioning in order to interconnect the longitudinally aligned I-beams 738 and 740. Diagonal reenforcing pipe frames 752 and 754 are also provided in the same base plane.

Level Wind Assembly For Auxiliary Reels

The level wind track assembly 760 for reel 40 is shown in FIGS. 22-25. This assembly includes a pair of transversely positioned I-beams 756 and 758 which are positioned on main deck 18 and a hydraulic motor 760 which is affixed to main deck 18 by a mounting pedestal 762 which is intermediately positioned between the pair of I-beams 756 and 758. The hydraulic motor 760 is provided with a speed reducer 764 to which fore and aft axles 766 and 768 are connected for power transmission. A fore set of flexible couplings 770 and an aft set 772 are provided in order to connect fore jactuator and screw assembly 774 and aft jactuator and screw assembly 776 as shown in FIG. 24. The jactuator assemblies are provided with worm gear housings 778 and 780 within which worm gears contact the transversely positioned screws 782 and 784.

The aft jactuator and screw assembly 776 is shown in FIG. 25 with the power transmission screw 784 extending transversely under the reel support frame base I-beams 738s and 738p. The power transmission nut 786 is shown connected to the bottom of the starboard I-beam 738s.

The reel support frame 42 is mounted on the parallel I-beams 756 and 758 by roller shoes 788s and 788p at the fore side (I-beam 756) and 790s and 790p at the aft side. These roller shoes 788 and 790 are constructed with a roller housing 792 which provides for under-positioned caster rollers 794 and 796 for contacting the underside of the T configuration top end of I-beam 756 as shown in FIG. 24. Side mounted caster wheels 798a and 800a are also provided for the aft roller shoes and are matched for the fore roller shoes. The main bearing force of a loaded wheel is taken up by an endless roller set 802 which is contained within the roller housing 792 and is shown schematically in FIG. 24. Pedestal plates 804 and 804a are mounted on top of the housings 792f and 792a, respectively.

The operation of the level wind track assembly 670 is provided by motive power from hydraulic motor 760 which is transmitted via the flexible coupling sets 770 and 772 to the jactuator and screw assemblies 774 and 776. The power screws 782 and 784 then transmit rotational power to the drive nuts illustrated as 786 in FIG. 25. Screw 782 is fitted to a fixed bearing housing 785 on the port side of carriage 42. The reel support frame 42 is thus caused to move transversely across the parallel I-beams 756 and 758. Reverse operation of hydraulic motor 760 reverses the operation as shown by double headed arrows 672 in FIGS. 21 and 25.

The roller shoes 788s and 788p and 790s and 790p permit controlled, low frictional movement of the reel 40 and the reel support frame 42 transversely across the I-beams 756 and 758. The under positioned caster wheels 794a, 794f, 796a and 796f prevent the reel 40 from being tossed off of the parallel I-beam tracks in heavy seas.

Auxiliary Reel Operational Lines Spooling

The auxiliary reels 36 and 40 are fitted with hydraulic motors which are used for spooling of operational lines on to the reels. It is preferable to provide either two or four such hydraulic motors for each of the reels 36 and 40. As shown in FIGS. 22 and 23, hydraulic motors 806 and 808 are mounted on reel support frame base 724 and are provided with sprocket gears 810 as shown in FIG. 23 which are intermeshed with sprocket chain 684. Upon operation of the hydraulic motors 806 and 808 in order to rotate the reel 40 in a clockwise direction as shown in FIG. 22, operational line(s) can be reeled on the storage drum 680 of auxiliary reel 40. During the unspooling operation the hydraulic systems providing power to the two hydraulic motors 806 and 808 can be operated in order to provide breaking force for the reel 40 in order to provide additional tension for the operational lines which are being paid out over the drum 26 for layout.

First Auxiliary Reel Details

Figure 30:
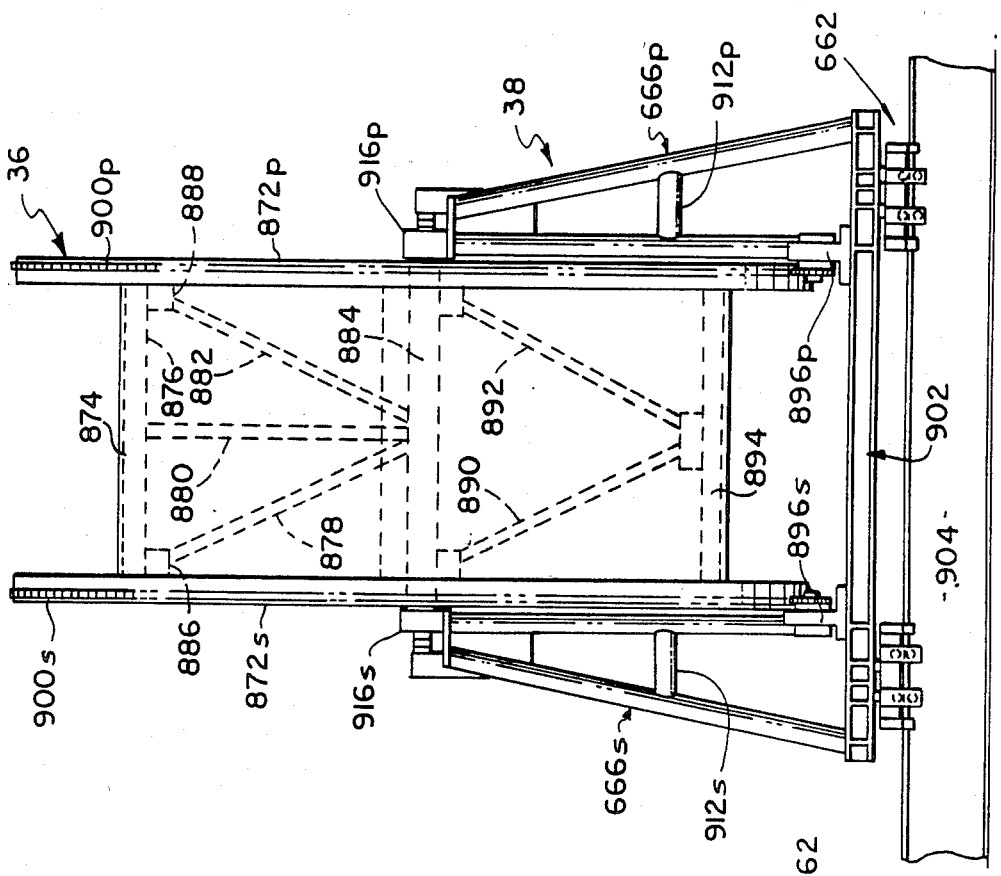
FIG. 30 is a front plan view of the auxiliary reel shown in FIG. 29.
Figure 29:
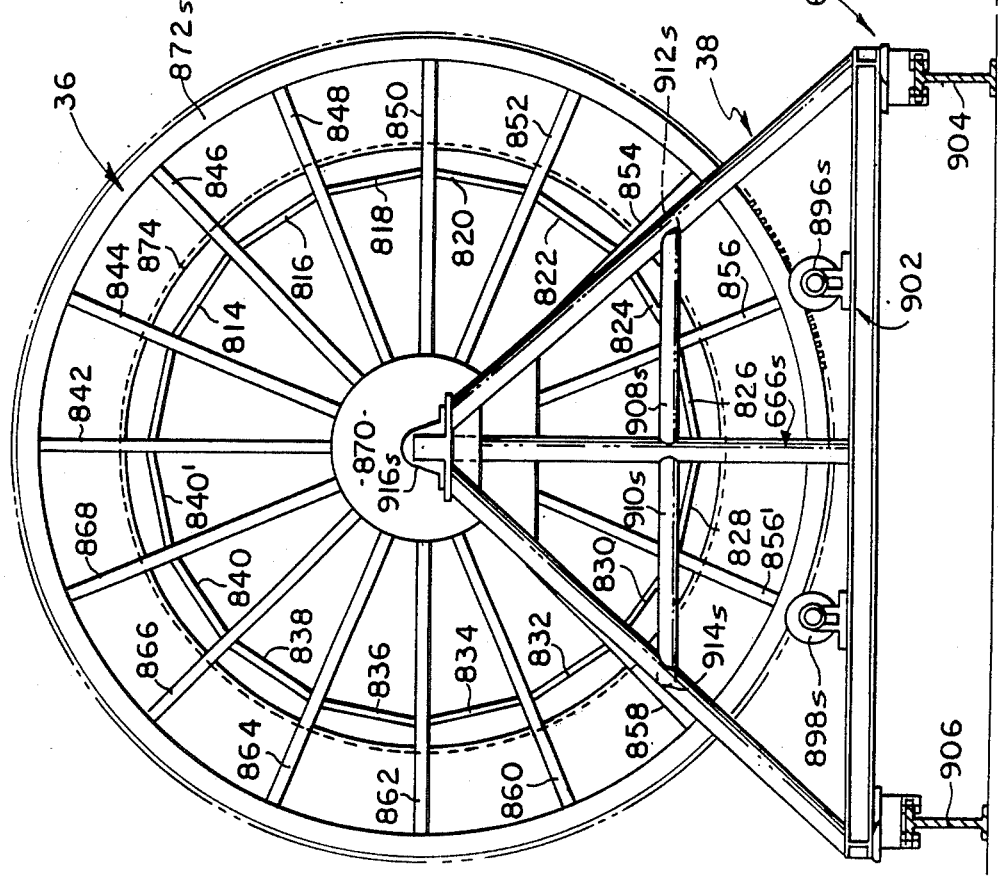
FIG. 29 is a side elevation view of the first auxiliary reel and its support frame structure when mounted on the vessel deck.

FIGS. 29 and 30 illustrate the first auxiliary reel 36 supported by its reel frame 38. The construction of the reel and support frames 36 and 38 together with the level wind track assembly 662 is similar to the construction described for the auxiliary reel 40 in FIGS. 22-28. The main differences are in the construction of the reel 36 wherein a series of intermediate reenforcing members 812-840 are provided for the radial spoke frames 842-868 which are connected to the central hub 870 and the side rim 872 as shown in FIG. 29. The operational lines drum 874 is also connected at the starboard and port edges thereof to the frame spokes 842-868. Internal reenforcement members are provided for the drum 874 as shown in FIG. 30. Cross support beams 876 are provided for each pair of frame spokes which are illustrated by the starboard spoke set 842-868. For each of the cross beams 876 a set of three reenforcing struts 878, 880 and 882 are provided for connecting the drum 874 with the central axle 884. Internal reenforcing blocks 886 and 888 are also provided in this construction. Opposite each such three-strut reenforcement brace configurations in the reel 36 is a two frame reenforcement brace consisting of frames 890 and 892 which are connected at their outer ends to a cross frame 894 and at their inner ends to the axle 884. This internal reenforcement provides for a reel 36 having sufficient bearing strength to support a load of spooled rigid walled pipeline.

A similar internal reenforcement arrangement is preferably provided for the auxiliary reel 40.

FIGS. 29 and 30 illustrate the use of four hydraulic motors 896s and 896p on the fore side of the reel and 898s and 898p on the aft side. These hydraulic motors are arranged to contact two sprocket chains 900s and 900p positioned on the side rims 872s and 872p of reel 36. These hydraulic cylinders and sprocket chains operate similarly to the hydraulic motors 806 and 808 together with sprocket chain 684 described with respect to reel 40.

The hydraulic motors 896s,p and 898s,p are mounted on a base frame 902 of the reel support frame 66. As described with respect to reel 40 parallel I-beams 904 and 906 are provided for a level wind track assembly 662 which is constructed as described with respect to FIGS. 22–25 for reel 40.

The support frames 666s and 666p are constructed as described with respect to the reel support frame 42 with the exception that additional reenforcing pipe frames 908s, 910s, 912s and 914s are provided for the starboard reel support frame 666s. Similar reenforcement pipe frames are provided for the port side support frame 666p. The two reel support frames mount the axle bearing housings 916s and 916p as shown in FIG. 30.

MAIN REEL LEVEL WIND ASSEMBLY

The main reel level wind assembly 48 is founded on the reel support structures 14 and 16 immediately aft of the main reel 20. As shown in FIG. 31, the mounting bases 920s and 920p are positioned at the aft edge of main reel 20. The assembly towers 922s and 922p have reduced diameter extension portions 924s and 924p about which are mounted a level wind roller carriage 926. This carriage is supported between the tower extensions 924s and 924p by a lower transverse frame structure 928 and an upper frame 930. The lower transverse frame 928 has tower extension follower sleeves 932s and 932p which permit vertical sliding movement along the tower extensions 924p and 924s. As seen in FIG. 32 in phantom the reel 20 is positioned between the two towers 922s and 922p. The level wind roller carriage 926 contains a set of hour-glass starboard pipeline rollers 934s and 936s which are mounted in a box frame 938. This frame is in turn mounted between the frame member 928 and transverse top frame 930. A walkway structure 940 is provided below the lower transverse frame structure 928 to permit personnel to adjust the pipeline roller pairs 934 and 936.

The lower transverse frame structure 928 is also connected to the upper frame structure 930 by side supports 942s and 940p. The upper transverse frame member 930 is provided with tower extension coupling rings 944s and 944p to enable sliding movement therealong.

The pipeline roller carriage 926 is mounted between the frame structures 928 and 930 to enable level winding of the carriage in a transverse direction between the towers as denoted by the double headed arrow 946. The level wind arrangement power means employed is a centrally mounted hydraulic motor 948 which operates a jactuator and screw assembly (not shown) which is similar in operation to that shown in FIGS. 22–25 for reel 40.

Adjustment screws are provided for the pipeline hour-glass rollers 934s, 934p, 936s, and 936p in order to accomodate for varying pipeline diameters. Also fore and aft mounted pipeline support rollers 950 and 952 are provided for additional support for the pipelines as unreeled from main reel 20. The main reel level wind assembly is similar to the level wind assembly 560 of U.S. Pat. No. 4,269,540.

In operation, the power winches 954s and 954p located at the mounting bases of the towers are utilized for raising and lowering the roller carriage 926 along with its supporting transverse structures 928 and 930. The exterior mounted winch cables 956s and 956p extend from the winches 954s and 954p upwardly along the outside of the columns and extensions thereto over the double pulley sets 958s and 958p whereby they are attached to the upper frame slide rings 944s and 944p at connections 960s and 960p.

The operation of the winches 954s and 954p permit the entire pipeline roller assembly 926 and its associated transverse structural frames 928 and 930 to be moved vertically along the tower extensions 924s and 924p as shown by the phantom lines in FIGS. 32 to accomodate various pipeline wraps.

The main reel level wind mechanism 48 is operated positively through hydraulic motor 948 and power winches 954s and 954p during the spooling operation in order to place the successive wraps on the main reel. The hydraulic motor 948 is not used during unspooling since the pipe take-off assembly 24 is level wound transversely across stern deck 28 to assure correct alignment as the pipeline is unspooled. The pipeline is merely fed through the hour-glass roller pins 934 and 936 for additional support against wave motion.

The winches 954s and 954p are used to lower the roller carriage and frames 928 and 930 in a controlled manner as the successive pipeline wraps are unspooled so that the weight of the two frames is not on the pipeline(s).

The level winding provided for the operational lines take-off structure 24 need not be across the full width of the main reel since a permissible fleet angle of about 1.5° can be accomodated on both the port and starboard sides by the assembly 24. The fleet angle is measured between vertical construction planes positioned parallel to the vessel longitudinal axis and the center line of a given operation line being unspooled.

TENSIONER TRACK ASSEMBLY

Figure 33:
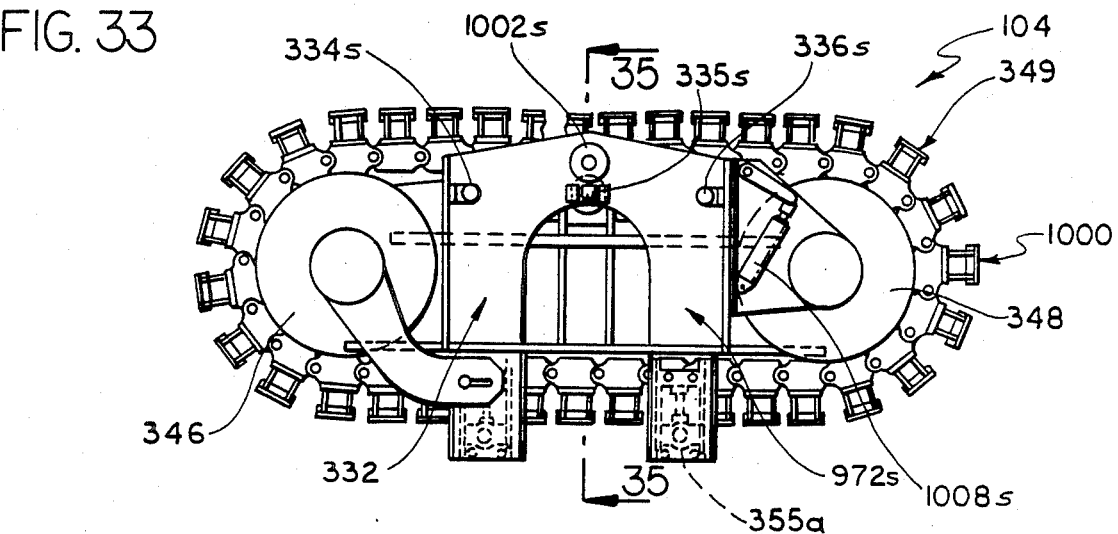
FIG. 33 is a side elevation detailed view of one of the multiple track tensioners assemblies of FIGS. 3 and 8.
Figure 35:
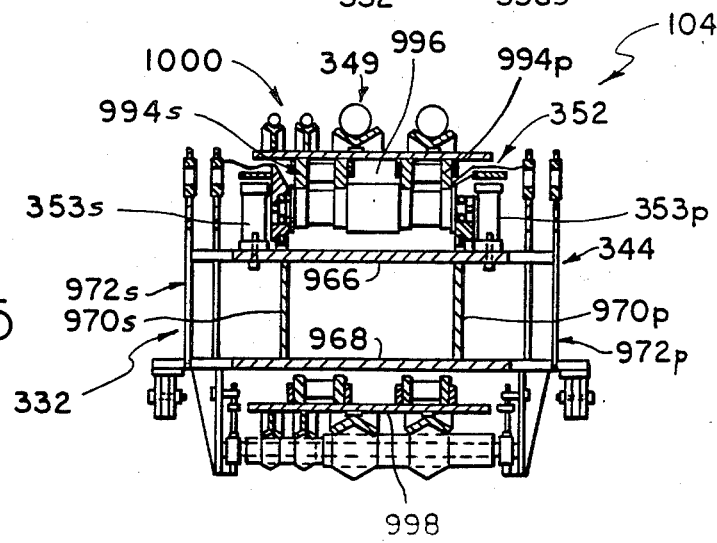
FIG. 35 is a cross-sectional view of the tensioner device of FIG. 33 taken on line 35—35.

The tensioner track assembly 104 of FIGS. 33–35 was briefly described in relation to FIGS. 8 and 10. The main carriage 332 consists primarily of a front plate 966 and a rear plate 968 which are spaced by internal starboard wall 970s and internal port wall 970p. Starboard and port mounting brackets 972s and 972p are positioned in a central location as shown in FIGS. 33 and 34. These brackets consist of inner and outer spaced inverted "U" shaped members which are connected to extensions of the spaced plates 966 and 968.

FIG. 34 shows mounting extensions 974s and 974p for mounting associated bearing housings 976s and 976p. A driven axle 977 is rotatably mounted within these bearing housings and hydraulic motors 346 and 978 are provided on either end thereof in order to supply rotational power. Reaction levers 980s and 980p are fixed to extensions 982s and 982p of the mounting brackets 972s and 972p. Similar mounting extensions 984s and 984p are provided for mounting bearing housings 986s and 986p for providing rotational support for a driven axle 988 which is in turn rotated by hydraulic motors 348 and 990 which have reaction levers 992s and 992p similarly fixed to extensions of the mounting brackets on either side.

The hydraulic motors 346, 348, 978 and 990 are thus arranged to rotate the driven axles 977 and 988 in order to rotate the sprocket drive gear sets 350 and 351 about which flexible sprocket chain sets 349 are positioned. As shown in FIGS. 33–35 two flexible sprocket chains 994s and 994p are provided in order to support a series of transverse mounting plates illustrated by plates 996 and 998 in FIG. 35. A set of individual pipeline support pads 1000 for engaging two pairs of operational lines having two different diameters are affixed to the mounting plates as shown in FIG. 35. This arrangement is distinguishable from that shown in FIG. 37 below where separate mounting plates are used for each operational line or pair of lines so that various curvatures can be established for different lines. The tracks and support pads have been removed from FIG. 34 for clarity.

The idler roller assembly 352 is formed by five transversel disposed axles having two rollers on each axle. The rollers contact the underside of the flexible sprocket chain sets 349. Each of the five axles is independently mounted on adjustment hydraulic cylinders illustrated by cylinders 353s and 353p in FIG. 35. Each of these hydraulic cylinders can also be seen in FIG. 34 top view.

The side position mounting brackets 972s and 972p are formed with hydraulic ram connection points 1002s and 1002p through both of the inverted "U" spaced members thereof. Also guide roller assemblies 340s, 340p, 341s, 341p 342s and 342p are provided for sliding contact with frame guide members 288s, 288p, 289s, 289p, 290s, and 290p inside of structure 30 as described with respect to FIG. 8.

Adjustment in tension of the flexible sprocket chain tracks 349 can be made by the individual hydraulic cylinders 353s and 353p and also by the adjustment hydraulic cylinders 1004s and 1004p which operate to move driven axle 977 with respect to the main carriage 332. Similar adjustment hydraulic cylinders 1006s and 1006p are used for mounting the bearing housings 986s and 986p respectively for moving the driven axle 988 with respect to the main carriage 332. An additional adjustment hydraulic cylinder 1008s and 1008p can be provided on either side of driven axle 988 in order to provide for minor advancement adjustments in the track sets 349 during operation.

The tensioner track assembly 104 described with respect to FIGS. 33–35 above is usually designed so that each of the adjustment cylinders illustrated by 353s and 353p in FIG. 35 for each of the five idler roller axles operate at the same hydraulic pressure and therefore are subject to the same force exertion and position. This technical fact together with the rather short distance from one end of the roller assembly 352 to the other in the direction of track travel means that this type of tensioner assembly is not designed for curvature adjustment. Also the adjustment dimensions for movement of the axles with respect to the mounting plate 966 is too small to accomodate curvature adjustments of the type described with respect to the straightener assembly 102 in FIGS. 17–19 above. For these reasons, the tensioner track assemblies 104 and 106 as shown in FIG. 8 are utilized solely for providing tension to the operational lines array. These are not useable for straightening since they do not permit curvature adjustment of the type required for use in the laying devices described herein.

PIPE TAKE-OFF ASSEMBLY WITH STRAIGHTENER/TENSIONER DEVICE

Figure 36:
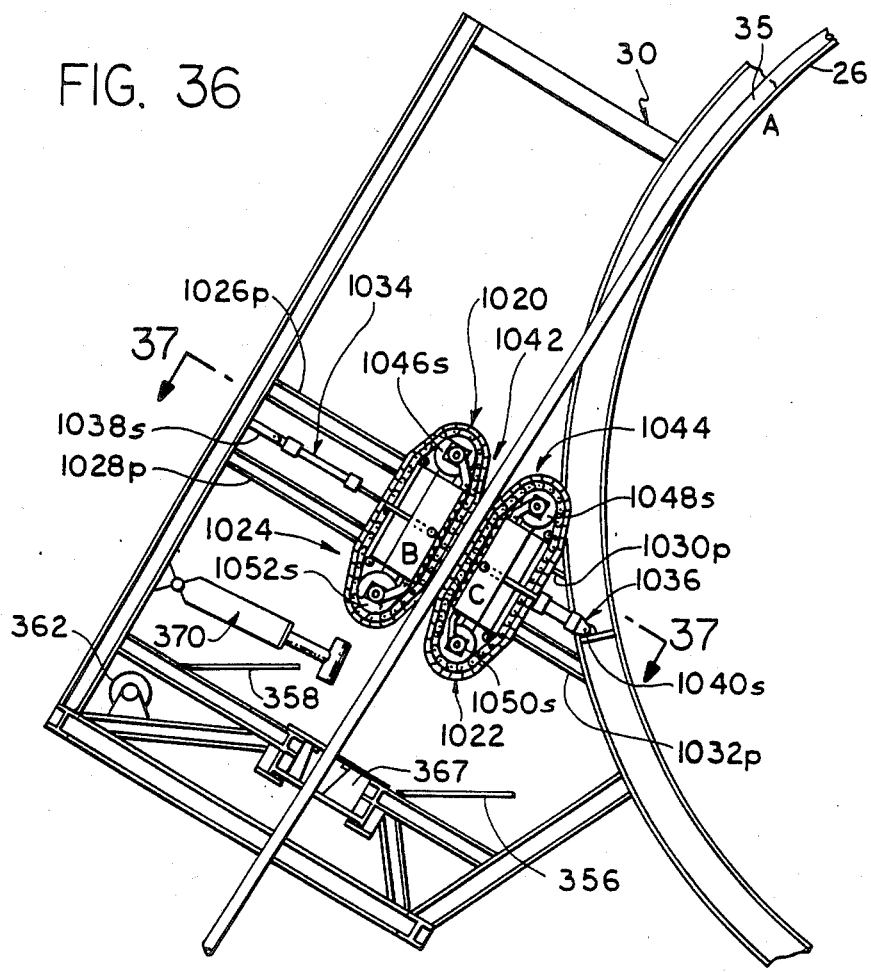
FIG. 36 is a schematic side elevation view of a second embodiment of the pipe take-off structure of the present invention showing the internally positioned multiple track straightening/tensioning assemblies.
Figure 37:
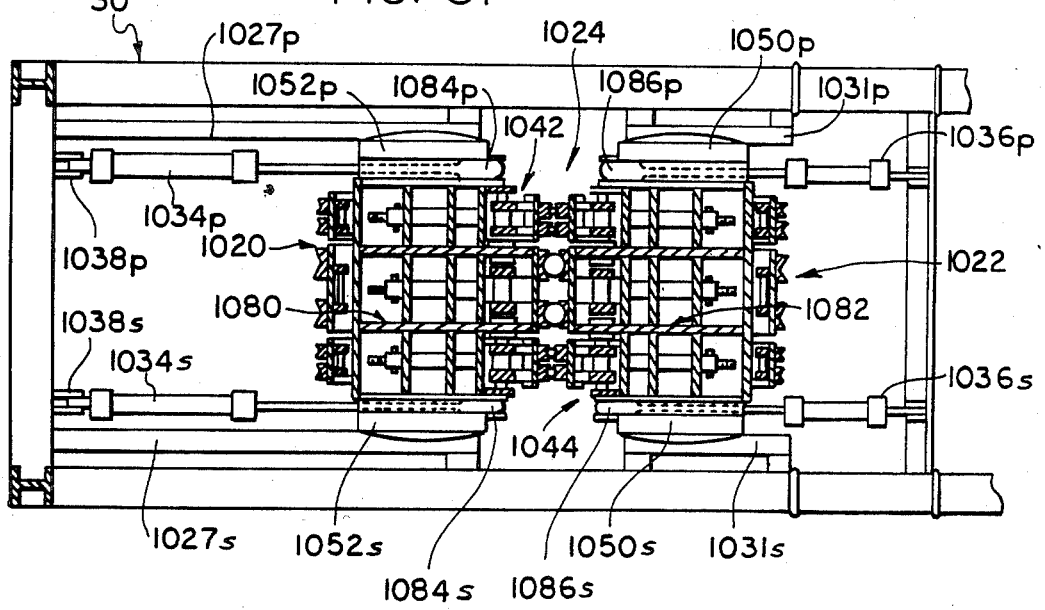
FIG. 37 is a detailed cross-sectional view of the multiple track straightening/tensioning assemblies shown in FIG. 36 taken on lines 37—37.
Figure 38:
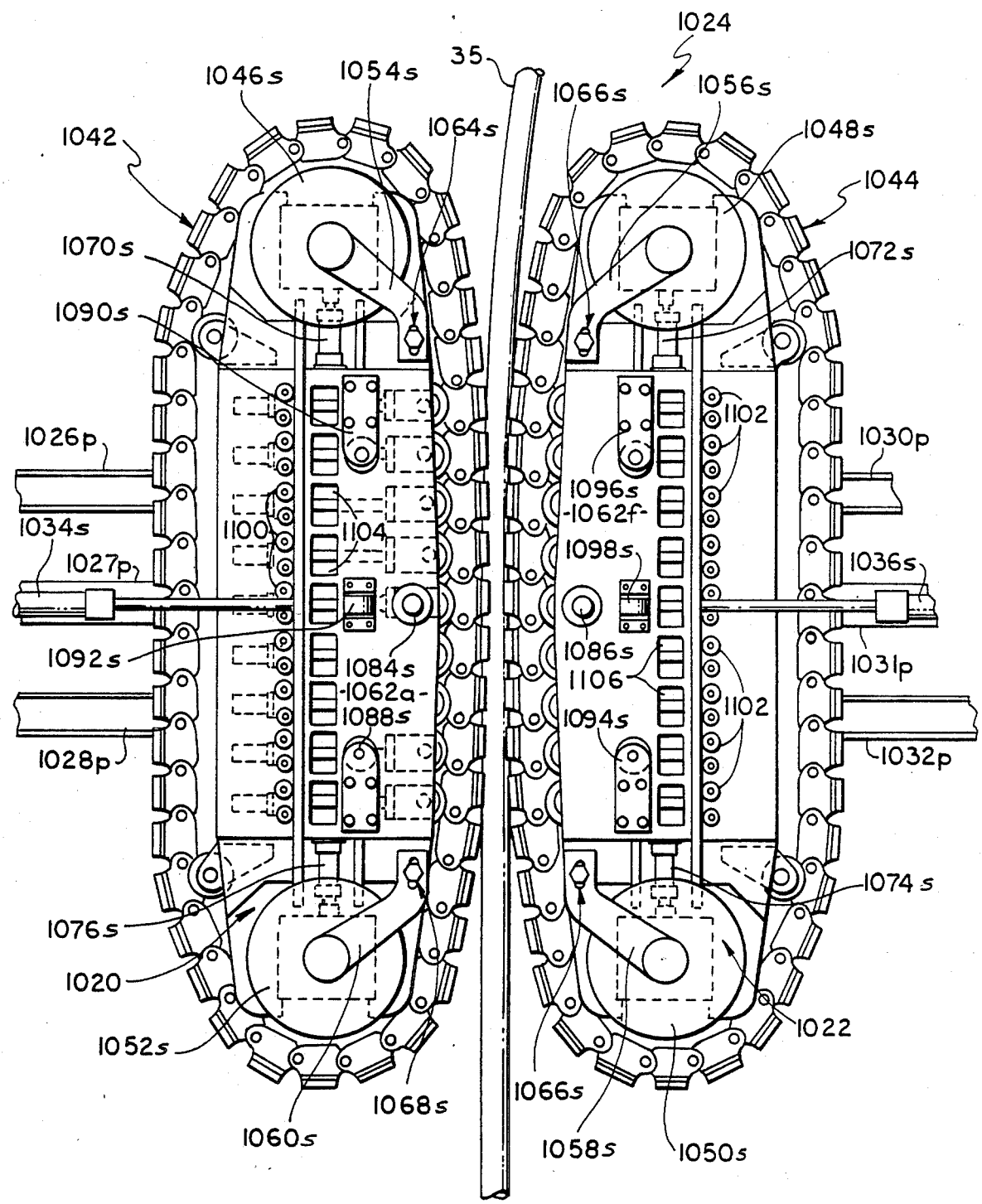
FIG. 38 is a detailed side elevation view of the multiple tracks straightening/tensioning assemblies of FIGS. 36 and 37.

A preferred form of the present invention with respect to operating efficiency and capital costs minimization is shown in FIGS. 36–38.

This modification of the straightener/tensioner device has the advantage of permitting the layout of a multiple operational line array from a plurality of storage reels at lower than expected capital and operating costs.

In this modification the straightener/tensioner track assembly has the capability of imparting an adjustable curvature to the pipelines in the operational lines array. The device is fitted with hydraulic motors in order to exert tension on the multiple lines. Thus, the adjustable curvature established by the idler roller assembly provides a pipeline straightening function and the use of hydraulic motors to power the multiple sprocket chain tracks provides a tensioning function. By use of this new type of straightener/tensioner assembly only two opposing assemblies are needed to constitute a straightening/tensioning device which can then be positioned within the pipe take-off structure 30. The drum 26 provides the first force imposition zone A while the multiline tracks 1042 and 1044 provide zones B and C as illustrated in FIG. 36. Due to the curvatures which can be established in the tracks the latter two zones can be adequately spaced from one another.

The operational lines array 35 are thus gathered and set into a juxtaposed array by the pipe take-up drum 26 shown in FIG. 36 prior to entry of the pipeline array between two opposing straightener/tensioner multiple track assemblies 1020 and 1022 straightener/tensioner multiple track assemblies 1020 and 1022 which constitute the straightener/tensioner device 1024. A planar array positioning in which the operational lines centers are in the same plane is preferred. Each of the straightening/tensioning assemblies 1020 and 1022 are slidably mounted on starboard and port structural guides illustrated by guide members 1026p and 1028p for assembly 1020 and members 1030p and 1032p for assembly 1022. As set forth with respect to FIG. 8, hydraulic ram pairs 1034 and 1036 are pivotally connected by upstanding connectors 1038s, p and 1040s, p in order to provide adjustment in positioning for the straightening/tensioning assemblies. The engagement of guide rollers on the structural members 1026p, 1028p, 1030p and 1032p is the same as described with respect to the embodiment illustrated in FIG. 8. Also intermediate structural members corresponding to 289s, p of FIG. 15 are used in this modification.

The remaining pipe handling equipment such as the pipe aligner double clamp set 370, the pivotal floor panels 356 and 358, the A/R winch 362 and the pipe clamp 367 are the same as described with respect to FIG. 8 and hence the same numeral designation have been employed.

The tensioning function of the straightening/tensioning device 1024 requires the use of motive power for the pipeline array contacting track sets 1042 and 1044. This traction power is provided by eight hydraulic motors which are mounted on the two ends of each of the four main axles in the straightening/ tensioning device 1024. The starboard set of these hydraulic motors are shown as 1046s, 1048s, 1050s and 1052s in FIG. 36.

FIGS. 37 and 38 illustrate in greater detail the straightening/tensioning device 1024. The two assemblies 1020 and 1022 which comprise device 1024 are of identical construction except that each of the assemblies has the track sets mounted thereon in a configuration to grasp the various lines in the pipeline array in order to exert tension there along. This positioning of the track sets then constitutes a difference between the assemblies when viewed side by side. In view of the identical construction only a single set of identifying numerals have been employed for the same elements in the two assemblies except that the designations "a" for aft and "f" for fore have been used to designate the operating position of the assembly under description. The framing members of the pipe take-off structure 30 are the same as those described in detail with respect to FIG. 8.

Straightening/Tensioning Assemblies

The straightening/tensioning assemblies 1020 and 1022 are similar to basic construction to the straightening assembly illustrated in detail in FIGS. 17–19 with the important difference that in the straightening/tensioning assemblies 1020 and 1022 hydraulic motors are provided for driving the main axles which are best illustrated in FIG. 18 as 534 and 536. The motive power for each of the assemblies is provided by the four hydraulic motors above described and illustrated in details in FIGS. 37 and 38. Reaction levers 1054s, 1056s, 1058s and 1060s are provided for connecting the stationary bases of the hydraulic motors to the assembly starboard and port side mounting brackets 1062a and f as illustrated in FIG. 38. The connections of these lever arms 1054–1060 with the assemblies is through slot and pin connections 1064, 1066s, 1066p and 1068s, respectively, in order to allow for adjustments in tensioning of the track sets 1042 and 1044 by the hydraulic pistons 1070s, 1072s, 1074s and 1076s.

In operation the relative positions of the two assemblies 1020 and 1022 are adjusted by operation of hydraulic cylinders 1034s and 1036s which are shown in FIG. 38 in front of the support frames 1027p and 1031p, respectively. A pipeline array 35 can then be passed downwardly by rotation of the pipe take-off drum 26 and thence through the device 1024. Upon activation of the hydraulic ram pairs 1034 and 1036 the two assemblies 1020 and 1022 can be closed on either side of the pipeline array so that the individual lines are caught between the opposing line support pads which are mounted on the endless sprocket chain track sets 1042 and 1044 as shown in FIG. 37. As in FIGS. 17–19 the two straightening/tensioning assemblies are connected at the port and starboard sides of each of the main carriages 1080 and 1082 by pivotal connections 1084s, p and 1086s, p, respectively.

As in FIGS. 17–19 guide rollers 1088s and 1090s are positioned to support assembly 1020 on the frame tracks 1026s and 1028s which can be understood from in FIG. 38. The central positioned guide roller 1092s is positioned to contact the intermediate structural frame member 1027s. Corresponding guide rollers 1094s and 1096s and 1098s are provided on the starboard side bracket 1062f.

The internal structure of each of the assemblies is the same as described with respect to FIGS. 17–19. A series of jactuators adjustment openings 1100 and 1102 are shown in assemblies 1020 and 1022 respectively. These jactuators adjustments permit the turning of internally mounted screws in order to position the multiple roller guides independently. As shown in FIG. 38 nine roller guide sets are provided for each of three endless sprocket chains which are employed to support the pipe pads for three pairs of lines which constitute the pipeline array 35 as shown in FIGS. 37 and 38. Sight openings 1104 and 1106 are also provided through the various walls of the two assemblies to observe rotation of the jactuators screws therein.

The operation of the straightening/tensioning device 1024 permits the two assemblies to be opened and closed about the pipeline array via the hydraulic ram pairs 1034 and 1036 whereas operation of the internal hydraulic cylinder pairs 1070, 1072, 1074 and 1076 allows the tension on the endless track sets 1042 and 1044 to be changed. The track curvature necessary to impart the straightening function while preserving the pipeline ovality and other dimensions by this novel straightening/tensioning device 1024 is established by the mechanical adjustment of the various screw jacks in order to set the guide rollers at varying positions linearly along the pipe array. The screw jack adjustment openings are formed on both the top and bottom sides of the individual screw jacks as described with respect to FIGS. 17–19 above since it is necessary to adjust the central set of screws as well as the two outer sets of screws in a three track set system such as illustrated in FIGS. 37 and 38. This type of screw jack is sometimes referred as a jacuator.

The tensioning function is provided by motive force input through the hydraulic motors 1046s, p, 1048s, p, 1050s, p, and 1052s, p, which are connected to the main axles as described above. The input power from these motors permits the tensioning along the pipeline array in an upward direction as shown in FIG. 38 in order to maintain desired operating tension on the pipeline array which passes downwardly through the pipe array clamp 367 and then into the water.

The multiple line track sets 1042 and 1044 of each of the assemblies 1020 and 1022 are interconnected to one another through the sprocket gears and main axles 534 and 536. This interconnection provides for moving the lines in the operational array at a common velocity in the same manner as provided by the interconnected grooves of the pipe take-off drum 26 in FIGS. 1–7. The pipeline support pads on the track sets provide the supporting means for the array.

PIVOTAL RAMP INTERMEDIATE WATER DEPTH EMBODIMENT MULTI-LINE PIPELAYING VESSEL

A dynamically positioned pipelaying vessel 1110 is shown fitted with multiple reels and pipeline array handling equipment according to the present invention for aligning the array in a equipment comprises multi-track straightening and tensioning devices 1114, 1116 and 1118 as shown in FIG. 41 or a single combination straightening/tensioning device 1120 as shown in FIG. 42. The main reel 1122 is mounted between starboard and port main reel support structures 1124 and 1126 which are mounted on either side of a control tower 1128. The vessel is also equipped with a main reel level wind mechanism 1130 which provides for similar functioning as the main reel level wind mechanism described with respect to FIGS. 31 and 32 above. The main reel corresponds to main reel 20 and the first and second auxiliary line reels 1132 and 1134 correspond to reels 36 and 40, respectively, illustrated in FIGS. 1, 3–5 above.

The pivotal ramp 1112 replaces the pipe take-off assembly 24 in this embodiment and provides the functions of straightening and tensioning the pipeline array. It is necessary to pivot the entire structure 1112 about the pivot axis 1136 shown in FIGS. 41 and 42 in order to achieve various water entry angles for the pipeline array.

The large mass of the pivotal ramp and its length results in an increase in construction costs since the vessel must be long enough to accomodate the ramp when in a nearly horizontal position as shown in FIG. 39. When this length is then compounded by the placement of auxiliary reels such as 1132 and 1134 a vessel of considerable longitudinal dimension must be constructed. While the pipe laying vessel 1110 is not as short longitudinally as vessel 10 of FIGS. 1 and 2 it can nevertheless be fitted with pipe handling equipment to permit the layout of multiple line arrays, shown here as three lines including a rigid walled pipeline 1138 and two additional lines 1140 and 1142. Each of these lines is supplied from the separate reels 1122, 1132 and 1134 respectively.

The pivotal ramp 1112 is formed of a truss-work support ramp assembly 1138 which is mounted on a rotating fixed axle 1136 and a series of five roller carriage tracks 1141, 1143, 1144, 1146 and 1148 which support a level wind assembly 1150. The pipe handling equipment is mounted on this level wind assembly and consists of straightening and tensioning devices most of which can be mounted in a cage 1152. A pipe clamping assembly 1154 designed to permit clamping of the three lines in the array 1155 is also mounted on the level wind assembly 1150. As shown by FIG. 41 and described above the straightening and tensioning devices 1114, 1116 and 1118 are provided as the major pipe handling equipment. Also a stern multi-line guide assembly 1156 is provided near the terminal pivoting end of the support ramp assembly. A stairway 1158 is also provided for operational access as shown in FIG. 41.

The detail construction of the support ramp assembly 1150 and the operation thereof with a curved pipe bending radius controller 1160 is connected to the upper free end thereof has been described in prior patents. A jack 1162 is provided between the roller carriage 1148 and the pipe bending radius controller 1160 in order to change the position thereof with respect to the incoming pipeline and the straightening equipment. A dynamically positioned pipe laying vessel having a pivotal support ramp assembly for supporting a level wind assembly and a pipe bending radius controller has been described in full structural detail with respect to single pipelines in U.S. Pat. Nos. 4,269,540 to Stanley T. Uyeda et al; 4,230,421 to Springett et al; 4,345,855 to Uyeda et al; and 4,340,322 to Springett et al. The disclosures of those patents are hereby incorporated by reference as though fully set forth herein. In view of this incorporation the description herein has been restricted to elements which are new over those patents or which are needed for understanding the operations of the herein described pipelaying vessel.

The pipe bending radius controller 1160 must be made wide enough to accomodate multiple operational lines. Since it is frequently desired to unspool sets of multiple lines from the various reels a width great enough to accomodate six to twelve lines in a horizontal array is used. This necessitates a widened level wind assembly 1150 and the provision of support mechanisms spaced sufficiently to provide for the use of straightening and tensioning devices for accomodating wide operational line arrays. Specifically, as shown in FIG. 41 the supporting cage system 1152 must be made as wide as the full width of the level wind mechanism in order to provide for the placement of straightening and tensioning devices for accomodating the wide operational line arrays.

This invention incorporates the placement of straightening and tensioning track assemblies of varying widths and numbers of track sets onto the support ramp assembly 1138. As illustrated in FIG. 41 the pipe bending radius controller 1160 is formed with a curved base and a plurality of operational lines supporting rollers 1164. The straightener assembly 1114 can preferably be of the type disclosed for straightening device 32 in FIGS. 8, 9 and 17-19 above. The track system is fitted with single operational line support pads so that three operational lines are provided for in the configuration of FIG. 41. This is accomplished by exchanging the paired support system shown in FIG. 19 with single support pads which act as supporting means for the pipeline array. The straightening track device 1116 in FIG. 41 can also preferably be of the same type. It is this straightener assembly which provides the main force for straightening of the pipe in cooperation with forces provided by the straightening assembly 1114 and the lower track assembly of the tensioner device 1118. Reaction points, A, B, and C have been designated on FIG. 41 for that purpose.

These preferred straightening assemblies 1114 and 1116 have adjustable curvature multi-pipeline track systems which permit the fitting of various pipeline diameters into the assemblies in a much more operative manner than when only flat or minor variations in the contact plane of the track support pads is possible. Hence, the assemblies of the prior patents are very difficult to use.

The tensioner assembly 1118 can be of the same type as shown for device 34 in FIG. 8, 10 and FIGS. 34-36. This differs from previous tensioners employed in single pipeline vessels in that multiple tracks are provided for handling pipeline arrays so the equalized line tension can be imparted.

The multi-line track systems of the straightener and tensioner assemblies 1114, 1116 and 1118 are interconnected within each such assembly to provide for moving the operational lines over each given assembly at a common velocity.

After passing through the tensioner device 1118 the pipeline array passes over a support roller 1166 and then through an array guide assembly 1168. The line array clamping assembly 1154 has line clamps 1170 and 1172 for the two smaller lines and a large double clamp set 1174 for the main rigid walled pipeline 1138.

It is also possible to exchange the single pipeline track assemblies disclosed in the above four U.S. Patents all of which are assigned to the assignee hereof, with the herein described multi-track assemblies in order to provide for the handling of multi-line arrays as set forth therein. The straightener assemblies of those patents are all hydraulically operated as a gang of guide rollers which means that the establishment of various curvatures is not possible. It is also necessary to adjust the positions of the operational line support pads for various diameters of lines. The former straightening assemblies did not provide this required degree of flexibility. However, if the restricted operations are not objectionable the former hydraulically ganged guide roller assemblies can be modified for multiple pipelines and used as above stated within the fairly strict limitations. This modification would necessitate the maufacture and storage of a wide range of the changeable operational line track sets to accomodate a range of pipe diameter combinations.

Pivotal Ramp With Straightening/Tensioning Device

FIG. 42 shows the pivotal ramp 1112 of FIGS. 39-41 with a single pair of opposing multiple line track assemblies 1180 and 1182 which are set into a cage 1184 mounted on the level wind assembly 1150. As in FIG. 41 the three operational lines 1138, 1140 and 1142 are shown bending over the radius controller 1160 and are then passed through the dual function straightening/tensioning assemblies 1180 and 1182. These assemblies are the same as those described with respect to FIGS. 36-38.

The provision of independently adjustable guide rollers through the jactuator adjustments provides for the establishment of varying curvatures in order to accomodate different pivotal positions of the ramp assemby 1112 which changes the optimum curvature for the straightening function. The provision of hydraulic motors to drive the two main axles of each of the assemblies provides for tension longitudinally along the pipeline array length. The other components such as the operational lines guide 1168 and the pipe clamping devices 1154 are the same for FIG. 41.

In operation the lines 1138, 1140 and 1142 are placed into a horizontal array on the pipe bending radius controller 1160 as they are unspooled from the respective reels 1122, 1132 and 1134. The lines are then gripped on both sides by the pipe support pads on the straightening/tensioning devices 1180 and 1182 which are shown in detail in FIGS. 37 and 38. The desired curvature for all of the three operational lines including the rigid walled pipeline 1138 can be effected by adjusting the individual jactuator adjustments. Force exerted longitudinally along the exterior walls of the operational lines by the hydraulic motors 1046s, p; 1048s, p; 1050s, p and 1052s, p, provided tensioning of the lines in order to maintain the desired curvature in the lines between the vessel 1110 and the bottom of the sea in which the pipeline array is being laid.

The use of the independent guide roller adjustability feature of the straightening/tensioning assemblies 1180 and 1182 permit the accomodation of a wide range of pipeline array configurations with a relatively small number of track sets.

SHALLOW WATER MULTI-REEL PIPELAYING VESSEL

Figure 44:
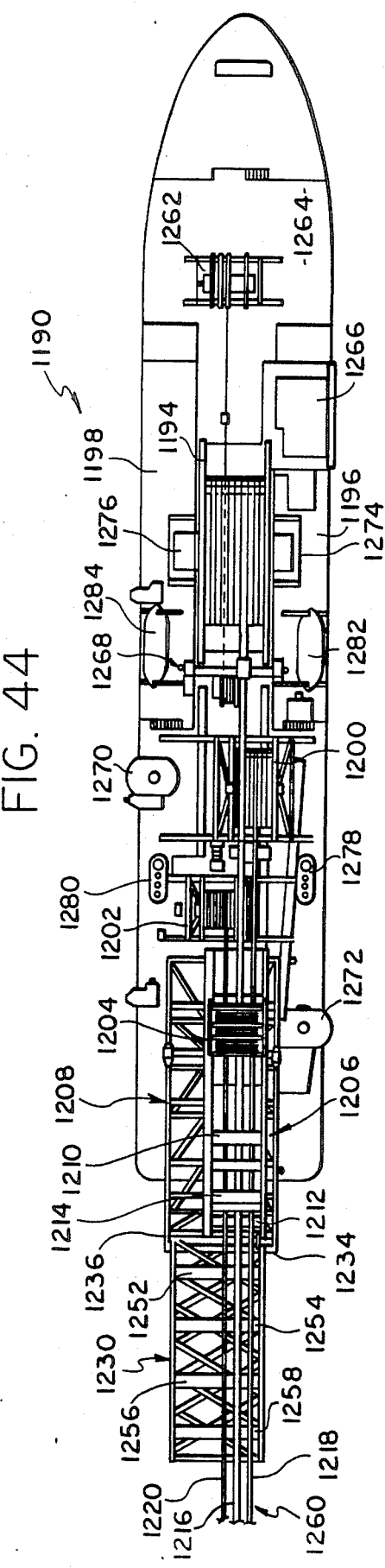
FIG. 44 is a top plan view of the multi-reel vessel of FIG. 43.
Figure 43:
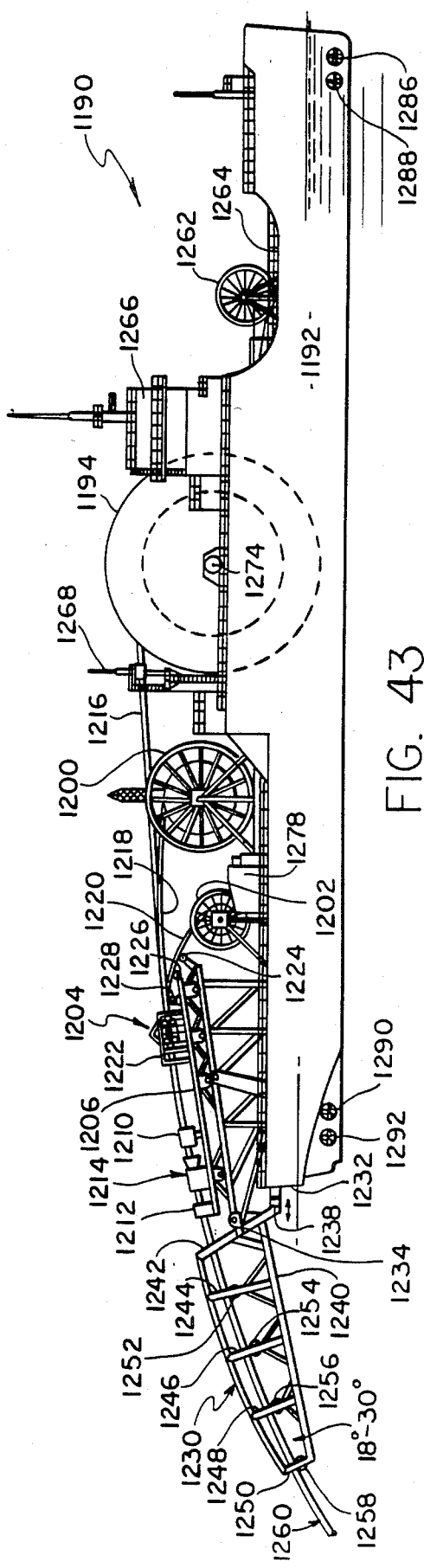
FIG. 43 is a starboard side elevation general arrangement view of a fifth embodiment of the multi-reel vessel of the present invention designed for shallow and benign waters.

Vessel 1190 shown in FIGS. 43 and 44 is designed for laying pipeline arrays in shallow waters up to about 1500 ft. in depth. The pipe exit angle or water entry angle range is from about 18° to 30°. The overall length of hull 1192 can be only slightly longer than hull 12 shown in FIGS. 1 and 2. A main reel 1194 is mounted on reel support housings 1196 and 1198 similar to vessel 10 of FIGS. 1 and 2. Also a first auxiliary reel 1200 and a second auxiliary reel 1202 are positioned on the main deck aft of the main reel in order to unspool two or multiple lines from these auxiliary reels into a straightening/tensioning device 1204 which is mounted on a level wind assembly 1206 which is in turn supported on a truss work support base 1208. The device 1204 comprises two straightening/tensioning assemblies of the form shown in FIGS. 36-38.

Pipeline array guides 1210 and 1212 are provided on the level wind assembly 1206 similar to the pipe handling equipment shown in FIGS. 39 and 40. A pipe clamp mechanism 1214 is also provided on the level wind mechanism. The three operational lines 1216, 1218 and 1220 are gathered into a horizontal pipeline array just prior to entry into the pipe straightening and tensioning device 1204. This device 1204 is illustrated in detail in FIG. 38 and is mounted on the level wind mechanism in a structural cage 1222 which is similar to the cage 1184 illustrated with respect to FIG. 42.

In this embodiment advanced rollers 1224 and 1226 are provided for operational line 1220 since it is positioned close to the fore end of the level wind assembly 1206. An additional roller 1228 is positioned for contacting all three of the operational lines illustrated. The lines of course can be wrapped in multiples on each of the reels 1194, 1200 and 1202 separately in the fashion illustrated in FIGS. 5-10 for laying out multiple numbers between three to twelve operational lines in the array.

A bananna ramp 1230 is affixed to the stern end of the frame support structure 1208 at connections 1234 and 1236 (FIG. 44). The bananna ramp 1230 is adjustable over the above range of degrees of water entry angle by an hydraulically powered cantilever support 1238 which is affixed to the fore end of the ramp 1230. The ramp is constructed with a lattice frame base 1240 and main side columns 1242, 1244, 1246, 1248 and 1250. The latter four of these side members have rollers 1252, 1254, 1256 and 1258 rotatably affixed thereon in order to provide rolling contact for the operational lines array 1260 as it is unspooled from the storage reels 1194, 1200, 1202 and passed through the straightening/tensioning device 1204. If desired the bananna ramp can be replaced by a column stabilized semi-submerged type stinger ramp such as shown in U.S. Pat. No. 3,685,305 and the roller can be separately vertically adjusted to provide for a range of water entry anagles. The device 1204 and the ramp 1230 function as an operational lines laying device. The multi-line track assemblies provide operational lines supporting means for the pipeline array.

Other features of the vessel 1190 are similar to those of FIGS. 1 and 2 in that an A/R cable reel 1262 is provided on foredeck 1264 and a control tower 1266 is mounted on the starboard main reel support housing 1196. A main reel level wind tower 1268 is provided for controlling the positioning of the rigid walled pipeline 1216 upon spooling during the take-up procedure on to the main reel. A pedestal crane 1270 is provided in line with the first auxiliary reel 1200 on the portside and a starboard pedestal crane 1272 is provided as shown in FIG. 44. The main reel 1194 is mounted on bearing housings 1274 and 1276 similar to housings 82 and 84 in FIGS. 1 and 2. Exhaust stacks 1278 and 1280 are provided on starboard and portsides respectively. Lifeboats 1282 and 1284 are also shown in FIG. 44. Thruster 1286 and 1288 on the bow and 1290 and 1292 on the stern are for the purpose of providing dynamic positioning for the reel vessel 1190.

The level wind mechanisms for the two auxiliary reels 1200 and 1202 is the same as described with respect to FIGS. 1-30 and the level wind assembly 1206 is the same as described with respect to level wind assembly 1150 in FIGS. 39 and 40.

Second Shallow Water Multi-Line Pipelaying Vessel Embodiment

Figure 46:
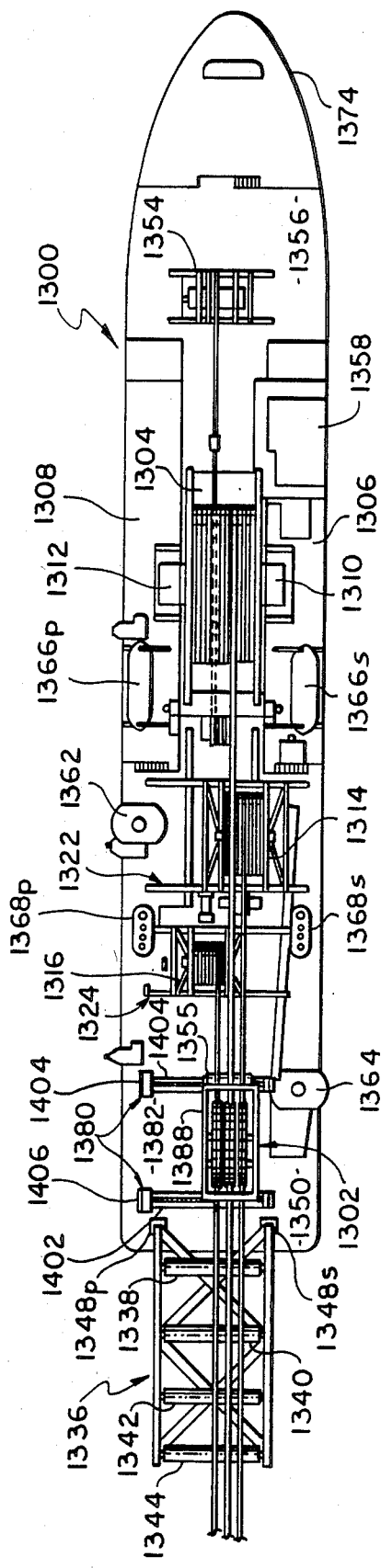
FIG. 46 is a top plan view of the multi-reel vessel of FIG. 45.
Figure 45:
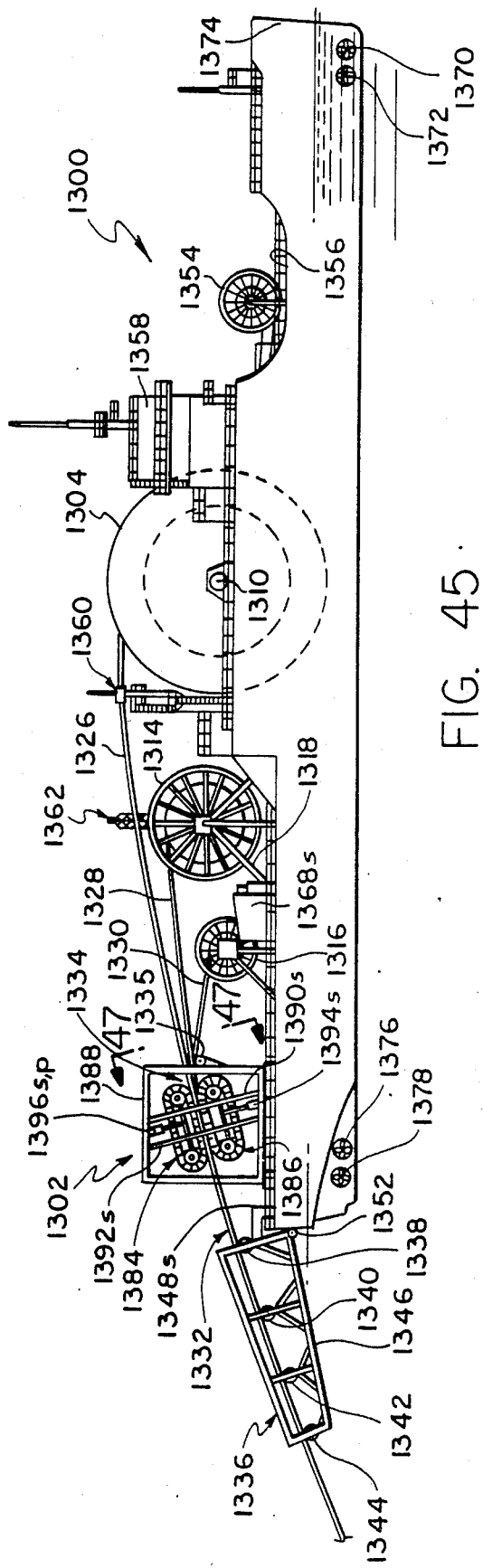
FIG. 45 is a starboard side elevation general arrangement view of a sixth embodiment of the multi-reel vessel of the present invention also designed for shallow water operational lines layout.
Figure 47:
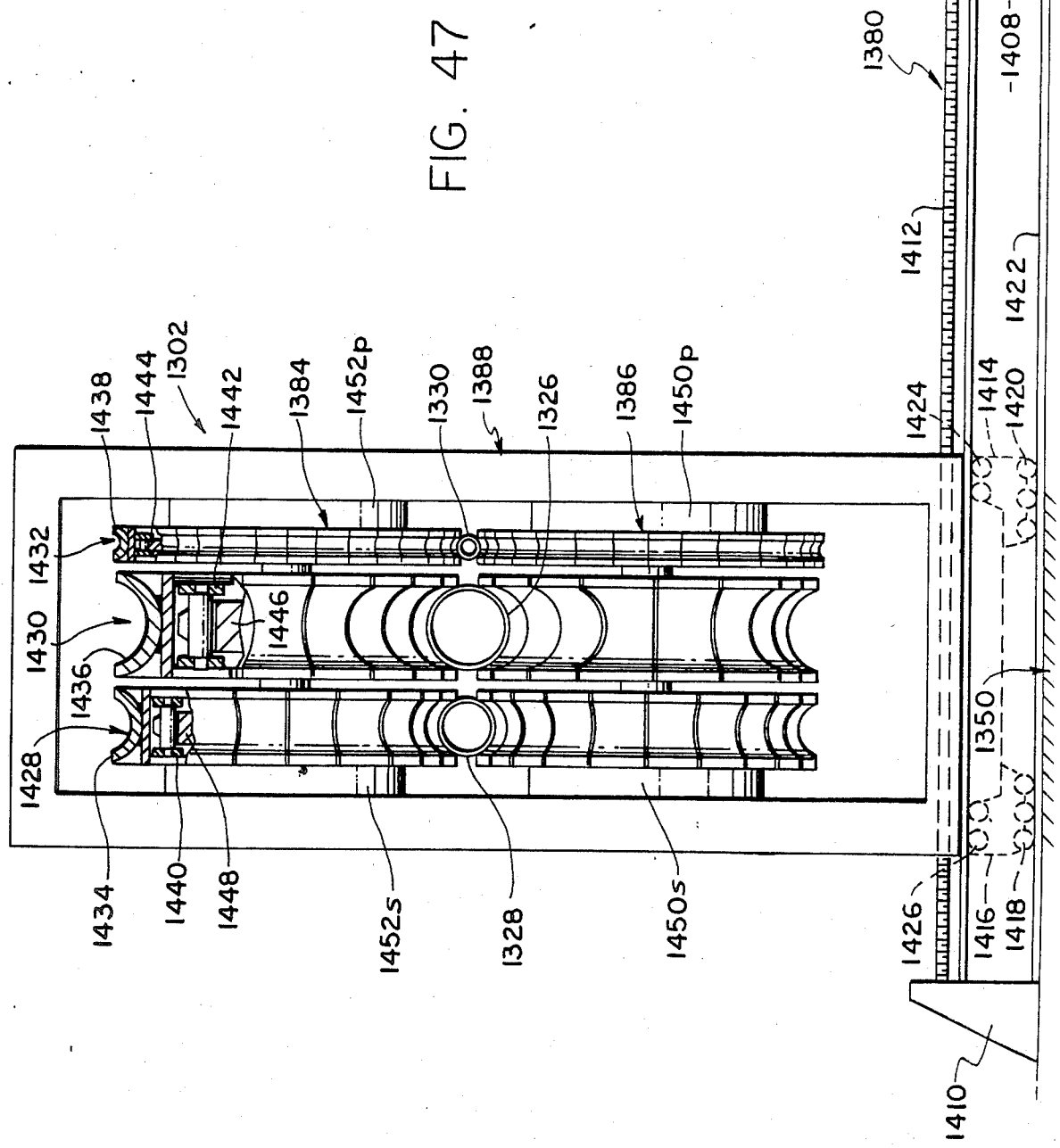
FIG. 47 is a schematic front elevation transverse view of the operational lines take-off device used on the vessel of FIGS. 45 and 46.

A second embodiment of a pipelaying vessel designed for laying operational lines array in shallow water down to about 1500 ft. depth is shown in FIGS. 45-47. This embodiment is similar to the embodiment illustrated in FIGS. 43 and 44 with the important difference that the straightening/tensioning device 1302 is a lower cost, fully operative alternate embodiment to the use of the straightening/tensioning assembly 1204 mounted on a level wind assembly 1206. In the embodiment of FIGS. 43 and 44 pipeline array guides 1210 and 1212 as well as pipe clamp 1214 are also used.

The embodiment illustrated in FIGS. 45-47 as vessel 1300 has a main reel 1304 mounted on reel support housings 1306 and 1308 by bearing housings 1310 and 1312. A first auxiliary storage reel 1314 and a second auxiliary storage reel 1316 are mounted on support bases 1318 and 1320 which are in turn mounted on level wind track systems 1322 and 1324 respectively. A rigid walled pipeline 1326 and two additional auxiliary operational lines 1328 and 1330 are unspooled from the main reel 1304 and the two auxiliary reels 1314 and 1316 in order to form a planar operational lines array 1332 at the entry position 1334 into the straightening/tensioning assembly 1302. After passing through the assembly 1302 the operational lines array 1332 passes through a stern mounted roller ramp 1336 which has four or more rollers 1338, 1340, 1342 and 1344 mounted in a framework 1346. Stern connectors 1348s and p are also employed to affix the ramp to stern 1350. A rub roller 1352 is also employed.

The pipelaying vessel 1300 is also outfitted with an A/R reel 1354 mounted on the foredeck 1356; a control tower 1358 mounted on the port main reel support housing 1306; a main reel level wind assembly 1360 (shown in FIG. 45) and two pedestal cranes 1362 and 1364 (shown in FIG. 46). Lifeboats 1366s and 1366p are provided as are exhaust stacks 1368s and p. Thrusters 1370 and 1372 are mounted on bow 1374 under the waterline and thrusters 1376 and 1378 are mounted at the stern under the waterline for providing dynamic positioning for the vessel 1300.

Straightening/Tensioning Assembly For Shallow Water Vessel

The straightening/tensioning device 1302 is mounted on a level wind track system 1380 which is in turn secured to aft deck 1382. A pair of straightening/tensioning multi-track straightening/tensioning assemblies 1384 and 1386 are mounted on either side of operational lines array 1332 by a frame means 1388. Side supports 1390s, p; and 1392s, p, provide track supports for the straightening/tensioning devices 1384 and 1386 both of which are mounted for reciprocal motion within the frame structure 1388 by hydraulic piston pairs 1394 and 1396. Roller 1335 provides support for lines 1328 and 1330 during unspooling.

FIGS. 46 and 47 show the straightening/tensioning device 1302 in greater detail. The level wind track assembly 1380 comprises a fore track 1400 and an aft track 1402, both mounted transversely on stern deck 1350. Each of these track assemblies has separate hydraulic motors 1404 and 1406, respectively, mounted on the portside of a track beam shown as T-beam 1408 in FIG. 47. The port end of T-beam 1408 has a mounting pedestal 1410 which is connected to stern deck 1350. The hydraulic motor is connected to an operator screw 1412 which is rotatably mounted in pedestal 1410. This operator screw 1412 is mounted slightly above the T-beam 1408 as shown in FIG. 47. The straightening/tensioning assembly frame 1388 is mounted on roller shoes 1414 and 1416 which are designed to be placed on the fore and aft sides of each of the tracks 1400 and 1402. The lower roll sets illustrated as 1418 and 1420 in FIG. 47 rests on a roller plate 1422 and roller sets 1424 and 1426 are designed to have rolling contact with the under surface of the T-beam 1408. By placing four of the roller shoes 1414 and 1416 at the fore end and at the aft end of frame 1388 a secure and transversely movable straightening/tensioning assembly 1308 is effected. Mounting nuts (not shown) are provided in the bottom of the frame 1388 for engaging the operator screw 1412.

Straightening/tensioning assemblies 1384 and 1386 are illustrated as having three operational lines contacting tracks 1428, 1430 and 1432 in order to provide straightening and tensioning for lines 1326, 1328 and 1330 respectively.

The straightening/tensioning assemblies 1384 and 1386 have been previously described with respect to FIG. 38 and are mounted in the frame 1388 similarly to the mounting of the devices 1022 and 1024 in the pipe take-off structure 30 of FIG. 36. Operational lines support pads 1434, 1436 and 1438 are shown in cross-section as are the sprocket chains 1440, 1442 and 1444 respectively. The main support driven sprocket gears 1446 and 1448 are also illustrated in the partial cross-sectional view. Four hydraulic motors illustrated on the fore positioned motors 1450s, p and 1452s, p, are provided for operation of the tensioning force exerted on the operational lines 326, 328 and 330.

Operation Of Straightening/Tensioning Assembly

The three operational lines are unspooled from their respective reels into the juxtaposed position at 1334 immediately in front of the straightening/tensioning device 1302. The rigid walled lines within the array are straightened by the exertion of transverse force on the lines due to the curvature established in the straightening/tensioning assemblies 1384 and 1386 by means of the jactuator adjustments described in detail with respect to FIG. 38. The adjustment is set for a compound pipeline array curvature so that straightening of the pipeline can be effected by three longitudinally separated contact areas within the device 1302.

Tensioning force is exerted on the lines by means of the hydraulic motors 1450s, p and 1452s, p, in order to maintain the desired curvature for the operational lines as they are laid. The operational lines as passed through the straightening/tensioning device 1302 are then rolled across the ramp 1336 rollers and into the water. The operation of the unspooling is controlled by hydraulic motors associated with each of the reels in the manner described with respect to FIGS. 1-32 above.

During unspooling the straightening/tensioning assembly 1302 is level wound transversely across the stern deck 1350 of vessel 1300 by means of the level wind track system 1380 in order to be in line with the pipeline 13Z6 unreeled from main reel 1304. The auxiliary reels 1314 and 1316 are, in turn, level wound across the main deck of vessel 1300 in order to provide corresponding positioning for the lines entering the straightening/tensioning device 1302.

Fixed Depth/Shallow Water Operational Lines Layout

In the event that a multi-line layout project is to be carried out in a relatively fixed depth body of water it is possible to utilize a series of straightener and tensioner assemblies such as shown in FIG. 41 as assemblies 1114, 1116, and 1118 when arranged on a level wind carriage such as the straightening/tensioning device 1302 shown in FIGS. 45–47. In such a modification the carriage 1388 length is extened longitudinally along the vessels aft main deck a sufficient distance to accomodate all five pipe array handling assemblies. This modification is viewed as economically unattractive since a similar pipeline array layout project can be handled by the embodiment disclosed in FIGS. 43–44 or by the preferred embodiment of FIGS. 1–38 which permits a wide range of laying depths.

ADDITIONAL MODIFICATIONS

One of the advantages of the present invention is that a pipe laying vessel of the Apache-type as described in U.S. Pat. No. 4,230,421 to Springett, et al, designed for only single pipeline layout can be utilized as the base vessel for a conversion to a multi-reel pipe laying vessel as described herein. For such a conversion the pivotal support ramp assembly, pipe bending radius controller, the level wind assembly and the pipe straightening, clamping, and guiding equipment are all removed from the vessel's aft main deck. Thereafter, one or two auxiliary reels are mounted for level winding and a operational lines laying device such as the pipe take-off assembly 24 is fitted onto the stern position 28 as shown in FIGS. 1–5 herein. The main reel utilized in an Apache-type single pipeline vessel can be used with only minor modification for increasing structural support and the hydraulic powering/braking systems capacity. In this manner an existing single pipeline vessel can be converted into a plural operational lines laying vessel. Also, if desired, the deck equipment can be switched back to the pivotal support ramp type for laying single pipelines. The process of converting a single pipe laying vessel to a multi-reel pipe laying vessel and then the process of reconversion to the original vessel are encompassed within the present invention.

The laying devices of the various embodiments have supporting means which are adapted for forming the plurality of operational lines into initial juxtaposition. The supporting means are the operational lines support grooves in drum 26 of the vessel illustrated in FIGS. 1–7, and the pipe support pads mounted on the multiple track assemblies of the other illustrated vessels. The initial juxtapositioning is such that either a curved or a straight construction line passing through such operational lines when it is positioned in a plane perpendicular to the direction of motion of the operational lines is also positioned substantially transversely to the direction of vessel forward movement. When the construction line is curved the operational lines do not lie in a transverse plane, whereas when the construction line is straight the operational lines are juxtaposed in a planar arrangement. The initial juxtaposition is usually maintained as the operational lines array is moved through the subsequent straightening, tensioning, and guiding devices. Thus while the plane in which a curved construction line is positioned may change its vertical inclination, the transverse positioning of the construction line with respect to the forward motion of the vessel remains substantially the same from the initial juxtapositioning through the pipeline array guiding device.

If desired, a pipeline angle measuring mechanism can be fitted onto the pipe take-off structure 30 below the operating lines array opening 368 of FIG. 8. Such mechanisms are commercially available and can be electronically linked to a computer read-out which is maintained in the bridge of the control tower to permit monitoring of the water entry angle with respect to other parameters of the pipe laying operation.

For certain operations, it is preferred to start a pipeline layout in very deep water of 3,500 ft. or greater at 87° water entry angle rather than utilizing a slightly higher angle which can be accomodated by the positioning of the pipe take-off assembly or laying device 24 of FIGS. 1–11. This start-out water entry angle is then gradually decreased to angles used for the particular pipeline in order to eliminate the possibility of buckling of the rigid walled pipeline within the array. The full limit of a 90° entry angle is rarely used.

Another variation in practice is to utilize a subsea plough or jet sled for burying the operational lines array on the bottom. A pulled plough such as disclosed in U.S. Pat. No. 4,410,297 can be employed for this purpose. Another possibility is to utilize a remote controlled self-propelled plough. There are basically three types of plough systems which are referred to as: (1) a pretrencher, which opens a trench line prior to the laydown of the operational lines array, (2) a simultaneous trencher, which lays the pipeline array in the trench immediately after it is dug, and (3) a post trencher, which buries the operational lines array under bottom silt. All three types of plough systems can be used with the vessel of the present invention.

In the vessel described herein, level winding of the auxiliary reels has been provided for. Such a winding feature is primarily needed for spooling of the pipelines onto their respective storage reels. If the fleet angles between the storage reels and the laying device can be held to within about 2° it is not necessary to provide for level winding during the unspooling and laying out of the lines stored thereon. If this limit can not be safely maintained the level winding of the reels is employed during unspooling.

During the spooling operation the plurality of lines are passed through the laying device 24 of FIGS. 1–38, but are contacted only at the top of the drum 26. The laying device then functions as a feeding device which permits level winding of the incoming array during spooling. The lines can also be separately spooled up on the storage reels.

While the main reel and the auxiliary reels of the present invention have been disclosed as vertical reels having horizontal positioned axes it is also possible to mount one or more of these reels on vertically disposed axes if desired.

While the vessels described herein are shown as dynamically positioned ships it is also possible to mount the storage reels and operational lines laying device on to other types of either self-propelled, towed, or assisted vessels. Such vessels can be ship shaped, barges with configured or flat bottoms, semisubmersible vessels, or small water area twin hull vessels known as SWATH ships.

In general, the operational lines laying device shown in the preferred modifications disclosed and illustrated with respect to FIGS. 1–38; and the vessels illustrated in FIGS. 43–47 are preferred over the pivotal support ramp vessel illustrated in FIGS. 39–42 since the center of gravity of thepipe handling equipment is constant which avoids the loss of metacentric height for the vessel as the pipe handling equipment is raised off the deck for deeper water layouts.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and rnage of equivalency of the claims are therefore intended to be embraced therein.

What is claimed and desired to be secured by Letters Patent is:

1. A reel pipelaying vessel for use in a body of water, comprising at least two reels mounted thereon for storage and layout of at least two operational lines at least one of which is a rigid walled pipeline;
    an operation lines laying device mounted adjacent the stern of said vessel downstream of said reels in the direction of unspooling;
    said laying device including a drum mounted on said vessel for rotation about an axis transverse to the longitudinal axis of said vessel, and adapted for providing simultaneous moving contact for each of a plurality of operational lines;
    with said plurality of lines interconnected to one another and adapted for moving at a common velocity with respect to each other and for permitting layout from said vessel in a downward juxtaposed configuration;
    a pipe take off structure pivotally mounted on said drum axis of rotation and incuding first straightener means for applying a force on the operational lines inward toward said drum axis and second straightener means for applying a force on the operational lines outward away from said drum axis, with said drum and first and second straightener means providing three point straightening to the operational lines as the operational lines leave said drum; and
    motive means operatively interconnected to said reels and adapted to control the rate of layout of the operational lines therefrom.

2. A reel pipelaying vessel according to claim 1, wherein a level wind mounting means is provided for at least one of said reels so that said reel is adpated for transverse motion with respect to the vessel longitudinal axis during unspooling.

3. A reel pipelaying vessel according to claim 1, wherein at least three reels are mounted on said vessel.

4. A reel pipelaying vessel according to claim 1, wherein operational lines are stored on each of said reels and are unspooled through said operational lines laying device.

5. A reel pipelaying vessel according to claim 1, wherein movement of said drum is dependent upon frictional contact between the lines and said drum and controlled by said motive means.

6. A reel pipelaying vessel according to claim 1, wherein said laying device includes opposed tensioning devices mounted on either side of the operational lines and adapted for exerting radial inward and longitudinal forces thereon, with one of said tensioning devices including said second straightener means.

7. A reel pipelaying vessel according to claim 1, wherein said operational lines laying device is adapted for gathering the lines from said reels into initial juxtaposition forming an operational lines array in a generally horizontal planar configuration such that a line within the plane positioned perpendicular to the direction of motion of the lines is also perpendicular to the longitudinal axis of said vessel; and
    said laying device adapted for layout of the operational lines array over a range of entry angels into a body of water of from about 20° to about 90°.

8. A reel pipelaying vessel according to claim 1, wherein the periphery of said drum is configured to provide separate supporting means for a plurality of juxtaposed operational lines.

9. A reel pipelaying vessel according to claim 1, wherein a level wind mounting carriage is provided for said operational lines laying device and said carriage is adapted to provide transverse motion for said laying device with respect to the vessel longitudinal axis during unspooling.

10. A reel pipelaying vessel according to claim 1, wherein at least on of said reels is adpated to be a main reel and is rotatably mounted in a fixed lateral position on said vessel.

11. A reel pipelaying vessel according to claim 1, wherein said drum includes means for forming a plurality of operational lines into initial juxtaposition such that a construction line passing through such operational lines when positioned in a plane perpendicular to the direction of motion of the operational lines is also positioned substantially transversely with respect to the direction of the vessel forward movement.

12. A reel pipe laying vessel, comprising a main reel rotatably mounted on said vessel for storage of a rigid walled pipeline, said main reel being mounted in a fixed lateral position on said vessel;
    at least one auxiliary reel mounted on said vessel for storage and unspooling of an additional operational line;
    motive means provided for said reels and adapted to control the rate of layout of lines therefrom;
    an operational lines laying device including a drum mounted on said vessel for rotation about an axis transverse to the longitudinal axis of said vessel, and for providing simultaneous moving contact for each plurality of operational lines;
    said drum including means for forming a plurality of operational lines from said main reel and said auxiliary reel into initial juxtaposition such that a construction line passing though such operational lines when positioned in a plane perpendicular to the direction of motion of the operational lines is also positioned substantially transversely with respect to the direction of vessel movement;
    with said drum including means for moving the plurality of operational lines at common velocity with respect to each other and for permitting layout of lines from said vessel in a downward juxtaposed configuration;
    with said drum including a straightening means pivotally mounted on said drum axis of rotation for straightening said rigid walled pipeline to remove residual permanent stress while maintaining the same in juxtaposition with respect to the remaining lines such that a construction line passing through such operational lines when positioned in a plane perpendicular to the direction of motion of said operational lines is also positioned transversely with respect to the direction of vessel movement; and with aid straightening means including force means for applying first and second lateral forces to said rigid walled pipeline downstream from said drum so that said drum and said force means impart a reverse bending force to said rigid walled pipeline opposite to the curvature imparted by said reels.

13. A reel pipelaying vessel according to claim 12, wherein said operational lines laying device includes tensioning means adapted to provide tensioning of the pipelines and adapted to cooperate with said straightening means to provide straightening of said rigid walled pipeline while maintaining the juxtaposition of said operational lines.

14. A reel pipelaying vessel according to claim 13, wherein said straightening means contacts the operational lines prior to said tensioning means.

15. A reel pipelaying vessel according to claim 12, wherein a level wind mounting carriage is provided for said auxiliary reel so that said reel is adapted for transverse motion with respect to the vessel longitudinal axis during unspooling.

16. A reel pipelaying vessel according to claim 12, wherein at least two ausiliary reels are mounted on said vessel.

17. A reel pipelaying vessel according to claim 12, wherein operational lines are stored on each of said reels and are unspooled through the operational lines laying device.

18. A reel pipelaying vessel according to claim 17, wherein at least four operational lines are stored on said main reel and said auxiliary reel in double wound fashion.

19. A reel pipelaying vessel according to claim 12, wherein movement of said drum is dependent upon frictional contact between the operational lines and said drum and controlled by said motive means.

20. A reel pipelaying vessel according to claim 12, wherein said operational lines laying device is adapted for gathering said operational lines from said main reel and said auxiliary reel and for forming an operational lines bundle arrayed in a generally horizontal planar configuration such that a construction line within the plane when positioned perpendicular to the direction of motion of the lines is also positioned transversely with respect to the direction of vessel movement; and said laying device adapted for layout of the operational lines over a range of entry angles into a body of water of from about 20° to 90°.

21. A reel pipelaying vessel according to claim 12, wherein said periphery is confugured to provide separate supporting means for a plurality of juxtaposed operational lines.

22. A reel pipelaying vessel for use in a body of water comprising at least two reels mounted thereon for storage and layout of at least two operational lines one of which is a rigid walled pipeline;

each of said reels having motive means associated therewith for providing rotational power to said reels during spooling of the operational lines thereon and adapted for providing braking force for said reels during spooling of the operational lines thereon and adapted for providing braking force for said reels during unspooling and operational lines layout;

an operational lines laying device mounted adjacent the stern of said vessel downstream of said reel in the direction of unspooling;

operational lines stored on each of said reels and unspooled through said laying device;

said laying device including a drum mounted on said vessel for rotation about an axis transverse to the longitudinal axis of said vessel, and adapted for forming said plurality of operational lines into initial juxtaposition and for providing moving contact with said operational lines to unspool said lines at a common velocity with respect to each other; and said operational lines supporting means and said motive means operating in conjuction with the tension produced in said operational lines by the wieght of said operational lines between said vessel and the bottom of the body of water in which the vessel is operated, cooperatively enabling said rigid walled pipeline to be straightened prior to entry into the water and for said plurality of operational lines to have tension force applied longitudinally there along above the water line.

23. A reel pipelaying vessel according to claim 22, wherein said drum is adapted for providing moving contact for each of said plurality of operational lines and for exerting tension longitudinally along said lines.

24. A reel pipelaying vessel according to claim 22, wherein said drum includes means for providing moving contact along at least two portions of each of said operational lines and is adapted to provide for selected longitudinal curvatures for said operational lines while contacted thereby; and said drum providing straightening of said rigid walled pipeline.

25. A reel pipelaying vessel for use in a body of water comprising at least two reels mounted thereon for storage of at least two operational lines, one of which is a rigid walled pipeline;

an operational lines laying device mounted adjacent the stern of said vessel downstream of said reels in the direction of unspooling;

said laying device including an operational lines supporting drum adapted for providing moving contact with a plurality of operational lines as the direction of movement thereof is changed from movement over the vessel to entry into a body of water within which said vessel is operated;

said supporting drum adapted for forming the operational lines into initial juxtaposition such that a construction line passing through such pipeline and operational lines when positioned perpendicular to the direction of motion of the lines is also positioned substantially transversely with respect to the direction of vessel forward movement; and with the radius of said supporting drum sized with respect to the outside diameter and the wall thickness of said rigid walled pipeline according to the relationships:

drum radius $\geq 18 \times$ o.d. of pipeline (1), and o.d. of pipeline/wall thickness of pipeline $<30$ (2).

26. A reel pipelaying vessel according to claim 25, wherein said laying device comprises opposing tensioning devices mounted on either side of said rigid walled pipeline and said auxiliary operational line and adapted for exerting radial inward and longitudinal forces thereon.

27. A reel pipelaying vessel according to claim 25, wherein said operational lines laying device comprises a straightening device which is adapted to provide straightening of said rigid walled pipeline in order to remove residual permanent stress to below a predetermined maximum value.

28. A reel pipelaying vessel, comprising at least two reels mounted thereon for storage of at least two operational lines one of which is a rigid walled pipeline;
   an operational lines laying device mounted adjacent the stern of said vessel downstream of said reels in the direction of unspooling;
   said laying device including a drum mounted on said vessel for rotation about an axis transverse to the longitudinal axis of said vessel, and adapted for providing moving contact with each of a plurality of operational lines for moving the lines at a common velocity with respect to each other;
   straightening means cooperating with said drum for providing three zones of force imposition upon said rigid walled pipeline;
   the first of said force imposition zones lying under said operational lines on said drum;
   the second force imposition zone being positioned on the opposite side of said operational lines downstream of said drum; and
   the third force imposition zone being on the same side of said operational lines as said first zone downstream of said second zone.

29. A reel pipelaying vessel according to claim 28, wherein said first force imposition zone is contributed by said drum.

30. A reel pipelaying vessel according to claim 28, wherein said operational lines laying device comprises a straightening device adapted to provide straightening of said rigid walled pipeline and includes a tensioning device adpated for exerting radial inward and longitudinal forces on said operational lines; and
   said second force exertion zone being provided by said straightening device and said third force exertion zone being provided by said tensioning device.

31. A reel pipelaying vessel for use in a body of water comprising a main reel rotatably mounted on said vessel for storage of a rigid walled pipeline;
   at least one auxiliary reel mounted on said vessel for storage and spooling of an additional rigid walled pipeline;
   an operational lines laying device mounted adjacent the stern of said vessel downstream of said reels in the direction of unspooling;
   said operational lines laying device comprising an operational lines supporting drum adated for providing continuous contact with a plurality of operational lines over a portion of the unspooling length thereof and for changing the direction of movement thereof from over the vessel to downwardly toward the water;
   said operational lines supporting drum adapted for forming the operational lines from said main reel and said auxiliary reel into initial juxtaposition;
   a first straightening device adapted to straighten said rigid walled pipeline to remove residual permanent stress and positioned to contact said lines following contact thereof with said drum and adapted for imparting a straightening force to said rigid walled pipeline;
   a second straightening device located in the direction of unspooling following said first straightening device and positioned on the opposite side of said lines;
   said drum and said second straightening device providing combined straightening force to counteract the straightening force imposed by said first straightening device; and
   said drum, and said first and second straightening devices adapted for imparting a reverse bending force to said rigid walled pipeline opposite to the curvature imparted by said main reel;
   with said first and second straightening devices carried on a pipe take off structure pivotally mounted on said drum axis of rotation.

32. A reel pipelaying vessel according to claim 31, wherein said second straightening device includes tensioning means adapted to provide a tension force longitudinally along said pipeline after unspooling from said main reel.

33. A reel pipelaying vessel according to claim 31, wherein said drum and said first and second straightening devices have supporting grooves aligned to receive and retain said operational lines during the unspooling thereof from said main reel and said auxiliary reel.

34. A reel pipelaying vessel according to claim 31, wherein said drum is adapted for moving said operational lines at a common velocity with respect to each other and for permitting layout of said lines from said vessel in a downward planar configuration.

35. A reel pipelaying vessel according to claim 31, wherein level wind mounting means are provided for said auxiliary reel and said drum to adapt said auxiliary reel and said drum for transverse motion with respect to the vessel longitudinal axis during unspooling.

36. A reel pipelaying vessel according to claim 31, wherein a third auxiliary reel is mounted on said vessel for unspooling of at least one additional operational line.

37. A reel pipelaying vessel according to claims 1, 12, 22, 28 or 31 in which said vessel includes means for dynamic positioning.

38. A reel pipelaying vessel according to claims 1, 12, 22, 28 or 31 including abandonment and recovery means adapted for aiding the handling of said operational lines.

39. A method of unspooling and laying out a plurality of operational lines into a body of water from a plurality of reels mounted on a vessel with at least one of said reels adapted for unspooling a rigid walled pipeline, the remaining operational lines stored on reels mounted on the vessel, and a drum laying device mounted adjacent the stern of the vessel; said method comprising the steps of:
   forming the operational lines into initial juxtaposition such that a construction line passing through such operational lines when positioned perpendicular to the direction of motion of the operational lines is also positioned substantially transversely with respect to the vessel longitudinal axis;
   providing moving contact between the juxtaposed operational lines and the drum laying device;
   changing the direction of movement of the operational lines from over the vessel to a downward direction;
   moving the plurality of juxtaposed operational lines at a common velocity with respect to each other; and
   laying out the operational lines from the vessel in a downward direction into the body of water.

40. The method of unspooling a plurality of operational lines according to claim 39, including the additional step of:

straightening the rigid walled pipeline within the plurality of operational lines subsequent to said moving step by contact with the drum laying device and a pipe take-off structure providing three force points for the contact as the operational lines leave the drum laying device, with the three force points rotating about a common axis as the downward direction is changed.

41. The method of unspooling a plurality of operational lines according to claim 39, including controlling the longitudinal tension force along the operational lines subsequent to said moving step resulting from the tension force produced in the operational lines by the weight of the lines between the vessel and the bottom of the body of water in which the vessel is operated, by controlling the rotation of the reels, to straighten the rigid walled pipeline without utilizing a separate straightening device or a separate tensioning device.

42. The method of unspooling a plurality of operational lines according to claim 39, wherein said forming step is carried out by level winding at least one of the reels transversely with respect to the longitudinal axis of the vessel.

43. The method of unspooling a plurality of operational lines according to claim 39, wherein said forming step is carried out by maintaining the reel from which the rigid walled pipeline is unspooled in a fixed lateral position with respect to the vessel.

44. The method of unspooling a plurality of operational lines according to claim 39, including the step of:

controlling the rotation of each of the reels to determine the layout velocity of the operational lines therefrom.

45. The method of unspooling a plurality of operational lines according to claim 39, wherein said forming step is carried out by providing the drum laying device with an operational lines supporting means which is adpated to provide said forming and said moving contact with said operational lines, and wherein said plurality of operational lines are laid out at a common velocity due to frictional contact with said supporting means.

* * * * *

UNITED STATES PATENT AND TRADEMARK OFFICE
CERTIFICATE OF CORRECTION

PATENT NO. : 4,687,376
DATED : August 18, 1987
INVENTOR(S) : Carlos E. Recalde

It is certified that error appears in the above-identified patent and that said Letters Patent is hereby corrected as shown below:

On the Title Page:

[73] Assignee should be Santa Fe International Corporation

Signed and Sealed this

Twenty-third Day of February, 1988

Attest:

DONALD J. QUIGG

Attesting Officer

Commissioner of Patents and Trademarks